(12) United States Patent
Uchiyama et al.

(10) Patent No.: US 12,495,088 B2
(45) Date of Patent: Dec. 9, 2025

(54) COMMUNICATION DEVICE, COMMUNICATION METHOD, AND COMMUNICATION SYSTEM

(71) Applicant: SONY GROUP CORPORATION, Tokyo (JP)

(72) Inventors: Hiromasa Uchiyama, Tokyo (JP); Hiroki Matsuda, Tokyo (JP); Kazuyuki Shimezawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 75 days.

(21) Appl. No.: 18/574,143

(22) PCT Filed: Mar. 29, 2022

(86) PCT No.: PCT/JP2022/015609
§ 371 (c)(1),
(2) Date: Dec. 26, 2023

(87) PCT Pub. No.: WO2023/276382
PCT Pub. Date: Jan. 5, 2023

(65) Prior Publication Data
US 2024/0259464 A1 Aug. 1, 2024

(30) Foreign Application Priority Data
Jul. 1, 2021 (JP) ................. 2021-110381

(51) Int. Cl.
*H04L 67/10* (2022.01)
(52) U.S. Cl.
CPC .................. *H04L 67/10* (2013.01)
(58) Field of Classification Search
None
See application file for complete search history.

(56) References Cited

U.S. PATENT DOCUMENTS

| 12,013,938 | B2 * | 6/2024 | Chung | G06N 3/045 |
| 2021/0367758 | A1 * | 11/2021 | Emmadi | G06N 3/08 |

(Continued)

FOREIGN PATENT DOCUMENTS

| JP | 2019-148876 A | 9/2019 |
| JP | 2020077155 A | 5/2020 |

(Continued)

OTHER PUBLICATIONS

Mohammed Thaha et al., "Distributed Inference Acceleration with Adaptive DNN Partitioning and Offloading", IEEE Infocom 2020—IEEE Conference on Computer Communications, Jul. 6, 2020, pp. 854-863.

(Continued)

*Primary Examiner* — Quang N Nguyen
(74) *Attorney, Agent, or Firm* — CHIP LAW GROUP

(57) ABSTRACT

To an information processing device or the like that reduces the time required to transmit a computation result as a response while causing a computation on the basis of a DNN to be distributed. According to an aspect of the present disclosure, there is provided an information processing device that handles a part of a series of computations in a deep neural network. The information processing device determines whether or not to transmit, to a first communication device, a result of an intermediate computation in the series of computations in the deep neural network, in a case where transmission to the first communication device is not determined, transmits a result of at least a part of a computation included in a first range among the series of computations to a second communication device that is a computation handler of a second range following the first range, and, in a case where transmission to the first communication device is determined, executes a computation for transmission to the first communication device by using a result of (Continued)

the intermediate computation in the series of computations in the deep neural network, and transmits a result of executing the computation to the first communication device.

23 Claims, 25 Drawing Sheets

(56) References Cited

U.S. PATENT DOCUMENTS

| | | | |
|---|---|---|---|
| 2024/0054096 A1* | 2/2024 | Li | G06F 15/8023 |
| 2025/0080320 A1* | 3/2025 | Ku | G06N 3/084 |

FOREIGN PATENT DOCUMENTS

| | | |
|---|---|---|
| JP | 2020135060 A | 8/2020 |
| JP | 2021-068393 A | 4/2021 |
| WO | 2018/196631 A1 | 11/2018 |

OTHER PUBLICATIONS

International Search Report and Written Opinion of PCT Application No. PCT/JP2022/015609, issued on Jul. 5, 2022, 13 pages of ISRWO.

Technical Specification Group Services and System Aspects; Study on traffic characteristics and performance requirements for AI/ML model transfer in 5GS, 3rd Generation Partnership Project, 3GPP TR 22.874, Version 0.1.0, Release 18, Sep. 2020, 16 pages.

Teerapittayanon, et al., "BranchyNet: Fast Inference via Early Exiting from Deep Neural Networks", Neural and Evolutionary Computing, Sep. 6, 2017, 6 pages.

Teerapittayanon, et al., "Distributed Deep Neural Networks over the Cloud, the Edge and End Devices", International Conference on Distributed Computing Systems (ICDCS), Sep. 6, 2017, 12 pages.

\* cited by examiner

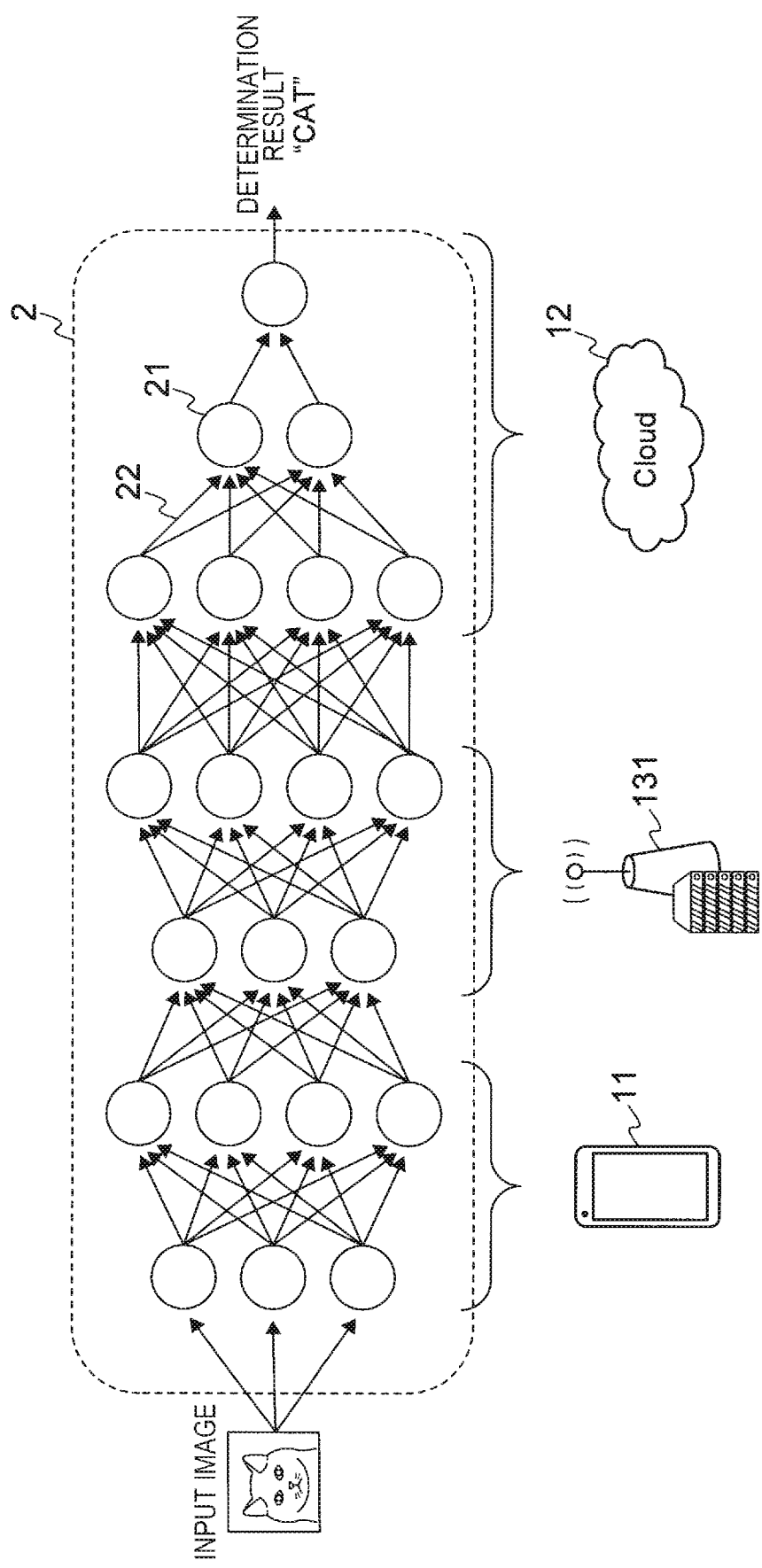

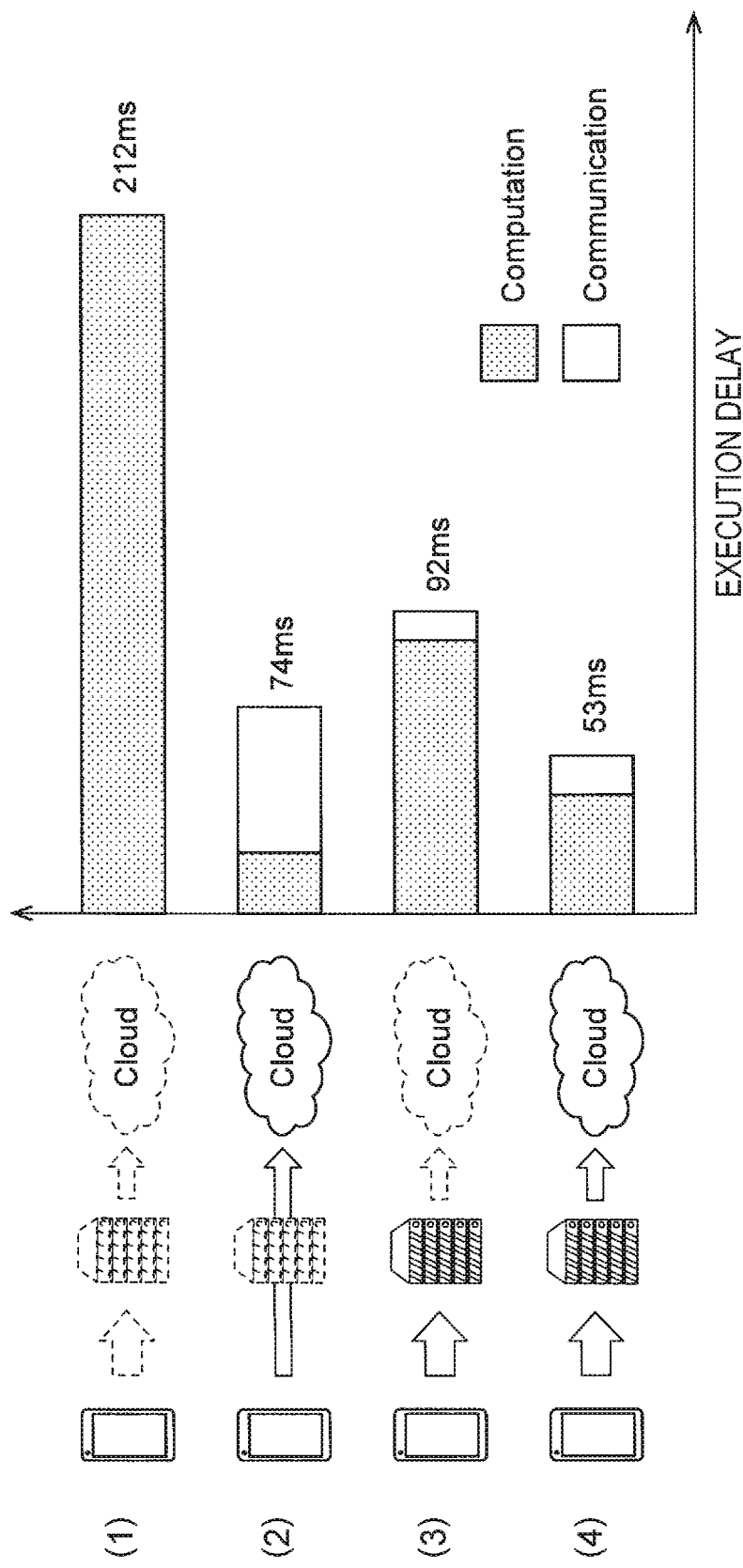

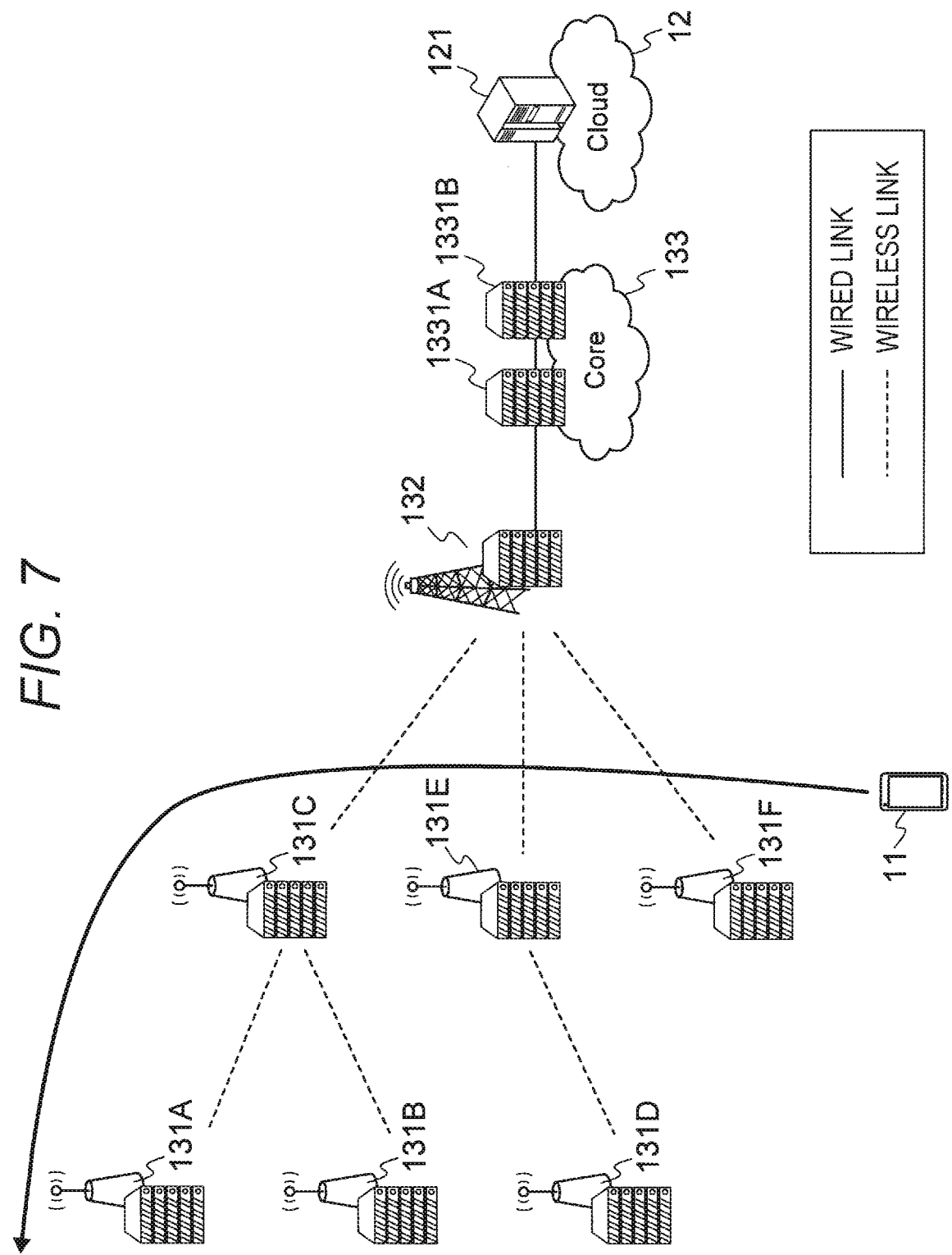

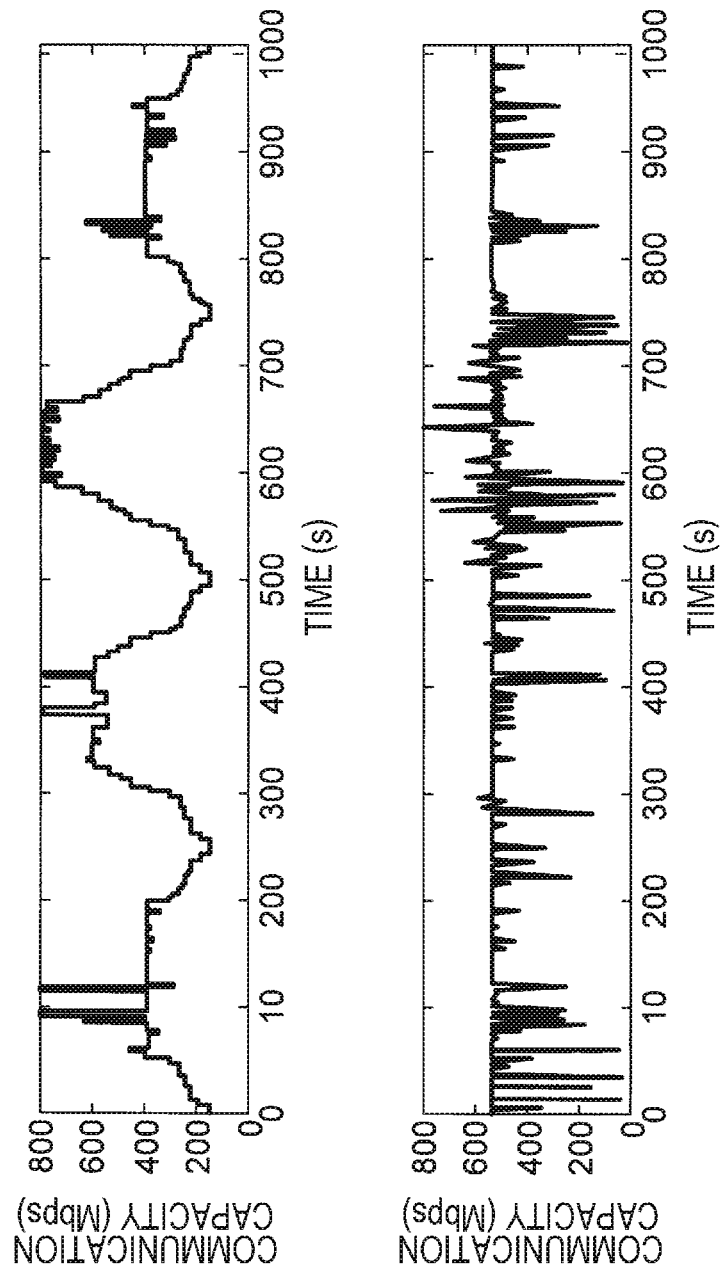

FIG. 11

| NUMBER | DESCRIPTION | UE HANDLING RANGE | COMMUNICATION NODE HANDLING RANGE | CLOUD SYSTEM HANDLING RANGE |
|---|---|---|---|---|
| 1 | EQUALITY-SECURED TYPE | LAYERS 1 TO 16 | LAYERS 17 TO 33 | LAYERS 37 TO 50 |
| 2 | UE-CONCENTRATED TYPE | LAYERS 1 TO 35 | LAYERS 36 TO 42 | LAYERS 43 TO 50 |
| 3 | EDGE SERVER-CONCENTRATED TYPE | LAYERS 1 TO 7 | LAYERS 8 TO 42 | LAYERS 43 TO 50 |
| 4 | CLOUD SERVER-CONCENTRATED TYPE | LAYERS 1 TO 9 | LAYERS 10 TO 18 | LAYERS 19 TO 50 |

FIG. 13A

| NUMBER | CLOUD SYSTEM 12 | CORE NETWORK 133 | WIRELESS DONER 132 | WIRELESS NODE 131C | WIRELESS NODE 131A | WIRELESS COMMUNICATION TERMINAL 11A |
|---|---|---|---|---|---|---|
| 1 | 20 | 5 | 5 | 5 | 10 | 5 |
| 2 | 10 | 10 | 10 | 5 | 0 | 5 |
| 3 | 10 | 10 | 10 | 0 | 5 | 5 |
| 4 | 5 | 5 | 20 | 5 | 3 | 2 |

FIG. 13B

| NUMBER | CLOUD SYSTEM 12 | CORE NETWORK 133 | WIRELESS DONER 132 | WIRELESS NODE 131C | WIRELESS NODE 131B | WIRELESS COMMUNICATION TERMINAL 11B |
|---|---|---|---|---|---|---|
| 1 | 20 | 5 | 5 | 5 | 10 | 5 |
| 2 | 10 | 10 | 10 | 0 | 10 | 10 |
| 3 | 10 | 10 | 10 | 10 | 0 | 10 |
| 4 | 5 | 5 | 20 | 5 | 3 | 2 |

FIG. 15A

| AVAILABLE COMPUTATION CAPABILITY | HANDLING RANGE |
|---|---|
| 90% OR MORE | n |
| LESS THAN 90% AND 80% OR MORE | 4n/5 |
| LESS THAN 80% AND 60% OR MORE | 3n/5 |
| LESS THAN 60% AND 40% OR MORE | 2n/5 |
| LESS THAN 40% AND 20% OR MORE | n/5 |
| OTHERS | 1 |

FIG. 15B

| DELAY TIME | HANDLING RANGE |
|---|---|
| 500ms OR LONGER | n |
| SHORTER THAN 500ms AND 250ms OR LONGER | 4n/5 |
| SHORTER THAN 250ms AND 100ms OR LONGER | 3n/5 |
| SHORTER THAN 100ms AND 50ms OR LONGER | 2n/5 |
| SHORTER THAN 50ms AND 10ms OR LONGER | n/5 |
| OTHERS | 1 |

FIG. 16

| IDENTIFICATION INFORMATION OF EACH NODE | OUTPUT VALUE OF EACH NODE |
|---|---|
| node 1_4 | out 1 |
| node 2_4 | out 2 |
| node 3_4 | out 3 |
| node 4_4 | out 4 |
| ... | ... |
| node m_4 | out m |

FIG. 25
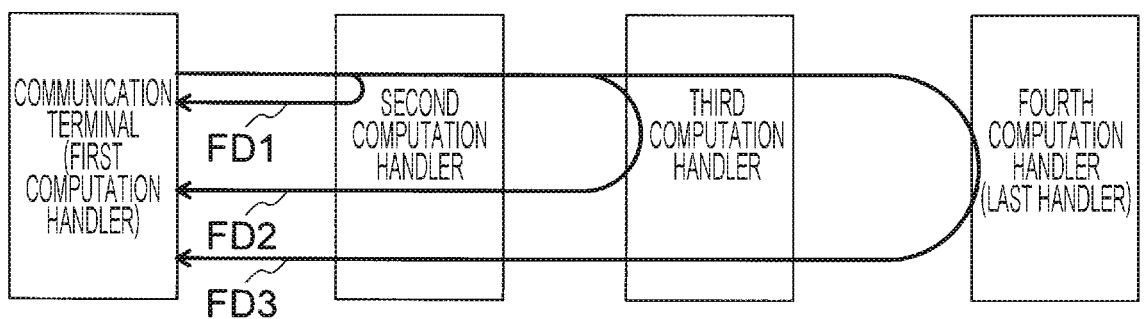
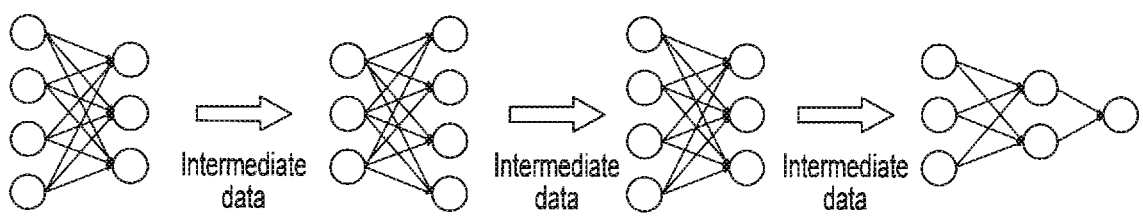

COMMUNICATION DEVICE, COMMUNICATION METHOD, AND COMMUNICATION SYSTEM

CROSS REFERENCE TO RELATED APPLICATIONS

This application is a U.S. National Phase of International Patent Application No. PCT/JP2022/015609 filed on Mar. 29, 2022, which claims priority benefit of Japanese Patent Application No. JP 2021-110381 filed in the Japan Patent Office on Jul. 1, 2021. Each of the above-referenced applications is hereby incorporated herein by reference in its entirety.

TECHNICAL FIELD

The present disclosure relates to a communication device, a communication method, and a communication system.

BACKGROUND ART

In recent years, research in fields such as artificial intelligence and machine learning has rapidly progressed, and applications related thereto are expected to also rapidly spread. Therefore, studies have been made to cause the application to operate comfortably in a communication environment.

The application mainly performs computation on the basis of a neural network (DNN: deep neural network) having a plurality of layers in which internal parameters are optimized by machine learning. This computation has a load higher than other general applications. Therefore, in a case where the application is executed by a general-purpose wireless communication terminal such as a smartphone, there arises a problem that the computation time, the power consumption, and the like increase. On the other hand, a method in which a cloud server serves as a substitute for the computation is also conceivable. However, in this method, a wireless communication terminal transmits information required for the computation to the cloud server and receives the computation result from the cloud server, and thus, the communication volume increases. Furthermore, in the case of wireless communication, since the communication quality is unstable, a delay is likely to occur. Thus, in this method, there is a possibility that a delay amount exceeds the delay amount allowable by the application.

Therefore, instead of federated learning in which computation of a DNN is concentrated on a communication terminal, a cloud server, or the like, distributed learning in which the computation of the DNN is distributed to both the communication terminal and the cloud server has been studied. That is, it is considered that the communication terminal handles a part of the computation of the DNN, and the cloud server handles the rest of the computation of the DNN.

CITATION LIST

Non-Patent Document

Non-Patent Document 1: 3GPP (3rd Generation Partnership Project), "TR (Technical Report) 22.874, V0.1.0, Study on traffic characteristics and performance requirements for AI/ML model transfer" (Chapter 5 Split AI/ML operation between AI/ML endpoints), URL: https://portal.3gpp.org/desktopmodules/Specifications/SpecificationDetails.aspx?specificationId=3721

Non-Patent Document 2: "BranchyNet: Fast Inference via Early-exiting from Deep Neural Networks," Surat Teerapittayanon, et al., "http://bradmcdanel.com/files/2016-icpr-teerapittayanon-mcdanel-kung.pdf"

Non-Patent Document 3: "Distributed Deep Neural Networks over the Cloud, the Edge and End Devices," Surat Teerapittayanon, et al., "https://arxiv.org/pdf/1709.01921.pdf"

SUMMARY OF THE INVENTION

Problems to be Solved by the Invention

Moreover, it has also been studied that that a communication network that relays communication between the communication terminal and the cloud server shares a part of the computation of the DNN. That is, at least one of a plurality of communication nodes constituting the communication network may handle a part of a series of computations from an input layer to an output layer of the DNN. However, adverse effects may also be caused by causing the computation of the DNN to be distributed to multiple devices. For example, the load of the communication node that handles the computation, the communication quality of the network, and the like are not always stable. Therefore, in some situations, the computation may take a time longer than assumed.

Therefore, the present disclosure provides an information processing device or the like that reduces the time required to transmit a computation result as a response while causing a computation on the basis of a DNN to be distributed. Specifically, it is realized by dynamically changing a device that handles the computation, ending the computation in the middle of the computation, and feeding back a result in the middle of the computation. In addition, the problems described herein are merely some of the problems to be solved by the present invention, and the present disclosure may be used for other problems that can be solved by the present disclosure.

Solutions to Problems

According to the present disclosure, an information processing device handles a part of a series of computations in a deep neural network. The information processing device being configured to determine whether or not to transmit, to a first communication device, a result of an intermediate computation in the series of computations in the deep neural network, in a case where transmission to the first communication device is not determined, transmit a result of at least a part of a computation included in a first range among the series of computations to a second communication device that is a computation handler of a second range following the first range, and, in a case where transmission to the first communication device is determined, execute a computation for transmitting a result of the intermediate computation in the series of computations in the deep neural network to the first communication device, and transmit a result of executing the computation to the first communication device.

Further, in a case where it is not determined to transmit the result of the intermediate computation in the series of computations in the deep neural network to the first communication device, the information processing device may execute at least the part of the computation included in the first range and use a result of executing the computation as the result of the computation, which is transmitted to the second communication device. In a case where it is determined to transmit the result of the intermediate computation in the series of computations in the deep neural network to the first communication device, the information processing device may execute at least the part of the computation included in the first range and use the result of executing the computation in the computation for transmission to the first communication device.

Further, the information processing device may execute at least the part of the computation included in the first range, and, in a case where the determination is performed while the computation included in the first range is executed, and the transmission to the first communication device is determined, may use a result of the computation executed before the determination in the computation for the transmission to the first communication device.

Further, the information processing device may execute at least the part of the computation included in the first range, and, in a case where the determination is performed while the computation included in the first range is executed, and the transmission to the first communication device is determined, may use a result of the computation executed before the determination as the result of the computation, which is transmitted to the second communication device.

Further, the information processing device may execute at least the part of the computation included in the first range, and, in a case where the determination is performed while the computation included in the first range is executed, and the transmission to the first communication device is determined, may continue the computation included in the first range and use a result of the computation in the first range as the result of the computation, which is transmitted to the second communication device.

Moreover, in a case where it is determined that the result of the intermediate computation in the series of computations in the deep neural network is transmitted to the first communication device, the information processing device may further transmit the result of at least the part of computation included in the first range among the series of computations, to the second communication device.

Further, in a case where it is determined that the result of the intermediate computation in the series of computations of the deep neural network is transmitted to the first communication device, when all computations included in the first range are not executed, the information processing device may transmit information indicating a position of a result of executing the computation in the series of computations, to the second communication device together with the result of executing the computation.

Further, in a case where it is determined that the result of the intermediate computation in the series of computations of the deep neural network is transmitted to the first communication device, the information processing device may transmit a result of executing the computation and information indicating a position of the result of executing the computation in the series of computations are transmitted, to a third communication device capable of executing at least a part of the series of computations.

Further, in a case where it is determined that the result of the intermediate computation in the series of computations in the deep neural network is transmitted to the first communication device, the information processing device may execute the computation included in the first range up to a predetermined position and use a result of executing the computation in the computation for the transmission to the first communication device.

Further, in a case where it is determined that the result of the intermediate computation in the series of computations of the deep neural network is transmitted to the first communication device, the information processing device may determine to which position of the computation included in the first range is executed, execute the computation included in the first range up to the determined position, and transmit a result of executing the computation and information indicating the determined position to the second communication device.

Further, the information processing device may perform the determination on the basis of at least one of information regarding an available computation capability of a device that handles at least a part of the series of computations in the deep neural network and information regarding a traffic volume in the device that handles at least the part of the series of computations in the deep neural network.

Further, the information processing device may perform the determination on the basis of at least one of communication quality with the first communication device or mobility information of the first communication device.

Further, the information processing device may perform the determination on the basis of at least one of information giving an instruction on an end of the series of computations in the middle or information giving an instruction on transmission of the result of the intermediate computation in the series of computations to the first communication device.

Further, the information processing device may acquire request information from the first communication device, and perform the determination on the basis of the request information.

Further, in a case where a time required for computation of the first range is longer than a given allowable time, the information processing device may determine that the result of the intermediate computation in the series of computations of the deep neural network is transmitted to the first communication device.

Further, the information processing device may determine whether or not a computation included in a first range among a series of computations in a deep neural network is ended in a middle, and, in a case where it is determined that the computation included in the first range is ended in the middle, execute a part of the computation included in the first range, and transmit a result of executing the computation and information indicating a position of the result of executing the computation in the series of computations, to a device that is a computation handler of a second range following the first range.

Further, the information processing device further transmit information indicating whether or not the device that is the computation handler of the second range may end a computation included in the second range in the middle, to the device that is the computation handler of the second range.

According to another aspect of the present disclosure, there is provided an information processing method executed in an information processing device that handles a part of a series of computations in a deep neural network. The information processing method includes a step of determining whether or not to transmit, to a first communication device, a result of an intermediate computation in the series of computations in the deep neural network, a step of, in a case where transmission to the first communication device is not determined, transmitting a result of at least a part of a computation included in a first range among the series of computations to a second communication device that is a computation handler of a second range following the first range, and a step of, in a case where transmission to the first communication device is determined, executing a computation for transmission to the first communication device by using a result of the intermediate computation in the series of computations in the deep neural network, and transmitting a result of executing the computation to the first communication device.

Another information processing method according to the present disclosure includes a step of determining whether or not a computation included in a first range of a series of computations in a deep neural network is ended in a middle, and a step of, in a case where it is determined that the computation included in the first range is ended in the middle, executing a part of the computation included in the first range, and transmitting a result of executing the computation and information indicating a position of the result of executing the computation in the series of computations, to a device that is a computation handler of a second range following the first range.

According to still another aspect of the present disclosure, an information processing system includes at least a first information processing device and a second information processing device that handle a part of a series of computations in a deep neural network. The first information processing device is configured to determine whether or not to transmit, to a first communication device, a result of an intermediate computation in the series of computations in the deep neural network, in a case where transmission to the first communication device is not determined, transmit a result of at least a part of a computation included in a first range among the series of computations, to the second information processing device, and in a case where transmission to the first communication device is determined, execute a computation for transmission to the first communication device by using the result of the intermediate computation in the series of computations of the deep neural network, and transmit a result of executing the computation to the first communication device. The second information processing device is configured to execute a computation after the computation executed by the first information processing device among the series of computations, on the basis of a result of the computation executed by the first information processing device.

The information processing system may further include a third information processing device that determines the first range.

Another information processing system according to the present disclosure includes at least a first information processing device that performs a computation in a first range among a series of computations of a deep neural network and a second information processing device that performs a computation in a second range following the first range among the series of computations of the deep neural network. The first information processing device is configured to determine whether or not a computation included in the first range is ended in a middle, and, in a case where it is determined that the computation included in the first range is ended in the middle, execute a part of the computation included in the first range, and transmit a result of executing the computation and information indicating a position of the result of executing the computation in the series of computations, to the second information processing device. The second information processing device being configured to, when the information is received, execute continuation of the computation executed by the first information processing device in the series of computations on the basis of a result of the computation executed by the first information processing device.

The other information processing system may further include a third information processing device that determines whether or not the computation included in the first range is ended in the middle. The third information processing device may transmit an instruction to end the computation included in the first range in the middle to the first information processing device, and the first information processing device may determine that the computation included in the first range is ended in the middle, in a case where the instruction is received.

BRIEF DESCRIPTION OF DRAWINGS

FIG. 2 is a diagram for describing a DNN.

FIG. 6 is a diagram illustrating an effect of the distribution of the computation of the DNN.

FIG. 7 is a diagram of a network topology in an IAB network used for simulation.

FIG. 8 is a diagram illustrating variations in communication capacity for simulation.

FIG. 11 is a diagram for describing a Splitting mode.

FIGS. 13A and 13B are diagrams illustrating an example of the Splitting mode for each communication route.

FIGS. 15A and 15B are diagrams illustrating an example of a condition for determining a handling range of a communication terminal.

FIG. 16 is a diagram illustrating an example of a computation result transmitted from the communication terminal in a case where the communication terminal determines an own handling range.

FIG. 25 is a conceptual diagram for describing multi-feedback.

MODE FOR CARRYING OUT THE INVENTION

First Embodiment

Figure 1:
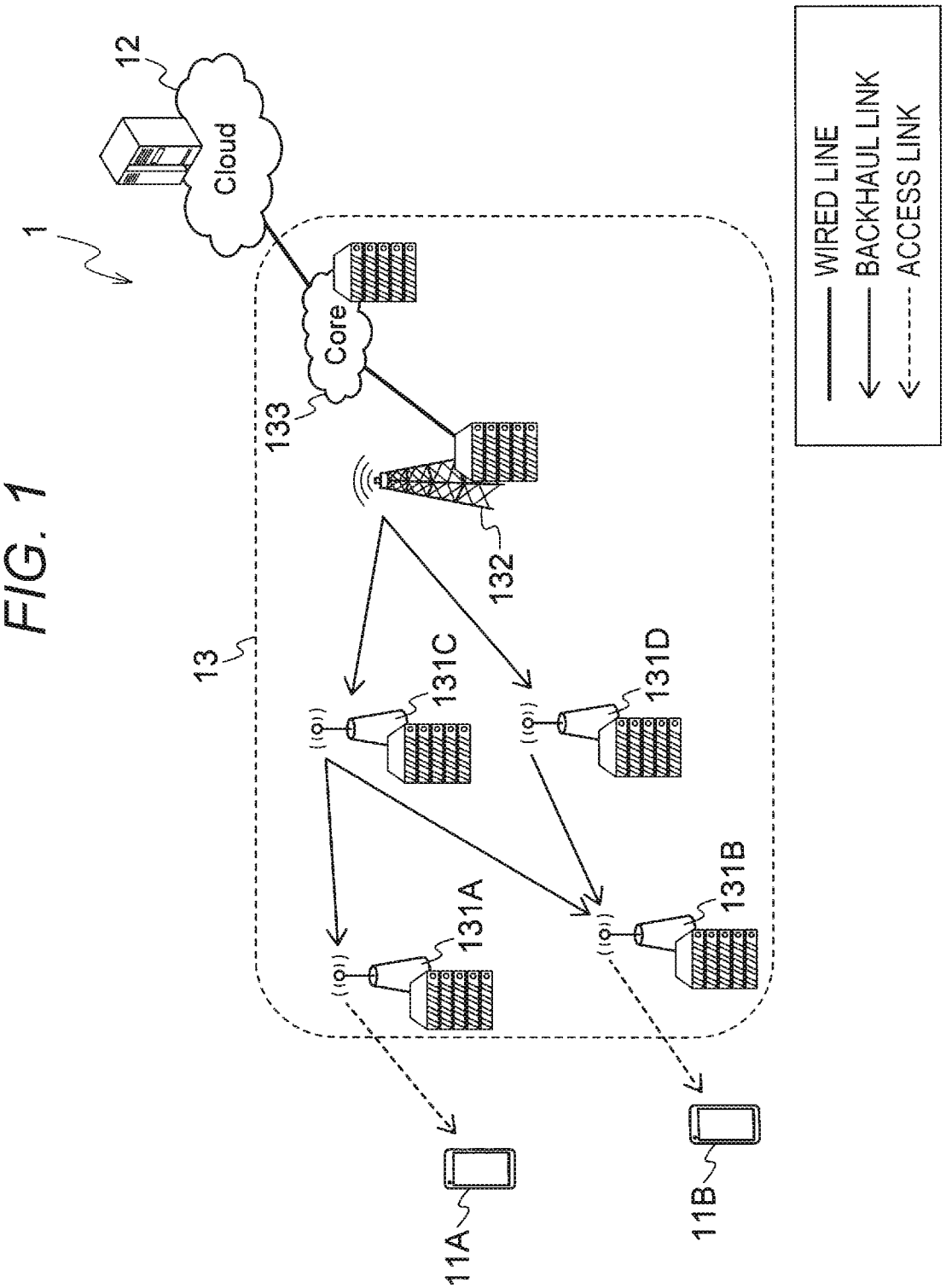
FIG. 1 is a diagram illustrating a configuration example of an information processing system according to an embodiment of the present disclosure.

Hereinafter, embodiments of the present disclosure will be described in detail on the basis of the drawings. FIG. 1 is a diagram illustrating a configuration example of an information processing system according to a first embodiment of the present disclosure. An information processing system 1 according to the first embodiment includes a communication terminal 11, a cloud system (Cloud) 12, and a communication network 13. Note that, regarding the reference signs, it is assumed that the same type of objects is denoted by the same numbers, as with 11A and 11B illustrated in FIG. 1, and the objects are distinguished from each other by an alphabet. Furthermore, in the present description, in a case where it is not particularly necessary to distinguish objects from each other, alphabets of the reference signs are not described.

The information processing system 1 is a system for operating an application using a deep neural network (DNN) learned by machine learning (ML). The application will be described as an ML application below.

The communication terminal 11 is also an information processing device capable of activating an ML application, and corresponds to a smartphone, a laptop, or the like. For example, it is assumed that an ML application is installed on a smartphone and a user of the smartphone activates the ML application. In addition, the shape of the communication terminal 11 is not particularly limited. For example, a wearable terminal like glasses may be used. In addition, a robot of which an operation is controlled by the ML application also corresponds to the communication terminal 11. The cloud system 12 includes one or more information processing devices that are called cloud servers and have performance higher than the communication terminal 11, and provides services usable by the communication terminal 11. The communication network 13 includes a plurality of communication nodes, and relays communication between the communication terminal 11 and the cloud system 12. Note that the communication node is also referred to as a communication base station.

Note that FIG. 1 illustrates an example in which the communication network 13 includes a wireless communication network. In the example of FIG. 1, an example using an integrated access and backhaul (IAB) network used for wireless communication of the fifth generation mobile communication system (5G) is illustrated. The communication terminal 11 is illustrated as a wireless communication terminal, and the communication network 13 includes a wireless communication node 131 capable of establishing a wireless communication connection with the communication terminal 11, a donor node 132 that is a higher node of one or more wireless communication nodes 131, and a core network 133 that performs wired communication between the donor node 132 and the cloud system 12. As illustrated in FIG. 1, it is preferable that the communication network 13 include a wireless communication network having unstable communication quality compared to wired communication because an effect to be described later is larger than that in the related art. However, all the communication in the information processing system 1 may be wired communication, and the wireless communication network that may be included in the communication network 13 is not limited to the IAB network.

FIG. 2 is a diagram for describing a DNN. A network surrounded by a dotted frame 2 in FIG. 2 corresponds to a DNN. The DNN includes a plurality of nodes 21 and a link 22 connecting the nodes 21 to each other. In addition, as illustrated in FIG. 2, the plurality of nodes 21 is divided into a node group arranged in a vertical line, and the node group is referred to as a layer (hierarchy). In the example of FIG. 2, the DNN includes seven layers, but the DNN may include three or more layers.

A computation of the DNN is performed for each node 21. For example, in FIG. 2, image information is input to each node 21 of a first layer called an input layer, and the computation is performed in each node 21 of the first layer. Computation results are transmitted to each node 21 of a second layer via the link 22, and a computation is also performed in each node 21 of the second layer. In this manner, the computation is performed from the input layer, and the final computation result is output from the node of the last layer called an output layer. Then, an object shown in the input image is determined as a cat on the basis of the output computation result.

Note that, although FIG. 2 illustrates an example of image recognition, the usage and the like of the ML application are not particularly limited. For example, in addition to image recognition, augmented reality (AR), virtual reality (VR), mixed reality (MR), and the like, which are collectively referred to as xR, may be performed. In addition, automated driving, robotics, voice recognition, and the like can be realized by using the DNN, and the ML application may relate to such usages. Furthermore, the implementation environment of the ML application is not particularly limited, and may be used in a system such as a digital twin or a Tactile internet.

The smartphone or the like corresponding to the communication terminal 11 generally has lower specifications than the cloud server. Therefore, in a case where the communication terminal 11 is caused to perform all processes of the ML application, particularly the computation of the DNN as it is (In device learning), the computation time until completion becomes long. In other words, a large computation delay occurs. However, due to the specification of the ML application, there may be a case where it is required to keep the time required for executing the ML application within a predetermined allowable limit, and there is a possibility that, if the communication terminal 11 is left to perform the entirety of the computation of the DNN, the computation delay exceeds the allowable limit.

On the other hand, in a case where the computation of the DNN is performed not by the communication terminal 11 but by the cloud system 12 (cloud learning), the time required for communication, in other words, a communication delay becomes a problem. For example, in a rescue robot or the like that searches for disaster victims while performing image capturing, power consumption is reduced by causing the cloud server to execute the computation that excessively consumes power. However, it is necessary to transmit necessary data from the robot to the cloud server, and there is a possibility that the sum of a communication delay and a computation delay exceeds the allowable limit of the ML application by increasing the communication delay due to the necessary data. In addition, there is a possibility that the bandwidth is suppressed by this data transmission, and other communications are affected.

Therefore, the information processing system 1 determines a plurality of computation handlers from the communication terminal 11, the cloud system 12, and the communication network 13, and causes the plurality of computation handlers to process a series of computations on the basis of the DNN in a distributed manner. Such processing is also referred to as distributed learning. Here, the computation handler refers to an entity that handles at least a part of the computation of the DNN.

Figure 3C:
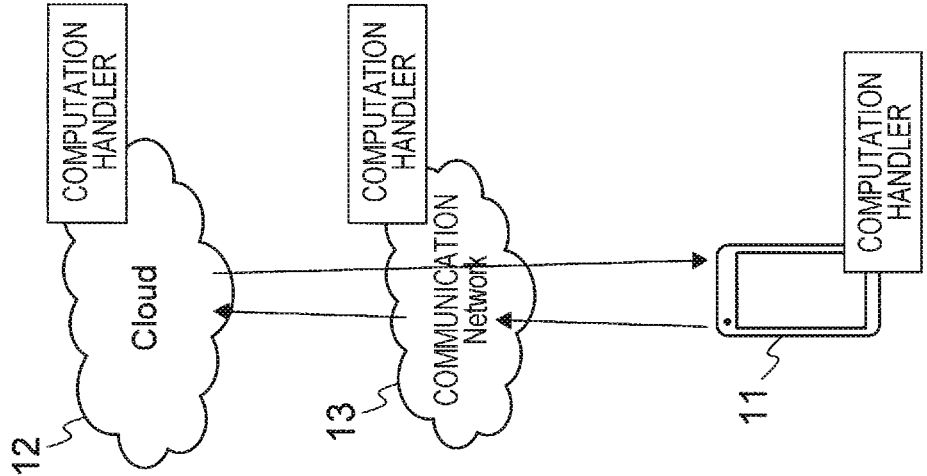
FIGS. 3A, 3B, and 3C are diagrams for describing distribution of a computation of the DNN.
Figure 3B:
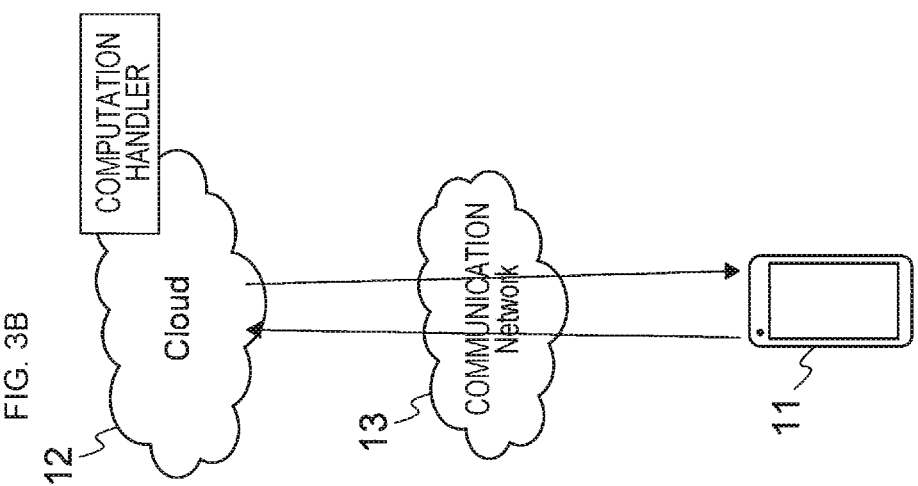
Figure 3A:
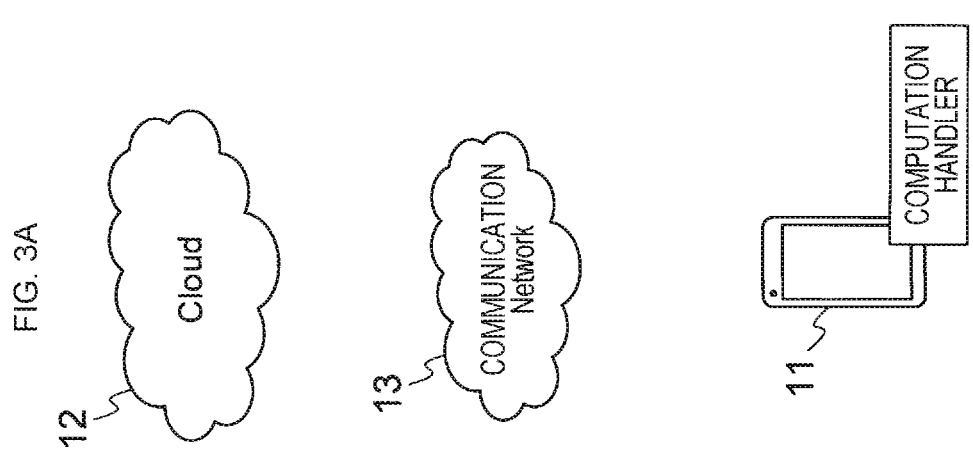

FIGS. 3A, 3B, and 3C are diagrams for describing distribution of the computation of the DNN. FIGS. 3A and 3B illustrate examples of federated learning that is not distributed learning. FIG. 3C illustrates an example of distributed learning.

In the example of FIG. 3A, only the communication terminal 11 is the computation handler, and the communication terminal 11 performs the computation of the DNN (In device learning). As described above, since data is not transmitted to the communication network 13, a communication delay does not occur, but a computation delay due to a low computation capability of the communication terminal 11 becomes a problem. On the other hand, in the example of FIG. 3B, only the cloud system 12 performs the computation of the DNN (Cloud learning), and the communication terminal 11 transmits information required for the computation to the cloud system 12 and receives a computation result from the cloud system 12. The communication terminal 11 does not need to have such a high computation capability, and is excellent in that the computation delay in the cloud system 12 is small, but a communication delay between the communication terminal 11 and the cloud system 12 becomes a problem.

On the other hand, in the example of FIG. 3C, the communication terminal 11, the cloud system 12, and the communication network 13 each handle a part of the computation of the DNN. In other words, the communication network 13 also provides computation power for the ML application executed in the communication terminal 11. Since the cloud server having a high computation capability in the cloud system 12 handles a part of the computation of the DNN, it is possible to suppress the computation delay as compared with a case where only the communication terminal 11 performs the computation of the DNN. In addition, in the example of FIG. 3C, transmission data from the communication terminal 11 is received and processed by the communication network 13, and then transmitted to the cloud system 12. If transmission data from the communication network 13 to the cloud system 12 can be made smaller than the transmission data from the communication terminal 11, the communication time becomes shorter. Thus, it is possible to reduce the communication delay as compared with the case of FIG. 3B in which only the cloud system 12 performs a computation. Therefore, there is a possibility that the sum of the computation delay that is the time required for each communication handler to compute the DNN and the communication delay that is the time required for each communication handler to perform communication of information necessary for computing the DNN is shorter than that in the case of FIG. 3B.

As described above, in the present embodiment, by processing the series of computations of the DNN in a distributed manner, the time required for executing the ML application, more specifically, the time from when the input to the DNN is performed until the output from the DNN is obtained is suppressed within a predetermined allowable limit. Note that, the time required for executing the ML application is referred to as an execution delay below.

Moreover, in a case where the communication network 13 is determined to be a computation handler, one or more communication nodes in the communication network 13 are further determined to be the computation handler. Note that the wireless communication node 131 and the donor node 132 described above correspond to communication nodes. In addition, there is also a communication node in the core network 133, and the communication node in the core network 133 may also be selected as the computation handler.

For example, the DNN in FIG. 2 has seven layers, but it is illustrated that the communication terminal 11 handles the first and second layers, the wireless communication node 131 handles third and fourth layers, and the cloud system 12 handles fifth to seventh layers. In this case, the communication terminal 11 transmits a computation result in the second layer to the wireless communication node 131, and the wireless communication node 131 performs computations of the third layer and the fourth layer from the computation result in the second layer and transmits the computation result of the fourth layer to the cloud system 12. Then, the cloud system 12 performs computations of the fifth layer to the seventh layer from the computation result in the fourth layer. Note that the cloud system 12 may transmit the computation result of the seventh layer to the communication terminal 11 as a response, and the communication terminal 11 may determine that the input is an image cat, on the basis of the computation result of the seventh layer. Alternatively, the cloud system 12 may determine that the input is an image cat on the basis of the computation result of the seventh layer, and transmit the determination result to the communication terminal 11 as a response.

Note that there are various types of DNNs such as a convolutional neural network (CNN), and it is assumed that the ML application uses a DNN that can be shared and computed for each layer as described above.

Note that, in the present embodiment, the parameters of the DNN may be updated or may not be updated. That is, the DNN may have already completed learning, and the parameters of the DNN may be set not to be updated. Alternatively, a correct answer may be received from the user of the communication terminal 11 via the ML application, and learning may be executed on the basis of the correct answer. However, in a case where learning is executed and the DNN is updated, it is assumed that the new updated DNN is distributed to the computation handler in order to prevent an occurrence of a situation in which the DNN to be used differs depending on the computation handler.

Note that, in a case where the communication node is determined to be a computation handler, an infrastructure for performing communication in the communication node may be actually caused to execute a computation. Alternatively, a server that executes a computation may be provided in the communication node. Note that an information processing device that serves as a substitute for a part of a cloud service from a place (also referred to as an edge) closer to a user than a cloud service such as a communication node is generally referred to as an edge server.

Note that the computation of the DNN is not limited to being distributed to each of the communication terminal 11, the cloud system 12, and the communication network 13. Depending on an application, it is also possible to complete the computation of the DNN in the communication network 13 without using the cloud system 12. In this case, since the total distance of a communication route becomes shorter, it is possible to further reduce the communication delay. Furthermore, there may be a case where the communication terminal 11 does not compute a DNN, and the computation of the DNN is distributed to the cloud system 12 and the communication network 13. Alternatively, in a case where a communication terminal 11 that is connected to the communication network 13 and has a large available computation capability is found separately from the communication terminal 11 that has executed the ML application, the found communication terminal 11 may handle a part of the computation of the DNN after the approval of the found communication terminal 11 is obtained. In addition, it may be determined in advance that at least one of the communication nodes existing on a communication route between the communication terminal 11 and the cloud system 12 is set to be the computation handler.

Note that the cloud system 12 is not limited to being the last computation handler. In some cases, the cloud system 12 may perform a computation first, and the communication network 13 may take over the computation of the cloud system 12.

In a case where a series of computations of the DNN is distributed and processed, it is also important to how to determine a computation range caused to be handled by the computation handler, in other words, a handling range. In still other words, where to separate the series of computations of the DNN is also important. A place where the DNN is separated is also referred to as a Splitting point. In the example of FIG. 2, the Splitting point is set between the second layer and the third layer and between the fourth layer and the fifth layer, and the DNN is separated into three ranges.

Figure 4:
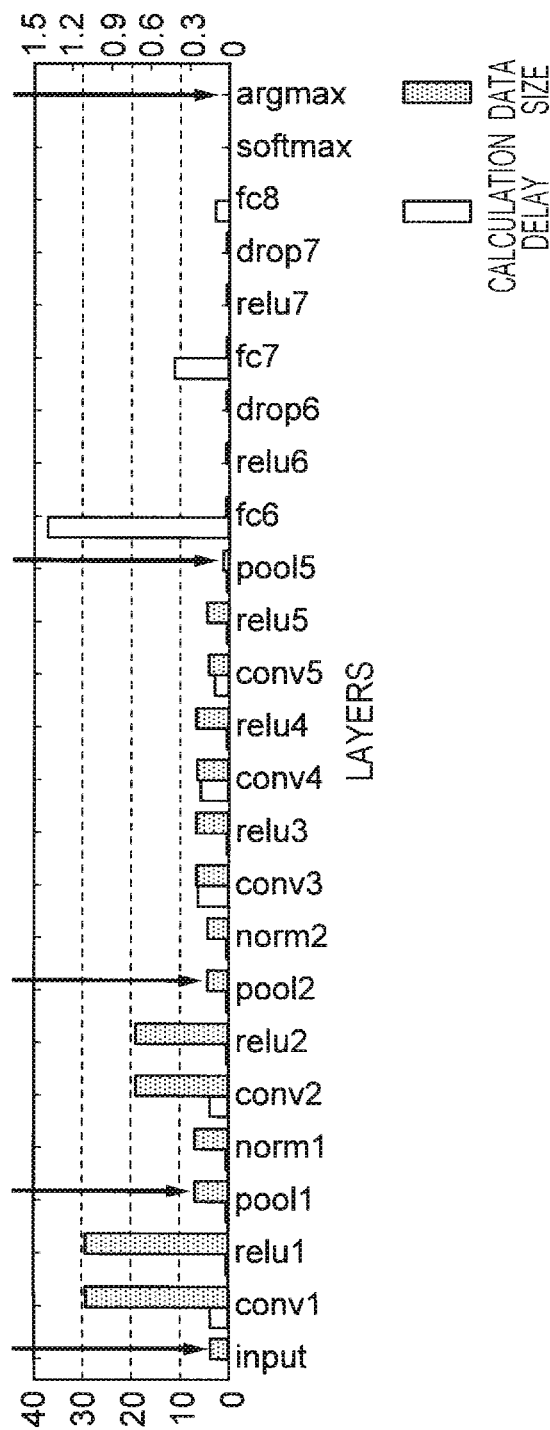
FIG. 4 is a diagram for describing a difference in a delay and an output data amount according to a Splitting point.

FIG. 4 is a diagram for describing a difference in a delay and an output data amount according to a Splitting point. The dotted bar graph in FIG. 4 indicates the amount of data to be output in a case where a computation is performed from the input layer to a layer corresponding to the bar graph. According to FIG. 4, it is understood that the amount of data output from each layer is not uniform, and it is preferable not to separate the DNN in a layer that outputs a large amount of data because the communication delay does not increase. In addition, the white bar graph in FIG. 4 indicates a computation delay in the layer corresponding to the bar graph. For example, since the white bar graph corresponding to the layer named "fc6" is high, it is understood that the computation of the layer of fc6 takes time. Therefore, it is understood that the computation of the layer of fc6 is preferably caused to be handled by a device having a high computation capability.

As described above, the computation delay and the communication delay vary depending on the handling range. Therefore, in determining the computation handler, it is preferable to determine the handling range of each computation handler.

However, even though the delay of the ML application is successfully suppressed by sharing the computation of the DNN, the delay may increase due to a change in the situation of the information processing system 1. For example, the available computation capability of the computation handler is not always constant, so that the computation delay varies. In addition, in a case where the communication network 13 includes a wireless communication network, the quality of a wireless communication link varies frequently, and thus the communication delay is likely to vary. Further, in a case where the communication terminal 11 is portable, the communication route and the like are also changed by the movement of the communication terminal 11. Furthermore, there may also be variations in network topology. Such a change in the situation may cause the execution delay of the application to exceed the allowable limit although the execution delay was initially within the allowable limit.

For example, the above-described IAB network is intended for integration of a backhaul link and an access link, and not only the access link but also the backhaul link is a wireless line. Therefore, the state of the communication link is likely to change. Therefore, in a case where the communication network 13 in the present embodiment includes the IAB network, the communication delay is likely to vary, and if the initial computation handler and handling range are maintained, there is a possibility that the execution delay becomes worse than a case where the computation of the DNN is not distributed.

Therefore, in the present embodiment, the distribution is dynamically changed on the basis of the situation of the information processing system 1. More specifically, a computation handler, a handling range, a communication route between computation handlers, and the like are changed on the basis of a situation of computation handler candidates that may be the computation handler and a state of a communication link between the computation handler candidates.

Note that, in the IAB network, a communication node in this network performs relay communication. This makes it possible to secure a communicable region (coverage) even in millimeter wave communication. In addition, since the backhaul link and the access link are made perpendicular to each other at the physical layer level by using not only conventional time division multiplexing (TDM) but also frequency division multiplexing (FDM) or space division multiplexing (SDM), it is possible to perform efficient communication as compared with relay communication in a relatively high communication layer such as Layer 3. Further, in the IAB network, in particular, communication using millimeter waves is assumed. Thus, it is possible to improve the coverage problem in millimeter wave communication by using relay communication such as the IAB network, and to efficiently expand the coverage. In the IAB network, multi-hop communication is also assumed, and development to a mesh type is also assumed in the future.

Note that the IAB network is not limited to millimeter wave communication. For example, the IAB network can also be applied to Vehicle tethering in which an IAB node is mounted on a vehicle, a Moving cell in which an IAB node is mounted on a train, a Drone cell in which an IAB node is mounted on a drone, and the like. In addition, application to communication for Internet of things (IoT) is also assumed. In particular, the IAB network can also be applied to wearable tethering communication for connecting a smartphone and a wearable device. In addition, the IAB network can also be applied to fields such as medical care and factory automation. The IAB network is applied to the present embodiment in a similar manner.

Figure 5B:
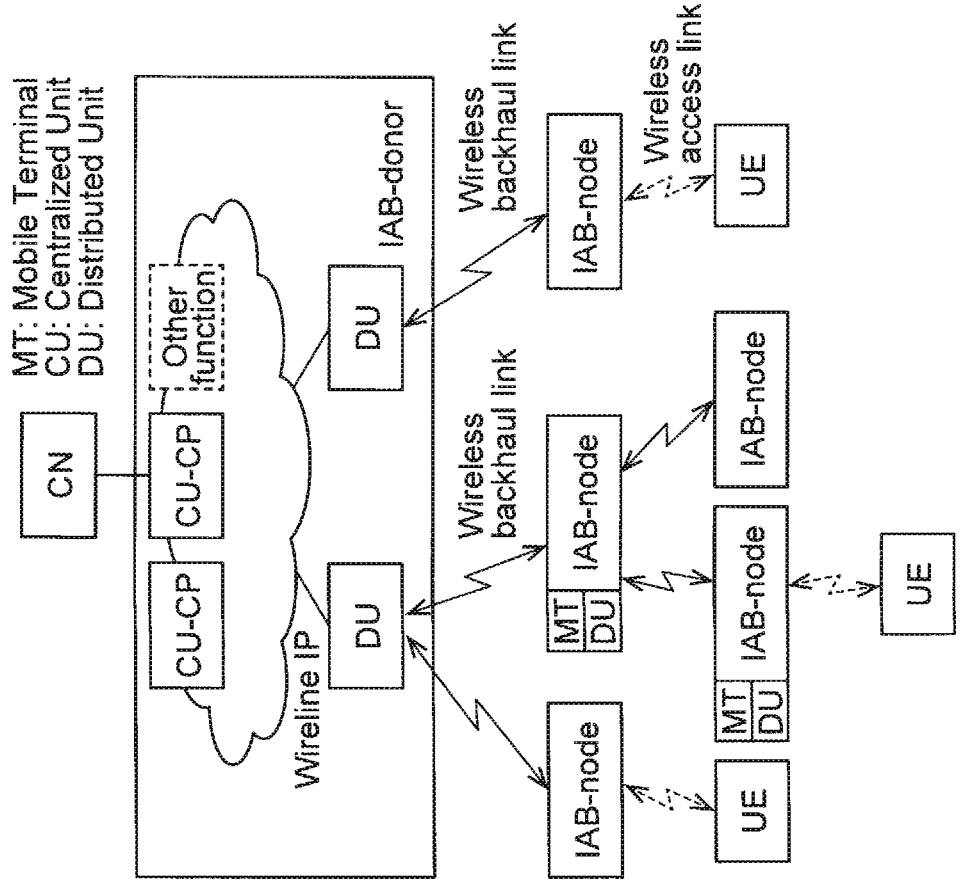
FIGS. 5A and 5B are diagrams illustrating an example of an architecture of an IAB network.
Figure 5A:
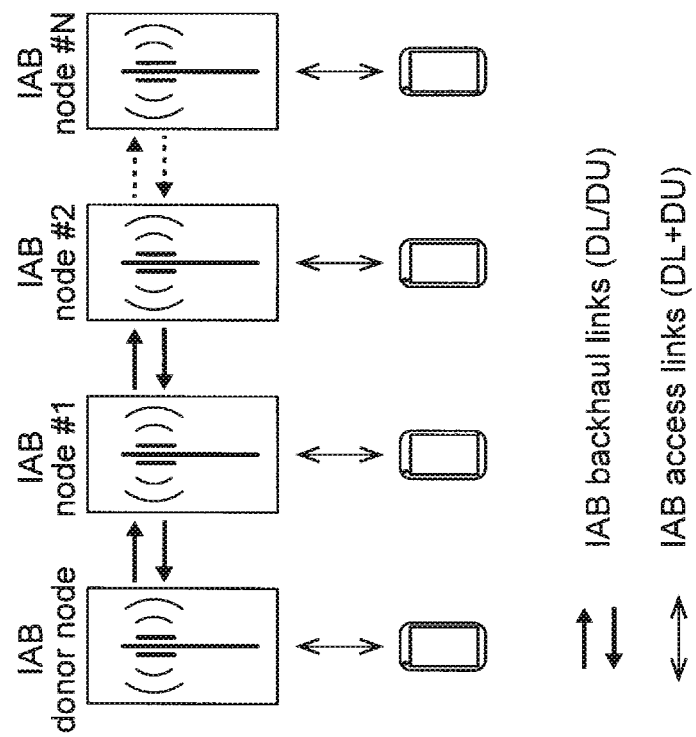

Note that a known architecture may be used as the architecture of the IAB network. FIGS. 5A and 5B are diagrams illustrating an example of the architecture of the IAB network. As illustrated in FIG. 5A, a communication node such as a next generation node B (gNB) is assumed as an IAB-donor corresponding to the donor node 132. There are IAB-nodes that correspond to the wireless communication node 131 and relay nodes under control of the IAB-donor, and the IAB-nodes are wirelessly connected to each other while forming a plurality of multi-hops. Each IAB-node is connected to user equipment (UE) corresponding to the communication terminal 11 via an access link. The IAB-node may be connected with a plurality of IAB-nodes in order to improve redundancy of the backhaul link. The IAB-node includes a function (MT) as UE and a function (DU) as a communication node. That is, when downlink (DL) reception and uplink (UL) transmission are performed by using the backhaul link, the IAB-node operates as MT. When DL transmission and UL reception are performed, the IAB-node operates as DU. Since the IAB-node is viewed as a general base station from the UE, even though the UE is a legacy terminal, it is possible to connect the UE to the IAB network as illustrated in FIG. 5B. Note that not only a combination of MT and DU but also a combination of MT and MT may be used.

Effects of distribution and dynamic change of the computation of the DNN will be described. FIG. 6 is a diagram illustrating an effect of the distribution of the computation of the DNN. The bar graph in (1) indicates an execution delay in a case where the communication terminal 11 alone has executed the computation of the DNN. The bar graph of (2) indicates an execution delay in a case where the communication terminal 11 and the cloud server in the cloud system 12 have executed the computation of the DNN. The bar graph of (3) indicates an execution delay in a case where the communication terminal 11 and a multi-access edge computing (MEC) server that is a type of edge server and is included in the communication node in the communication network 13 have executed the computation of the DNN. The bar graph of (4) indicates an execution delay in a case where the communication terminal 11, the MEC server, and the cloud server have executed the computation of the DNN. In addition, a dotted portion of the bar graph represents a computation delay, and a white portion represents a communication delay.

Note that a commercially available laptop is used as the communication terminal 11, a server in which a central processing unit (CPU) is 3800X of Ryzen (registered trademark) and a memory is 32 gigabytes (GB) is used as the MEC server, and a server in which the CPU is Core i9-9900 of Intel (registered trademark) and the memory is 128 GB is used as the cloud server. The computation delay of the cloud server is set to be shorter than the computation delay of the MEC server. In addition, the communication capacity between the communication terminal 11 and the MEC server was set to 100 Mbps (Mega bit per second), and the communication capacity between the MEC server and the cloud server was set to 30 Mbs. Note that Residual Network (ResNet) 18, which is a type of convolutional neural network, was used as the DNN.

As illustrated in FIG. 6, in the case of (1), although there is no communication delay, the execution delay is 212 milliseconds (ms), which is the longest. In the case of (2), the communication delay is long. In the case of (3), the communication delay is suppressed because the MEC server is close to the communication terminal 11, but the computation delay is long because the MEC server has a computation capability lower than the cloud server. Therefore, the execution delay is longer than that in the case of (2). On the other hand, in the case of (4), the computation delay is longer than that in a case where the cloud server executes all computations of the DNN, and the communication delay is longer than that in a case where the MEC server executes all the computations of the DNN, but the computation delay is shorter than that in a case the MEC server executes all the computations of the DNN, and the communication delay is shorter than that in a case where the cloud server executes all the computations of the DNN. In the case of (4), the execution delay is 53 ms, which is the shortest.

As described above, it is understood that the execution delay may be reduced by also using the communication nodes in the communication network 13 to distribute the computation of the DNN. Note that, as illustrated in FIG. 4 described above, since the computation delay and the communication delay vary depending on the handling range, the simulation result in FIG. 6 may also vary depending on the handling range. That is, although the execution delay in the case of (4) above may be longer than that in the cases of (1) to (3) above depending on the handling range, the execution delay in the case of (4) above can be made shorter than that in the cases of (1) to (3) above by appropriately determining the handling range.

In addition, the effect of dynamically changing the distribution of the computation of the DNN is also shown. FIG. 7 illustrates a diagram of a network topology in the IAB network used for the simulation. A network in the example of FIG. 7 is configured by 10 nodes. The 10 nodes are wireless communication nodes 131A to 131F of the IAB network, a donor node 132 of the IAB network, communication nodes 1331A and 1331B of the core network 133, and a cloud server 121. Note that the specifications of the wireless communication nodes 131A to 131F are the same as those of the MEC server used when the effect of distribution of the computation of the DNN in the example of FIG. 6 is shown. The specifications of the donor node 132, the communication nodes 1331A and 1331B, and the cloud server 121 are the same as those of the cloud server used when the effect of the distribution of the computation of the DNN is shown. In addition, the access link and the backhaul link in the IAB network share the communication capacity of 4 gigabit per second (Gbps). A communication link between the donor node 132 and the communication node 1331A is a wired link of 1 Gbps. A communication link between the communication nodes 1331A and 1331B is a wired link of 400 Mbps, and a communication link between the communication node 1331B and the cloud server 121 is a wired link of 100 Mbps.

In addition, it is assumed that commercially available laptop is used as the communication terminal 11, and the communication terminal 11 has moved as indicated by the arrow in FIG. 7. The communication terminal 11 is first connected to the nearest wireless communication node 131F, but the wireless communication node 131 to be connected is switched as the communication terminal 11 moves. Therefore, a communication route to the cloud server 121 is also switched. Therefore, each time the communication route is switched, the computation handler and the handling range are determined, and the computation of the DNN is caused to be executed.

In addition, in order to simulate the variation of the wireless communication link, the variation of the communication capacity for simulation is defined. FIGS. 8A and 8B are diagrams illustrating variations in the communication capacity for the simulation. FIG. 8A illustrates a variation in the communication capacity of an access link between the communication terminal 11 and the wireless communication node 131 in FIG. 7. FIG. 8B illustrates a variation in the communication capacity between the wireless communication nodes 131 in FIG. 7. In the example of the access link, the communication capacity varies from 200 Mbps to 800 Mbps over time. Using this link variation, an influence of the delay due to the variation of the wireless communication link was simulated.

Figure 9B:
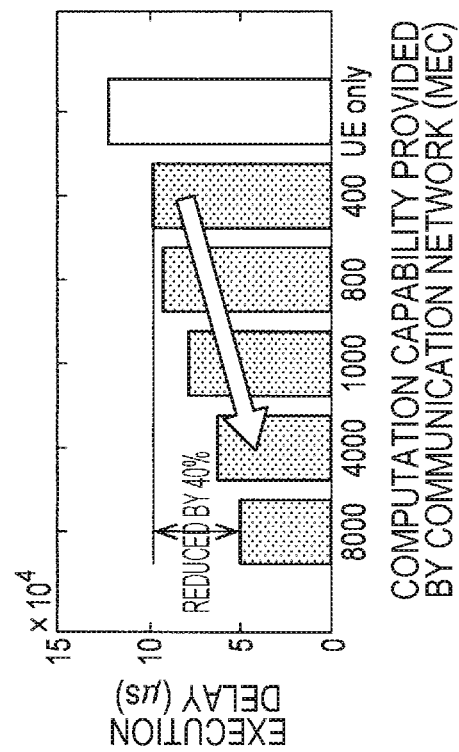
FIGS. 9A and 9B are diagrams illustrating an influence of a resource of a communication network on an execution delay.
Figure 9A:
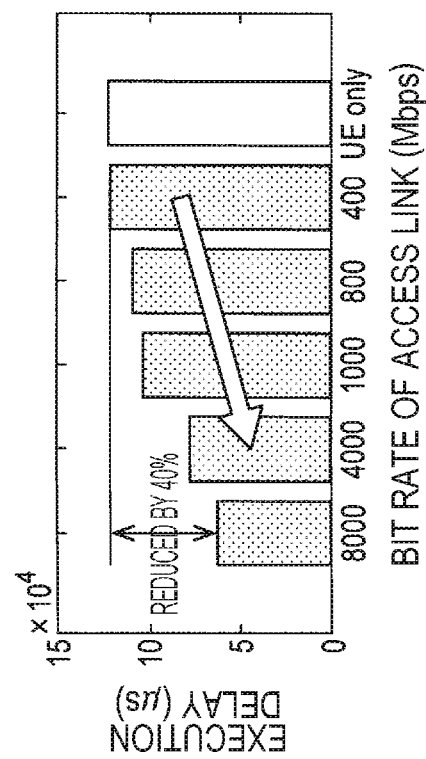

FIGS. 9A and 9B are diagrams illustrating the influence of a resource of the communication network 13 on the execution delay. FIG. 9A illustrates a relationship between the communication capacity and the execution delay between the communication terminal 11 and the IAB node. The bar graph in FIG. 9A represents the execution delay, and the left bar graph having larger communication capacity of the wireless communication link has a shorter execution delay. That is, as the communication capacity of the wireless communication link increases, the execution delay is improved. Conversely, in a case where the quality of the wireless communication link deteriorates and the communication capacity decreases, the execution delay also increases at the same time. Since the quality of the wireless communication link is likely to vary, when the computation of the DNN is distributed, it is necessary to change the setting for distribution in consideration of the quality of the wireless communication link. In addition, FIG. 9B illustrates a relationship between the available computation capability of the IAB node as the computation handler and the execution delay. Also in FIG. 9B, the left bar graph having a larger available computation capability has a shorter execution delay, and the reduction in the delay amount can be expected as the available computation capability of the IAB node increases. In addition, as illustrated in FIGS. 9A and 9B, the computation delay in each layer of the DNN is also different. Thus, it is necessary to determine the handling range according to the variation in the available computation capability of the IAB node.

As described above, the resources of the communication network 13, such as the quality of the communication link and the available computation capability of the communication node, have an influence on the execution delay, but may vary with time by a change in network topology, a change in application requirements, and the like. Thus, the distribution of the computation of the DNN is dynamically changed following the variations. That is, it is preferable to dynamically change the computation handler, the handling range, the communication route, and the like in consideration of the quality of the communication link and the situation of the available computation capability of each computation handler.

A series of processes for distributing and dynamically changing the computation of the DNN will be described. First, examples of a key performance indicator (KPI), a control target, and information to be used, which are required for implementing distribution of the DNN, will be described below.

As described above, the KPI is the execution delay of the ML application. The execution delay of the ML application includes at least a computation delay in each computation handler and a communication delay between computation handlers. Note that the sum of each computation delay and each communication delay may be regarded as the execution delay without considering a delay due to processing performed from the reception of the computation result from the previous computation handler to the start of the computation of the own handling range.

The control target is assumed to be routing, the DL/UL configuration in each communication node, a Splitting point of the DNN, and the like.

As the information to be used, the processing capability of each computation handler candidate, the state of each wireless communication link, the required specifications of the ML application, the required specifications of the communication network 13, the movement state (mobility) of the communication terminal 11, and the like are assumed. Note that the computation handler candidate is the communication terminal 11, the cloud system 12, and the communication node in the communication network 13, but it may be determined in advance whether or not the communication terminal 11 and the cloud system 12 are set to be the computation handler. In this case, the communication terminal 11 and the cloud system 12 may be excluded from the computation handler candidates.

As the processing capability of each computation handler candidate, a computation capability (Capacity), a current available computation capability, and the like are assumed. For example, first, the computation handler may be assigned to the computation handler candidate having the highest computation capability among the computation handler candidates belonging to the communication network 13. In a case where the available computation capability of the computation handler decreases to a predetermined threshold value or less, the handler may be changed to another computation handler candidate having sufficient available computation capability. As described above, the computation handler may be changed on the basis of the available computation capability of the computation handler.

As the state of the communication link, the communication capacity, the communication quality, and the like can be considered. Note that, in the case of the IAB network, the state of the communication link includes states of the backhaul link and the access link.

As the required specifications of the ML application, an allowable limit of the execution delay of the ML application, in other words, an upper limit value of the execution delay allowed by the ML application is assumed. In addition, upper limit values individually allowed may be determined for the communication delay and the computation delay.

As the required specification of communication, an upper limit value of traffic in each link is assumed. In addition, an upper limit value of traffic on a route set between the communication terminal 11 and the cloud system 12 may be set. The upper limit values may be determined on the basis of the required specifications of the ML application and the Splitting point of the DNN. The movement state of the communication terminal 11 only needs to be information regarding the movement, such as a moving speed, a moving direction, and a moving pattern.

Next, a subject that determines the computation handler and the handling range will be described. Any device belonging to the information processing system 1 may determine the computation handler and the handling range and is not particularly limited. That is, the subject that determines the computation handler and the handling range can be appropriately determined. Note that, in a case where the devices belonging to the information processing system 1, such as the communication terminal 11, the communication node, and the cloud server, are not distinguished from each other, the devices are described as entities, and the subject that determines the computation handler and the handling range is described as a logical entity.

For example, a logical entity may be made by implementing a communication node of the communication network 13, a server that performs the determination, or the like in the cloud system 12. Alternatively, a logical entity may be made by implementing a module that makes determination of the computation handler and the handling range in an infrastructure for performing communication in the communication node.

However, in order to determine the computation handler and the handling range, it is preferable to normally recognize a state of resources of the information processing system 1, and it is preferable that a device existing at a position suitable for communication for this purpose be a logical entity.

In addition, one logical entity may determine both the computation handler and the handling range, or may be divided into a logical entity that determines the computation handler and a logical entity that determines the handling range.

The resources of the information processing system 1 include available computation capabilities of computation handler candidates belonging to the information processing system 1, communication capacity of a communication link in the communication network 13, communication quality, and the like.

As the change in the communication environment, for example, changes in quality of a communication link, available computation capability of a communication node, a network topology, a communication route, and the like are assumed.

Figure 10:
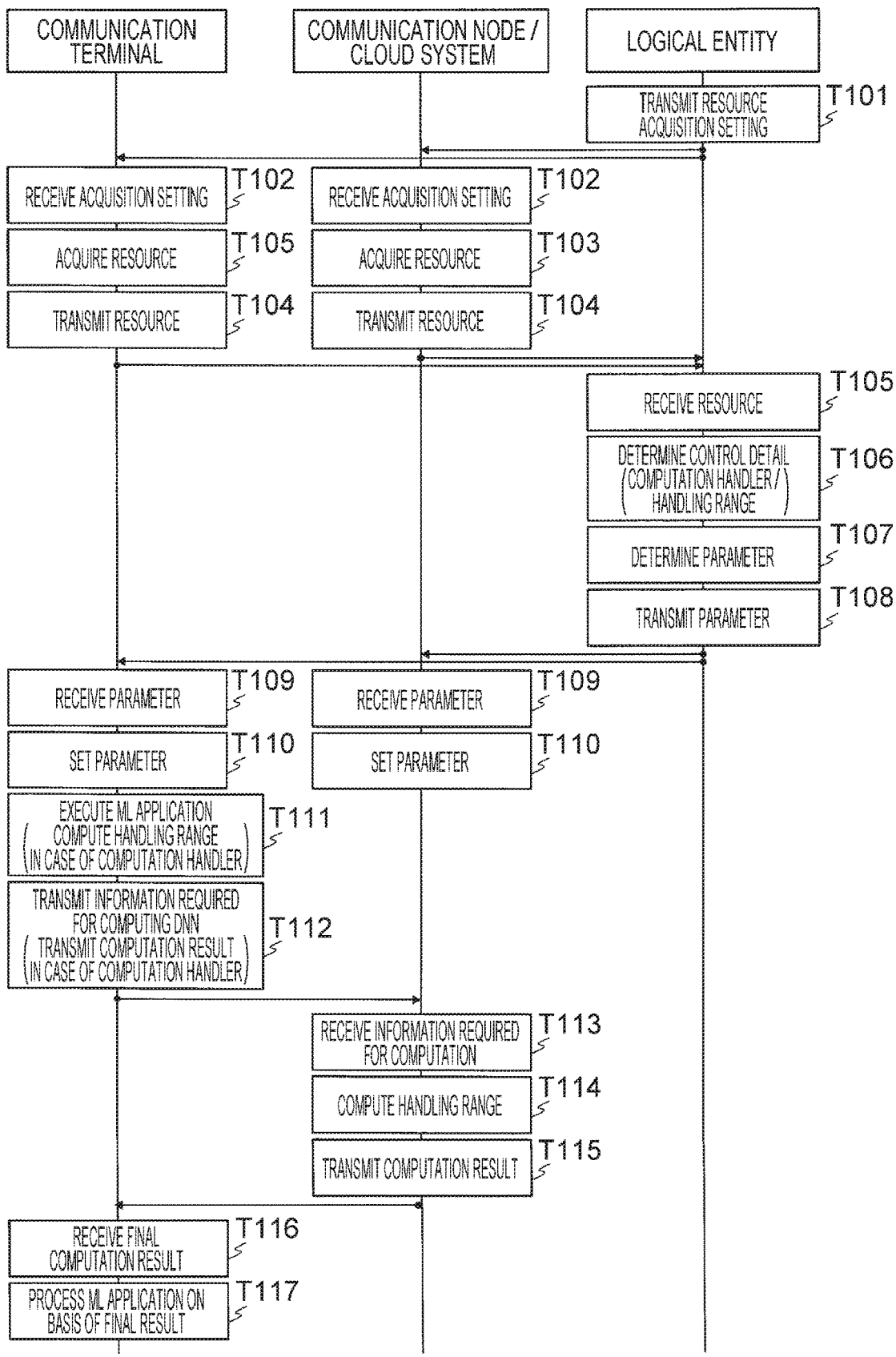
FIG. 10 is a schematic sequence diagram illustrating a flow of overall processing in the present embodiment.

A flow of processing in the present embodiment will be described. FIG. 10 is a schematic sequence diagram illustrating the flow of overall processing in the present embodiment. Note that, in FIG. 10, the communication node and the cloud server are illustrated as a set for convenience of description.

In addition, although not illustrated, it is assumed that the entity of the information processing system 1 includes components that handles each process. In the present description, the logical entity includes a reception unit, a transmission unit, and a determination unit. In addition, the computation handler candidate such as the communication terminal 11, the communication node, and the cloud server includes a reception unit, a transmission unit, an acquisition unit (measurement unit), a setting unit, and a computation unit. The subjects of the respective processes in FIG. 10 are set to the above components.

The transmission unit of the logical entity transmits a setting related to acquisition and transmission of information such as resources of the information processing system 1 used for determining the computation handler and the like, to each entity such as the communication terminal 11, the communication node, and the cloud server (T101, Measurement configuration). The reception unit of each entity receives the acquisition setting from the logical entity (T102). The acquisition unit of each entity acquires information regarding the resource on the basis of the setting (T103). The transmission unit of each entity transmits the information regarding the resource, which has been acquired on the basis of the setting, to the logical entity (T104).

The reception unit of the logical entity receives the information regarding the resource from each entity (T105). The determination unit of the logical entity determines the control details of each entity such that the execution delay of the ML application falls within the allowable limit (T106). As described later, whether or not to be assigned as the computation handler is determined as the control details. Furthermore, the determination unit of the logical entity determines values of parameters set for the communication terminal 11 and the communication node, in other words, setting values, in order to realize the determined control details (T107, Parameter configuration). The transmission unit of the logical entity transmits the determined setting values to the communication terminal 11 and the communication node (T108).

The reception unit of each entity receives the setting values from the logical entity (T109). The setting unit of each entity sets the parameters for operating each entity to the setting values (T110). Therefore, the execution environment of the ML application suitable for the current resource state has been prepared.

Thereafter, the ML application is executed in the communication terminal 11 (T111). Note that, in a case where the communication terminal 11 is designated to be the computation handler, the computation unit of the communication terminal 11 computes the computation handling range. Then, the transmission unit of the communication terminal 11 transmits information required for calculating the DNN to the designated destination (T112). In a case where the communication terminal 11 is designated to be the computation handler, a computation result up to the middle of a series of computations of the DNN is included in the information. In a case where the communication terminal 11 is not designated to be the computation handler, the input to the DNN is included in the information. In addition, the designated destination is the next computation handler.

The reception unit of the next computation handler receives information required for the computation of the DNN (T113). The computation unit of the next computation handler computes the own handling range (T114). The transmission unit of the next computation handler further transmits the computation result to the next computation handler (T115). The processes from T113 to T115 are performed by each computation handler. Note that the entity that has not been designated to be the computation handler does not perform the computation of the DNN. In addition, the transmission unit of the last computation handler transmits the computation result to the communication terminal 11 as a response. The reception unit of the communication terminal 11 receives the final computation result of the DNN (T116). The processing of the ML application is executed on the basis of the final computation result (T117). In this manner, the processing of the ML application is completed.

Note that, even after the processing of the ML application has completed, each entity may acquire and transmit resources on the basis of the acquisition setting. The logical entity may determine whether or not the execution delay exceeds the allowable upper limit every time the resource is received, and may change the control details in a case where it is determined that the execution delay exceeds the allowable upper limit. In this manner, a case where the ML application is executed again may be prepared. Note that the acquisition and transmission of the resource may be stopped, and the acquisition and transmission of the resource may be resumed in a case where the activation of the ML application is detected, and the like.

Each process of the above sequence will be supplemented. First, acquired information will be described.

Information on which an instruction is given to acquire from the logical entity may be information regarding computation power. Examples of the information regarding the computation power include the maximum computation capability (Capability), an available computation capability, a computation load (computation amount), and a computation delay amount assumed from the computation load. For example, the number of graphical processor units (GPUs) included in each entity may be set as the maximum computation capability. In addition, the current number of unused GPUs may be used as the available computation capability.

Further, the information may be information regarding the state of a connected communication link. For example, the information may be information regarding a wireless communication link connection such as Radio link failure, or information of communication quality of a wireless communication link, such as reference signal received power (RSRP), reference signal received quality (RSRQ), and reference signal strength indication (RSSI). In addition, information regarding a throughput or a delay of the communication link may be used.

Further, the information may be information regarding the required specifications of the ML application. For example, there is the upper limit value of the delay allowed by the ML application. Note that the required specifications of the ML application may be different for each communication terminal 11.

Furthermore, the information may be information regarding traffic of the communication network 13. For example, there are an upper limit value of traffic, a buffer status of traffic, and the like. Note that an estimated value may be used instead of an actually measured value of traffic.

In addition, the information may be information regarding the movement (mobility) of the communication terminal 11. The communication terminal 11 may move during the execution of the ML application. In order to influence the communication quality by the movement, for example, information such as a moving speed and a moving direction may be acquired.

Furthermore, the information may be information regarding the computation of the DNN. For example, each entity may be caused to estimate a computation delay for each layer of the DNN. In addition, a plurality of handling range candidates may be determined in advance, and the logical entity may instruct each entity to estimate the computation delay of each handling range candidate. Furthermore, a load (for example, GPU usage rate) by the computation of the DNN may be estimated. Note that the computation delay may be calculated on the basis of a past computation history, or may be calculated as a theoretical time when the data size illustrated in FIG. 4 is computed on the assumption that the current available computation capability continues.

Note that the entity may actually measure the information on which an instruction is given and transmit the actual measurement value to the logical entity. Alternatively, the future estimated value calculated on the basis of the actual measurement value may be transmitted to the logical entity. For example, if the scheduled execution time of the ML application is 10 seconds later, the estimated position of the communication terminal 11 after 10 seconds may be transmitted to the logical entity. In addition, the communication terminal 11 and the communication node may quantize the actual measurement value or may determine which of predetermined classification items the actual measurement value corresponds to, and transmit information of the classification item determined to correspond, to the logical entity. The estimation may be performed on the basis of past records.

A known technique may be used as a method of acquiring the information regarding the resource. For example, information regarding the performance of the entity such as the computation capability and the available computation capability may be acquired by using a function such as a tool provided by an operating system (OS) or the like mounted on the entity. In addition, information regarding the quality of the communication link, for example, the communication quality such as RSRQ may be checked by using a known technique.

Further, there may be a communication node that acts as a representative such as collecting information to be transmitted to the logical entity and transmitting the information to the logical entity as a representative. In this case, for example, information such as traffic of each link and the movement of the communication terminal 11 may be transmitted to the logical entity after information from a plurality of communication nodes is added up.

In addition, a timing of acquiring information and the like may also be designated. An instruction on periodic measurement may be given. For example, the logical entity may determine an acquisition start time, an acquisition end time, and an acquisition period to instruct each entity, and each entity may perform acquisition according to the instruction. In addition, instructions on the number of times of acquisition, the repetition standby period, and the like may also be given. Furthermore, trigger based measurement may be performed. The trigger condition for each entity to dynamically start the acquisition may be appropriately determined. For example, the acquisition may be started when failure of the wireless communication link is detected. Alternatively, the acquisition may be started in a case where the processing load of the node, the delay of the ML application, the communication delay, or the like exceeds predetermined threshold values. Note that the threshold values may be adjusted by the logical entity. Alternatively, the acquisition may be started when a request of acquisition is received. The request may be transmitted from the logical entity or may be transmitted from a higher node different from the logical entity.

For example, in order to measure the quality of the backhaul link, for example, designation may be performed such that measurement of the RSRQ of the backhaul link in a period of 10 ms is periodically performed, for example, at an interval of 100 ms.

The transmission of the pieces of information to the logical entity, in other words, the report may be appropriately performed, and a transmission timing and the format of data to be transmitted are not particularly limited. For example, in a case where an instruction to periodically acquire information is issued, the transmission may also be set to be periodically performed. Alternatively, the transmission may be performed in a case where conditions as follows is satisfied: when the value of the RSRQ of the communication link is equal to or less than a predetermined threshold value, when the processing load of the node is equal to or more than a predetermined threshold value, or the like. In addition, the transmission may be performed immediately after the acquisition, or may be performed after the offset time from the acquisition has elapsed. Alternatively, the transmission may be performed when the acquired value satisfies the condition. For example, the report may be performed in a case where there is a variation to the extent that it is necessary to change the computation handler, the handling range, and the like, and the report may not be performed in a case where there is no change.

In addition, each entity may not transmit all pieces of acquired information to the logical entity. For example, information may be acquired at a fine granularity, and only information satisfying a predetermined condition such as information having a large variation or information exceeding a threshold value among pieces of acquired information may be transmitted to the logical entity. That is, the logical entity may separately give instructions on information to be acquired and information to be reported. In addition, the acquired information may be appropriately processed for reporting to the logical entity.

Furthermore, the setting may be different for each entity. For example, since it is assumed that the communication link connected to the cloud system 12 is wired and stable, the cloud system 12 may not need to acquire the information regarding the communication link.

Next, determination of control details will be described. The control details to be determined includes details related to the communication link and the wireless communication parameter. In addition, the computation handler, the handling range, and the like are also determined.

For example, the control related to the communication link includes determination of a communication route. For example, in a case where the communication network 13 includes a relay type network such as the IAB network, the route of the relay is determined. Note that, even though there is an attempt to select the computation handler from the communication nodes on a communication route between the communication terminal 11 and the cloud system 12, selection is not possible if there is no communication node having an available computation capability on the communication route. Therefore, the logical entity may determine the communication route by using not only the quality of the communication link but also the computation capability, the available computation capability, and the like of the communication node. In addition, the change of the IAB node to be passed and the change of the number of hops may be performed in a similar manner.

For example, the control related to the communication parameter includes improvement in quality of the communication link on the communication route. Therefore, it is possible to suppress the communication delay. For example, it is conceivable that the logical entity transmits, to the wireless communication node 131 on the communication route, a setting value that increases the strength (transmission power) of wireless radio waves to be transmitted. In addition, the wireless communication node 131 may be caused to reduce the communication capacity of a wireless communication link that is not on the communication route, so as not to cause interference. In this manner, the setting value for improving the quality of the communication link may be determined.

Further, as the control related to the wireless communication parameter, the correspondence relationship between the downlink (DL) and the uplink (UL) in the wireless communication link may be changed. In the wireless communication link, adjustment such as an increase in communication band of one of the DL and the UL and a decrease in communication band of the other can be performed. Therefore, the correspondence relationship between the DL and the UL may be adjusted to reduce the communication delay. Note that the communication delay may be calculated from the size of data to be transmitted and the communication capacity of a communication link through which the data flows. A delay due to the communication quality may also be considered.

However, when the communication band is adjusted, interference is likely to occur. For example, in the IAB network, a cross link interference (CLI) with an IAB network link is likely to occur. Therefore, it is necessary to sufficiently pay attention to adjustment of the communication band.

The computation handler and the handling range are determined in consideration of the available computation capability of each wireless communication node 131, the amount of data output in each handling range, the quality of the communication link on the communication route, and the like. At least an occurrence of a situation in which the wireless communication node 131 that becomes a bottleneck of the delay function as the computation handler is prevented.

However, it takes a load and time to search for optimal solutions for the computation handler and the handling range. This is because the number of computation handler candidates increases exponentially depending on the communication route and the number of layers of the DNN. Therefore, it is easier to perform processing by narrowing down computation handler candidates in advance and searching for a sub-optimal solution. For example, a plurality of combinations of handling ranges may be prepared in advance, and the combination to be used may be changed in accordance with the situation of the communication environment. Here, the combination of the handling ranges prepared in advance is also described to as a Splitting mode.

FIG. 11 is a diagram for describing the Splitting mode. FIG. 11 illustrates four Splitting modes. Note that a table indicating a plurality of Splitting modes as illustrated in FIG. 11 is also described to as a Splitting mode table. In the example of FIG. 11, the handling range of each computation handler is determined by selecting the Splitting mode in which the execution delay of the ML application is minimized, from the four Splitting modes. Note that, in the example of FIG. 11, the communication terminal 11, the communication node in the communication network 13, and the cloud system 12 are set as the computation handlers, but a Splitting mode having a different computation handler may be prepared. In addition, for example, at the initial start of execution of the ML application, a specific Splitting mode may be selected as the default, and then the mode may be switched to another Splitting mode. For example, in a case where it is determined that the load of the computation handler other than the communication terminal 11 is high, it is conceivable to select the Splitting mode in the second row in which the handling range of the computation handler other than the communication terminal 11 is small, and to cause the load to be taken over to the communication terminal 11. As described above, in a case where a specific computation handler has a load, it is possible to perform easy improvement by switching the mode to a Splitting mode in which the handling range of the computation handler is small. Note that studies as to whether or not to switch the Splitting mode may also be executed periodically or dynamically.

Both a Splitting mode used at the normal time and a temporary Splitting mode used in a case where it is determined that satisfying the request of the ML application is not possible in the Splitting mode used at the normal time may be determined. Then, in a case where it is determined that satisfying the request of the ML application is not possible, it is possible to quickly switch the Splitting mode without performing a process of selecting an appropriate Splitting mode.

As described above, by preparing the candidates for the handling range in advance, the dynamic change of the distribution may be facilitated. Further, the content of the Splitting mode, that is, the handling range of each computation handler may be appropriately updated by the logical entity. Note that each entity is sequentially notified of the updated Splitting mode so that each computation handler does not perform a computation on the basis of the Splitting mode before update.

Figure 12:
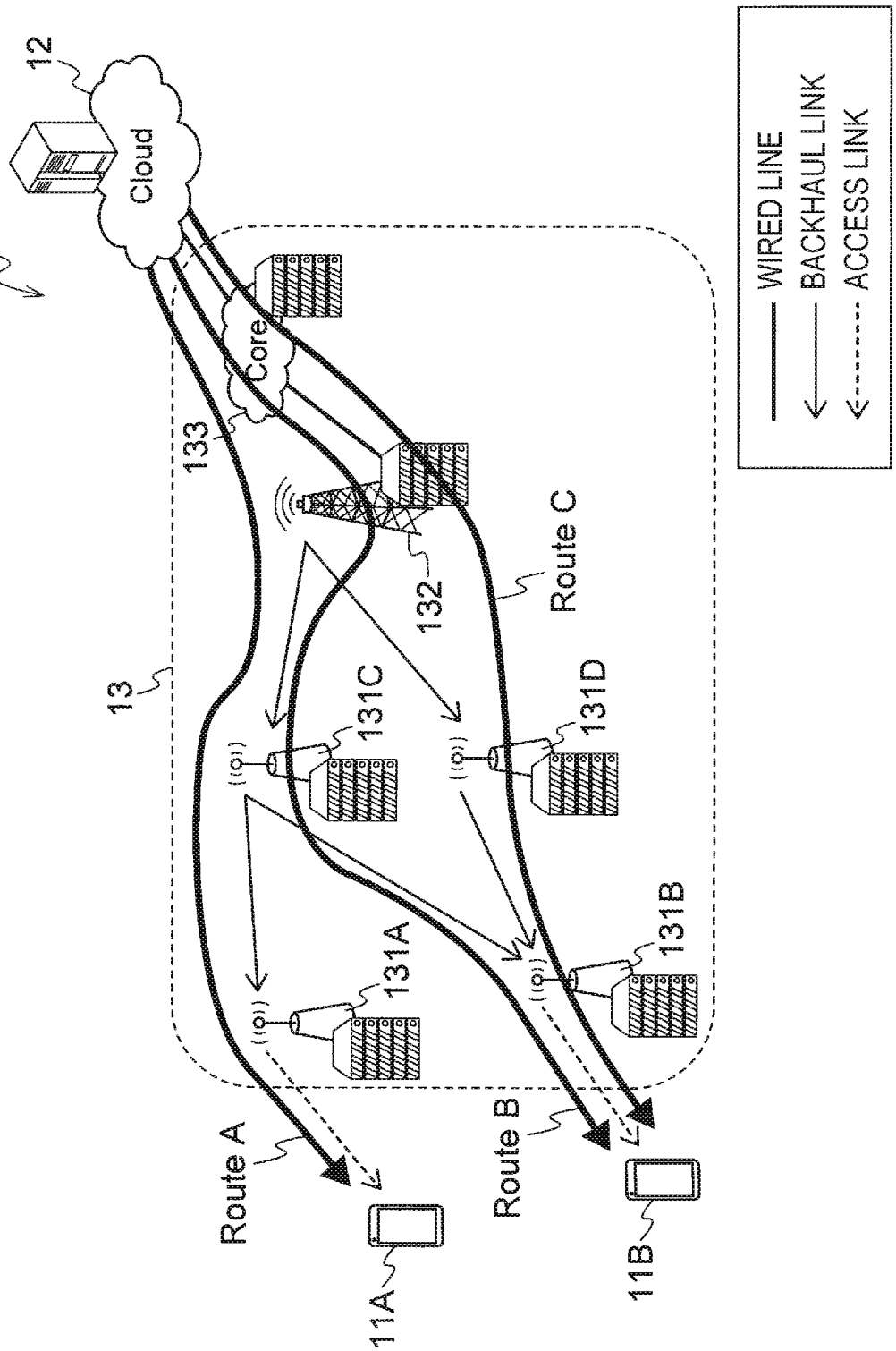
FIG. 12 is a diagram for describing a Splitting mode set for each communication route.

Further, the Splitting mode may be set for each communication route. FIG. 12 is a diagram for describing the Splitting mode set for each communication route. FIG. 12 illustrates three communication routes of Route_A, Route_B, and Route_C. A plurality of Splitting modes as illustrated in FIG. 11 is set for each of the three communication routes.

For example, in the communication route Route_A, the cloud system 12, the communication node of the core network 133, the donor node 132, the wireless communication node 131C, the wireless communication node 131A, and the communication terminal 11A that exist on the communication route Route_A are computation handler candidates. Layers of DNN are assigned to the computation handler candidates to create a Splitting mode table. Similarly, computation handler candidates are selected for the communication routes Route_B and Route_C, and Splitting mode tables are created.

FIGS. 13A and 13B are diagrams illustrating an example of the Splitting mode for each communication route. FIG. 13A illustrates the Splitting mode table of the communication route Route_A, and FIG. 13B illustrates the Splitting mode table of the communication route Route_B. In the example of FIGS. 13A and 13B, the number of layers of the DNN is assumed to be 40, and the numerical value of each cell in the Splitting mode table indicates the number of layers handled by the corresponding computation handler candidate. Note that, in a case where "0" is described in the cell, it means that there is no layer handled by the corresponding computation handler candidate. That is, it means that the computation handler candidate does not serve as the computation handler.

Note that, in the above description, it is assumed that the logical entity determines the handling range, that is, the Splitting mode. However, there may be a method in which the logical entity creates the Splitting mode table and transmits the Splitting mode table to the computation handler, and the computation handler selects the Splitting mode. For example, when the communication terminal 11 changes the wireless communication node 131 as a connection destination by performing handover, the communication terminal 11 can select the Splitting mode from the Splitting mode table of the communication route after the change, and notify each computation handler of the selected Splitting mode, thereby resetting the Splitting mode.

Note that the handling range of the computation handler using a wired link may be fixed. For example, since the cloud system 12 and the edge server of the core network 133 do not perform wireless communication, it is considered that there is little change in the state of the communication link. As described above, by fixing the handling range of the computation handler existing in a place where there are little variations in the communication environment, it is possible to reduce variations of the Splitting mode. For example, although the Splitting mode of the communication route Route_A illustrated in FIG. 13A includes seven computation handler candidates, it is possible to assign the sub-optimal Splitting mode by performing setting. By fixing the assignment values of the cloud system 12 and the core network 133, it is possible to reduce the number of variations of the Splitting mode.

In addition, the logical entity may change the Splitting mode table on the basis of an anchor point. The anchor point is a communication node that necessarily exists on a communication route set in the communication terminal 11 as long as the communication terminal 11 is within the assumed moving area. Although the communication route is changed by the movement of the communication terminal 11, a communication node common to all communication routes that may be set in the assumed moving area of the communication terminal 11 is the anchor point. For example, in the example of FIG. 12, if the communication terminal 11 is wirelessly connected to any of the wireless communication nodes 131A to 131D, the donor node 132 necessarily exists on the communication route with the cloud system 12. Thus, in the example of FIG. 12, the donor node 132 is the anchor point. For example, as long as the anchor point does not disappear from the communication route, the logical entity may determine the Splitting mode from the Splitting mode table. In a case where the logical entity detects that the anchor point disappears from the communication route, the logical entity may reset the Splitting mode table itself. As described above, when a predetermined communication node does not exist on the communication route, the Splitting mode table may be created again.

In addition, the logical entity may change the handling range of each computation handler in units of layers. For example, in a case where the handling range of the communication terminal 11 is determined to be from Layer 1 to Layer 4, and then the load of the communication terminal 11 slightly increases, adjustment may be performed such that the handling range of the communication terminal 11 is changed from Layer 1 to Layer 3, and the next computation handler is caused to handle Layer 4 outside the handling range. In this case, the control is performed at a finer granularity than the Splitting mode level, and the load of the logical entity increases, but it is possible to reduce the risk of not satisfying the request of the ML application.

Next, parameter setting will be described. The communication terminal 11 and the communication node update values of parameters related to the communication link, the handling range, and the like according to the details determined by the logical entity. The instruction to set the parameters may be directly made from the logical entity, or may be indirectly made via the representative wireless communication node 131 bundling the plurality of wireless communication nodes 131. The notification method is not particularly limited, and may be signaling notification in an application layer or signaling notification in a physical layer. Semi-static notification such as radio resource control (RRC) signaling may be used, or dynamic notification such as downlink control information (DCI) or uplink control information (UCI) may be used.

Figure 14:
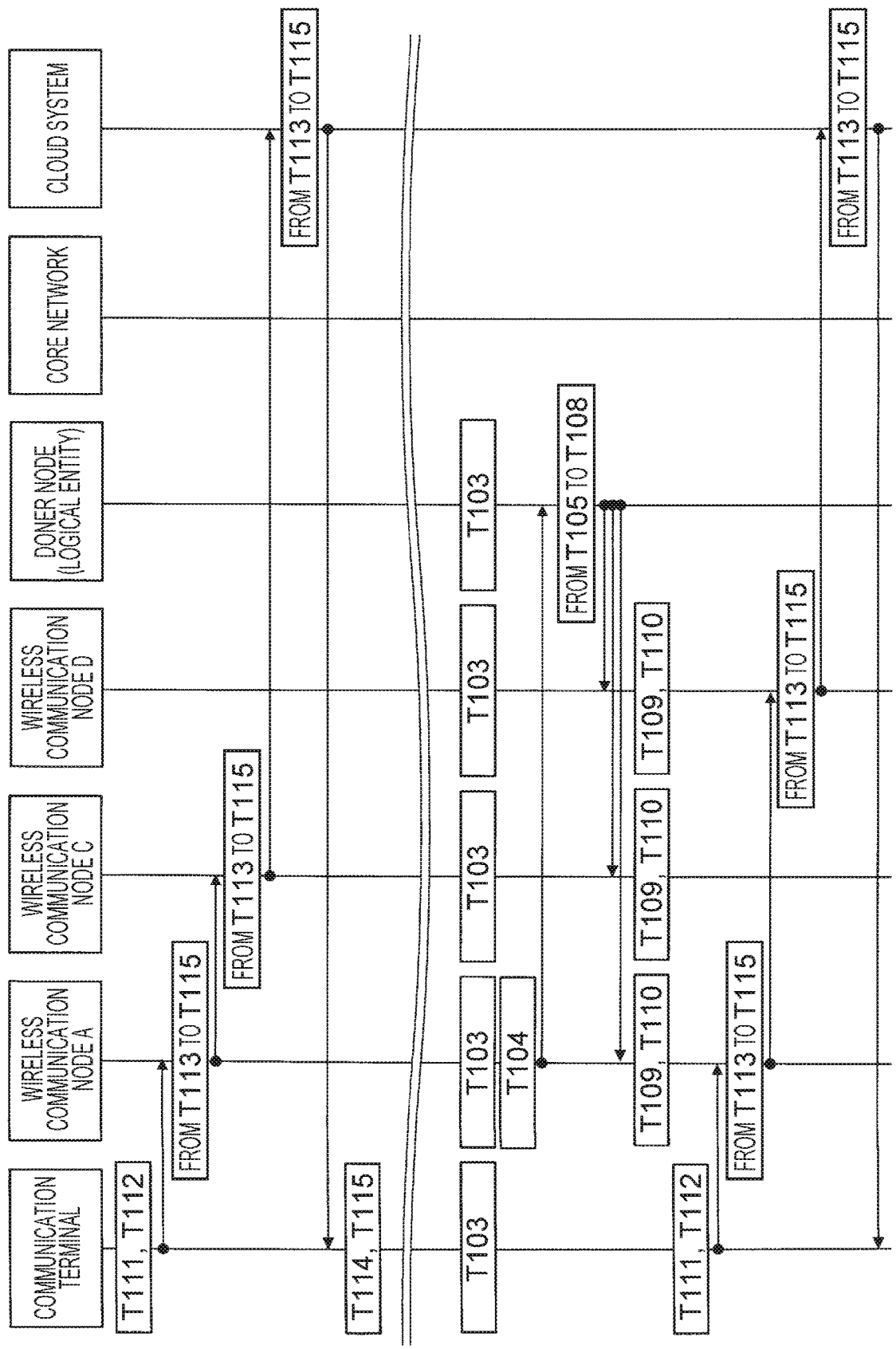
FIG. 14 is a sequence diagram before and after a computation handler is switched.

Further, a sequence diagram when the computation handler is switched is also illustrated. FIG. 14 is a sequence diagram before and after the computation handler is switched. Note that, for convenience of description, the reference signs of the processes illustrated in FIG. 10 are described in the block of FIG. 14.

The example of FIG. 14 illustrates a case where a logical entity is implemented on the donor node 132. In addition, it is assumed that the communication terminal 11, the wireless communication node 131A, the wireless communication node 131C, and the cloud system 12 initially serve as the computation handlers, but the quality of the backhaul link between the wireless communication node 131A and the wireless communication node 131C deteriorates, and the handling range is switched. Note that it is assumed that the processes up to the parameter setting (T110) illustrated in FIG. 10 have been executed, and illustration is made from the process of T111.

The ML application of the communication terminal 11 is executed (T111), and the communication terminal 11 transmits information required for the computation of the DNN to the next computation handler (T112). The wireless communication node 131A that is the next computation handler receives the information (T113), computes the own handling range (T114), and transmits the computation result to the wireless communication node 131C that is the next computation handler (T115). Similarly, the wireless communication node 131C executes the processes from T113 to T115, and the computation result of the wireless communication node 131C is transmitted to the cloud system 12 that is the next computation handler. Similarly, the cloud system 12 that is the computation handler also executes the processes from T113 to T115. Since the cloud system 12 is the last computation handler, the final computation result of the DNN is transmitted from the cloud system 12 to the communication terminal 11.

Thereafter, periodic resource acquisition (T103) is executed in each entity, and the wireless communication node 131A that has detected the problem issues a report to the donor node 132 that is the logical entity (T104). Note that, in the example of FIG. 14, the core network 133 and the cloud system 12 are set not to issue a report to the logical entity, and thus the block of T104 is not illustrated in the core network 133 and the cloud system 12. In addition, other entities are set not to issue a report to the logical entity in a case where no deterioration has been detected. Therefore, since entities other than the wireless communication node 131A that has detected the problem do not issue a report, the block of T104 is not illustrated.

For example, each entity performs measurement on the backhaul link. Then, it is assumed that the wireless communication node 131A detects that the value of the RSRQ of the backhaul link with the wireless communication node 131C is equal to or less than a predetermined value, and performs transmission to the logical entity.

The donor node 132 that is the logical entity receives the report of the wireless communication node 131A, determines from a reporting result that it is not sufficient to only augment the bandwidth of the backhaul link in question, determines a new setting such as a change in computation handler, and transmits the determined setting to each entity (T105 to T108). Note that, in the example of FIG. 14, the logical entity transmits the setting only to an entity that requires the new setting. Thus, an arrow indicating transmission is not illustrated in the core network 133 and the cloud system 12. Note that the setting may be transmitted to an entity that does not require the new setting.

Note that the logical entity may request an additional report from each entity. For example, when a report indicating that there is a problem in the backhaul link is received from the wireless communication node 131A, in order to study whether the problem can be coped with augmenting of the bandwidth of the backhaul link, the communication node around the wireless communication node 131A may be requested to transmit a report such as a traffic buffer.

Each entity that has received the new setting from the logical entity receives the new setting and sets the new setting in the parameter (T109, T110). In the example of FIG. 14, it is assumed that there is no backhaul link from the wireless communication node 131A to the wireless communication node 131C, and a new backhaul link from the wireless communication node 131A to the wireless communication node 131 D is provided. Accordingly, it is assumed that the communication route is changed, the wireless communication node 131C not existing on the communication route is removed from the computation handler, and the wireless communication node 131D is added as the computation handler.

Thereafter, the ML application is executed again (T111). The communication terminal 11 transmits information required for the computation of the DNN to the wireless communication node 131A that is the next computation handler (T112). Similarly to the previous time, the wireless communication node 131A receives the information (T113) and performs computation in the own handling range (T114). The wireless communication node 131A transmits the computation result not to the wireless communication node 131C but to the wireless communication node 131D that has newly become the next computation handler (T115). Therefore, unlike the previous time, the processes from T113 to T115 are not executed in the wireless communication node 131C. Similarly, the wireless communication node 131D executes the processes from T113 to T115, and the computation result of the wireless communication node 131D is transmitted to the cloud system 12 that is the next computation handler. Similarly, the cloud system 12 that is the computation handler also executes the processes from T113 to T115. Since the cloud system 12 is the last computation handler, the final computation result of the DNN is transmitted from the cloud system 12 to the communication terminal 11.

As described above, by changing the computation handler, it is possible to suppress the computation delay due to the entity having a problem and the communication delay due to the communication link having a problem, and it is possible to prevent an occurrence of a situation in which the execution delay of the ML application exceeds the allowable upper limit value.

Note that, in the example of FIG. 14, it is determined that it is not sufficient to only augment the bandwidth of the backhaul link, and the communication route and the computation handler are changed. However, in a case where it is determined that the problem can cope with only the change in the handling range, only the computation handler may be changed. For example, a Splitting mode in which the handling range of the wireless communication node 131C is reduced may be selected from the Splitting mode table as illustrated in FIG. 11. In addition, for example, up to now, the handling range of the wireless communication node 131A is from Layer 20 to Layer 25 of the DNN, and the handling range of the wireless communication node 131C is from Layer 26 to Layer 40 of the DNN. However, the handling range of the wireless communication node 131A may be expanded from Layer 20 to Layer 29 of the DNN, and the handling range of the wireless communication node 131 D may be set to be from Layer 30 to Layer 40 of the DNN. In this manner, the wireless communication node 131C may continuously serve as the computation handler.

Furthermore, the handling range may also be changed in a case where the computation handler is changed as in the example of FIG. 14.

Note that, in the present description, it is assumed that the information processing system 1 includes the communication terminal 11, the communication network 13, and the cloud system 12, but, in reality, it is assumed that the owners are different. In addition, it is assumed that the owners of a network for accessing the communication terminal 11, such as the IAB network, and the core network 133 are also different. Therefore, a range on which an instruction can be given and that can be set by the logical entity may be a part of the information processing system 1. For example, in a case where the logical entity is a communications node in the IAB network, the logical entity may not change a computation range or the like of the cloud system 12, and may only perform setting on the communications node in the IAB network.

As described above, in the present embodiment, in a case where the time required for executing the ML application exceeds the upper limit value due to the variation in the resources of the information processing system 1, the setting such as the computation handler, the handling range, the communication capacity of the communication link, the communication route, and the like are changed. Therefore, it is possible to comfortably operate the ML application while suppressing the influence of the variation.

Note that, in a case where an external device such as the cloud server is caused to serve as a substitute for all the computations of the DNN, the input to the DNN is transmitted from the communication terminal 11 to the external device. For example, in a case where the input layer includes m pieces of nodes, input data including values such as Input 1, Input 2, . . . , and Input m is transmitted to the outside of the communication terminal 11. However, it is also pointed out that this is a problem from the viewpoint of privacy and information leakage. Therefore, it is possible to an occurrence of such a problem if transmission of the input data itself to the outside is prevented in a manner that the communication terminal 11 handles at least the initial to intermediate computations in a series of computations of the DNN.

Furthermore, in the above description, it has been assumed that the subject that determines the computation handler and the handling range is described as the logical entity, and the communication node, the cloud server, or the like of the communication network 13 handle the logical entity. For example, it is illustrated that a device suitable for grasping the situation of the resource is only required to be the logical entity such that the computation handler and the handling range can be determined according to the situation of the resource of the information processing system 1. In addition, it is illustrated that a device that issues an instruction to improve the quality of the communication link to the wireless communication node 131 on the communication route is set to be the logical entity. In addition, the communication terminal 11 may also be the logical entity. In other words, the communication terminal 11 may determine the computation handler and the handling range.

In addition, as illustrated in FIG. 10 and the like, in the above description, each entity such as the communication terminal 11 periodically transmits the resource to the logical entity, and the logical entity determines the computation handler and the handling range on the basis of the resource of each entity and notifies each computation handler. Therefore, at a time point when the communication terminal 11 activates the ML application or at a time point when the ML application executes the computation of the DNN, the computation handler and the handling range have been determined. However, it is also possible for the communication terminal 11 itself to determine the own handling range by notifying the communication terminal 11 of the condition for determining the handling range in advance from the logical entity or the like. Note that the entity that transmits the condition to the communication terminal 11 may not be the logical entity.

For example, at the time of executing the ML application, the communication terminal 11 may check items such as the own available computation capability and the communication quality with the cloud system 12, and determine to which position the computation of the DNN is performed according to the items. Note that the communication terminal 11 may determine to perform a computation up to any layer of the DNN, or may determine to perform a computation up to a part of a plurality of computations set for a node in a certain layer. Alternatively, after the logical entity determines each computation handler, the logical entity may notify the communication terminal 11 of the handling range in which the logical entity wants the communication terminal to perform the minimum computation, and the communication terminal 11 may expand the handling range according to the items. Alternatively, after the logical entity determines each computation handler, the logical entity may notify the communication terminal 11 of the handling range (in other words, the upper limit of the handling range) that may be performed, and the communication terminal 11 may reduce the handling range of which the notification has been received from the logical entity according to the items.

In a case where the communication terminal 11 holds the condition for determining the handling range of the communication terminal 11 and the communication terminal 11 dynamically determines the handling range, the handling range can be determined on the basis of the resource at the time point when the communication terminal 11 activates the ML application or the time point when the ML application executes the computation of the DNN. Therefore, it is possible to set the handling range of the communication terminal 11 in accordance with the state of the communication terminal 11. Furthermore, in this case, it is possible to suppress the number of times of periodic transmission of resources from the communication terminal 11 to the logical entity and the number of notifications of a change in the handling range from the logical entity to the communication terminal 11, and it is possible to reduce the processing load of each entity and the use of communication resources.

FIGS. 15A and 15B are diagrams illustrating an example of the condition for determining the handling range of the communication terminal 11. In the example of FIG. 15A, a condition for determining the computation range of the DNN on the basis of the available computation capability of the communication terminal 11 is illustrated. For example, in the example of FIG. 15A, in a case where the available computation capability is 90% or more, the handling range is indicated as n, which indicates that the communication terminal 11 handles computations from the first layer to the n-th layer of the DNN. Note that, in the example of FIGS. 15A and 15B, it is assumed that n is an integer of 10 or more. In addition, the n-th layer may be the last layer of the DNN or the last layer in the handling range of which the notification has been received from the logical entity. Further, it is also illustrated that the handling range is decreased as the available computation capability decreases. In the example of FIG. 15A, it is illustrated that, in a case where the available computation capability is less than 90% and 80% or more, the handling range is up to the (4n/5)th layer, which is lower than that in a case where the available computation capability is 90% or more. Similarly, it is illustrated that, in a case where the available computation capability is less than 80% and 60% or more, the handling range is up to the (3n/5)th layer. It is illustrated that, in a case where the available computation capability is less than 60% and 40% or more, the handling range is up to the (2n/5)th layer. It is illustrated that, in a case where the available computation capability is less than 40% and 20% or more, the handling range is up to the (n/5)th layer. In this manner, the handling range of the communication terminal 11 may be determined. In addition, in a case where the available computation capability is out of the above cases, that is, less than 20%, the handling range is set to be up to the first layer, which means that the communication terminal 11 does not execute the computation of the DNN. That is, even in a case where the communication terminal 11 is designated to be the computation handler, the communication terminal 11 may reject the computation. As described above, by reducing the handling range in a case where the available computation capability of the communication terminal 11 is small, a situation in which it takes time to compute the handling range due to the small available computation capability of the communication terminal 11 may be prevented. Here, as the available computation capability, FLOPS (product of a clock frequency and the number of calculations per clock) which is an absolute amount may be used instead of a relative amount (%), or other values indicating the available computation capability may be used.

In the example of FIG. 15B, the handling range is determined in a similar manner to FIG. 15A, but the condition is on the basis of the delay time that is a type of communication quality. Note that the delay time with which communication destination may be determined in advance, and is not particularly limited. The communication destination may be the next computation handler, may be the logical entity, or may be the wireless communication node wirelessly connected to the communication terminal 11. Alternatively, since a main factor of the delay time is wireless processing performed by each entity, the time related to the radio processing may be regarded as the delay time without considering radio (radio wave) and wired propagation delays. In the example of FIG. 15B, it is illustrated that, in a case where the delay time is 500 ms or longer, the communication terminal 11 handles the computations from the first layer to the n-th layer of the DNN. Then, it is illustrated that, in a case where the delay time is shorter than 500 ms and 250 ms or longer, the handling range is up to the (4n/5)th layer. It is illustrated that, in a case where the delay time is shorter than 250 ms and 100 ms or longer, the handling range is up to the (3n/5)th layer. It is illustrated that, in a case where the delay time is shorter than 100 s and 50 ms or longer, the handling range is up to the 3n/5 layer. It is illustrated that, in a case where the delay time is shorter than 50 ms and 10 ms or longer, the handling range is up to the (2n/5)th layer. It is illustrated that, in other cases, that is, in a case where the delay time is shorter than 10 ms, the communication terminal 11 does not execute the computation of the DNN.

Note that, in the example of FIG. 15B, the handling range of the communication terminal 11 uniformly increases as the delay time increases, but it is not necessary to uniformly increase the handling range. As illustrated in FIG. 4, the data size of the computation result does not uniformly decrease as the computation of the DNN proceeds. Therefore, it is only required to determine a combination of the delay time and the handling range in consideration of the data size of the computation result in each layer with reference to the data as illustrated in FIG. 4.

In addition, it is only required to appropriately set such conditions according to the specifications of the embodiment, and such conditions are not particularly limited. For example, the condition can be changed for each type of ML application. In addition, a plurality of conditions may be provided and changed in a case where all the conditions are satisfied, or a condition having the highest predetermined priority among the satisfied conditions may be changed.

Furthermore, the confidentiality may be determined in advance for each type of ML application. In a case where the confidentiality of the executed ML application is equal to or greater than a predetermined threshold value, the handling range of the communication terminal 11 may be set to be from the first layer to the second layer or more. In this manner, the communication terminal 11 does not transmit the input data of the DNN to the outside. Therefore, it is possible to reduce the risk of leakage of information having high confidentiality to a device other than the communication terminal 11.

However, in a case where the communication terminal 11 determines the own handling range, the next computation handler cannot recognize which layer of the DNN is to start the computation. Therefore, for example, in a case where the logical entity notifies each computation handler of the handling range, but the communication terminal 11 has changed the handling range of which the notification has been received from the logical entity, there is a possibility that the next computation handler inputs the computation result from the communication terminal 11 to each node in the first layer of the own scheduled handling range without knowing that the communication terminal 11 has changed the handling range. Therefore, in a case where the communication terminal 11 determines or changes the own handling range, the communication terminal 11 needs to issue a notification of not only the computation result but also information for recognizing a position at which the next computation handler starts the computation. The information may be, for example, information indicating the last layer in the handling range of the communication terminal 11, information indicating the first layer in the next handling range of the next computation handler, information indicating a node that has output the computation result, or information indicating a node to which the computation result is to be input. Note that the communication terminal 11 may directly transmit the information to the next computation handler or may transmit the information to the next computation handler via the logical entity.

FIG. 16 is a diagram illustrating an example of the computation result transmitted from the communication terminal 11 in a case where the communication terminal 11 determines the own handling range. In the example of FIG. 16, an output value of each node, which is the computation result, and identification information for identifying a node that has output the output value are included. Note that, in the example of FIG. 16, the identification information (identifier) of the node is described as "node 3_4", but the number at the end indicates the number of the layer including the node, and the number after "node" indicates the number of the node in this layer. That is, "node 3_4" indicates the third node included in the fourth layer. In addition, "out 3" described in the same row as "node 3_4" indicates an output value by the third node included in the fourth layer. Which node the output of each node is input to can be recognized from the structure of the DNN and the like. The next computation handler that has received the information as illustrated in FIG. 16 is only required to recognize the node to which the received output value is to be input from the structure of the DNN or the like and start the computation.

Note that, in the above description, it is assumed that the computation handler performs the computation set for each node in the handling range and transmits the output value of the node belonging to the last layer in the handling range to the next computation handler. However, in general, a plurality of computations is set in the node of the DNN. Therefore, the computation handler may perform a part of the plurality of computations set in the node, and the rest may be set to be performed by the next computation handler. As a computation example in the node, first, each piece of input data input to the node is multiplied by a weighting coefficient set in a link through which each input data has passed, and then added. Further, a bias value set in each node is added to the addition value. Then, the addition value is input to a predetermined activation function, and an output from the activation function becomes the output value of the node. Therefore, for example, it may be determined in advance that the computation handler performs the computation up to the computation of the addition value, and the next computation handler starts the computation from the computation of the activation function, and the computation may be shared in such a manner. Note that the link connected to the node is also referred to as an edge.

Figure 17:
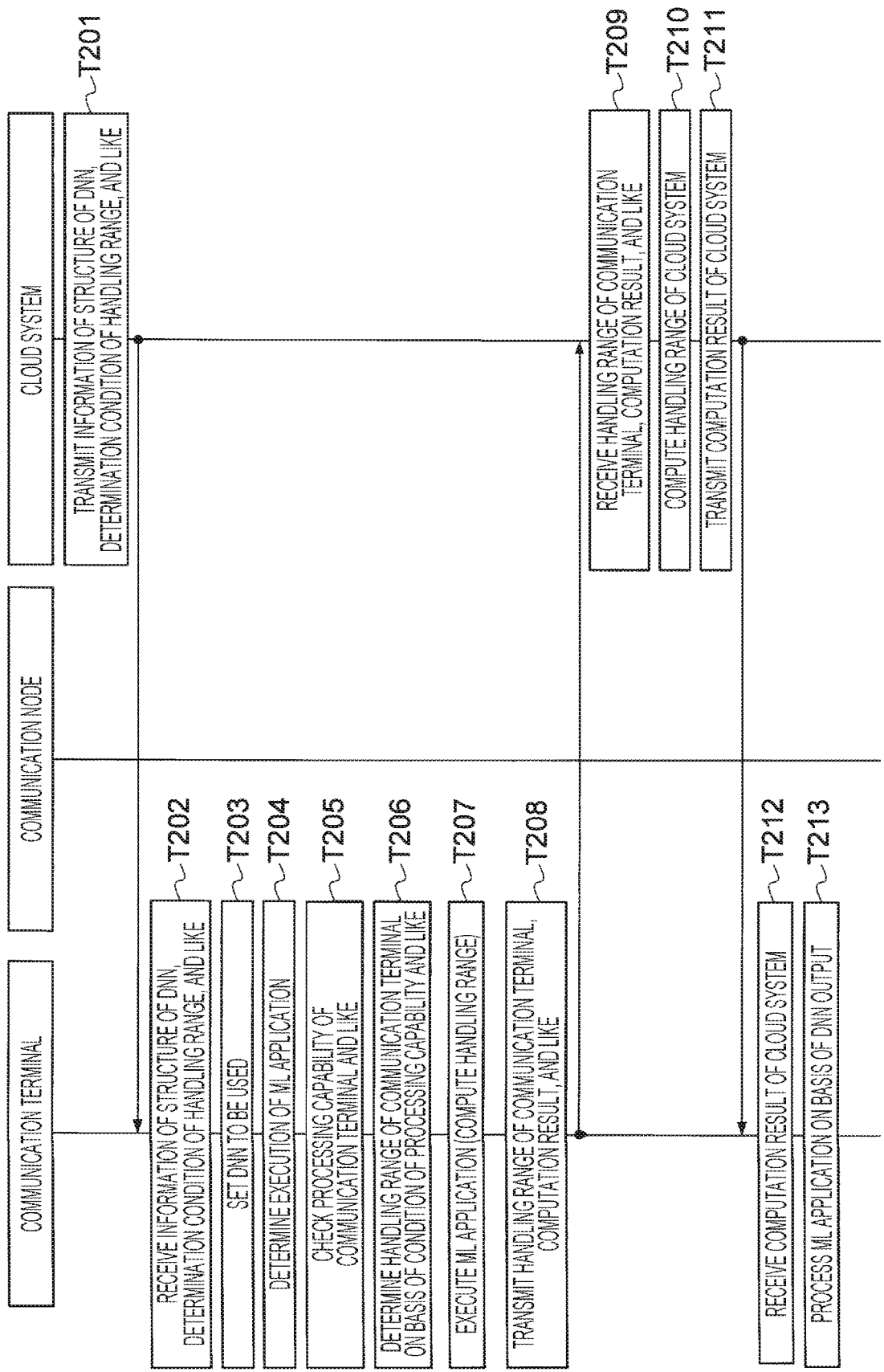
FIG. 17 is a schematic sequence diagram illustrating a flow of overall processing in a case where the communication terminal determines the own handling range.

FIG. 17 is a schematic sequence diagram illustrating a flow of overall processing in a case where the communication terminal 11 determines the own handling range. Note that, in the example of the present sequence diagram, it is assumed that the structure of the DNN used by the ML application, the conditions for determining the handling range of the series of computations of the DNN, and the like are managed by the cloud system 12. In addition, in the example of the present sequence diagram, the communication terminal 11 and the cloud system 12 are set to be the computation handler of the DNN, but the communication terminal 11 and the communication node may be the computation handler. Here, the functions of the core network 133 can be implemented in the cloud system 12. That is, the core network 133 can also manage the above-described conditions.

The cloud system 12 transmits information such as a DNN used by the ML application, a setting of the DNN, and a condition for determining the handling range (T201). The information is transferred via the communication node of the communication network 13, and the communication terminal 11 receives the information (T202). The communication terminal 11 performs setting of the ML application such as the DNN to be used, on the basis of the received information. (T203).

Note that the communication node can detect that the communication terminal 11 has activated the ML application on the basis of a 5G QOS identifier (5QI), single-network slice selection assistance information (S-NSSAI), or the like included in a connection request of the communication terminal 11, for example, a service request or a protocol data unit (PDU) session establishment request. Therefore, the communication node may detect the activation of the ML application in the communication terminal 11, notify the cloud system 12 of the detection, and the cloud system 12 may extract the DNN to be used in the detected ML application.

Thereafter, the communication terminal 11 determines execution of the ML application (T204). At this time, the communication terminal 11 checks the processing capability of the communication terminal 11 itself (T205), and determines the handling range of the communication terminal 11 on the basis of the processing capability and the condition for determining the handling range of the computation of the DNN (T206). For example, in a case where the condition for determining the handling range of the DNN is the example illustrated in FIG. 15A and the DNN includes 10 pieces of layers (in a case where n is 10), if the available computation capability is 50%, the communication terminal 11 determines the layer in which the DNN is divided, to be the fourth layer. Then, the communication terminal 11 executes the ML application and computes the handling range of the communication terminal 11 (T207). According to the above example, the computation from the first layer to the fourth layer of the DNN can be performed.

Note that, after the computation of the handling range, the handling range may be expanded again. For example, it may be checked whether or not a predetermined condition is satisfied after the computation of the handling range is ended, and it may be determined whether or not to continue the computation in the next layer on the basis of the check result. Here, whether or not the predetermined condition is satisfied may be determined on the basis of the available computation capability, the delay time, the confidentiality, and the like. In this manner, the handling range may be determined a plurality of times.

After computing the handling range of the communication terminal 11, the communication terminal 11 transmits information indicating the handling range of the communication terminal 11 and the computation result as illustrated in FIG. 16, to the cloud system 12 via the communication node (T208). The cloud system 12 receives the information via the communication node (T209).

On the basis of the received identification information of each node, the cloud system 12 identifies a node to which the received output value is input, that is, each node in the layer next to the last layer in the handling range of the communication terminal 11, and computes the handling range of the cloud system 12 (T210). After the end of the computation, the cloud system 12 transmits, as a response, the computation result of the handling range of the cloud system 12 to the communication terminal 11 (T211). Note that the handling range of the cloud system 12 is assumed to be all the remaining computations of the DNN, but may not be all the remaining computations of the DNN. For example, the communication terminal 11 may receive the computation result of the cloud system 12 and further perform the remaining computations of the DNN.

The communication terminal 11 receives the computation result of the cloud system 12 via the communication node (T212). Then, the processing of the ML application is executed on the basis of the final computation result (T213). In this manner, the processing of the ML application is completed. Note that an entity other than the communication terminal 11, such as the cloud system 12, may calculate the processing result of the ML application.

As described above, in a case where distributed learning of the DNN is performed between the entities, the communication terminal holds the condition for determining the handling range of the DNN, and the communication terminal determines the own handling range. In this manner, it is possible to more appropriately perform the distribution according to the situation of the communication terminal. Furthermore, by causing the communication terminal to compute the DNN at least up to the second layer in accordance with the confidentiality of the ML application or the like, it is possible to prevent an occurrence of a situation such as leakage of input data.

Note that, a general algorithm used in deep learning includes a convolution neural network (CNN), a recurrent neural network (RNN), a long short-term memory (LSTM), and the like. In the CNN, the hidden layer includes respective layers called a convolution layer and a pooling layer. In the convolution layer, filtering is performed by a convolution operation, and data called a feature map is extracted. In the pooling layer, information of the feature map output from the convolution layer is compressed, and down-sampling is performed. The RNN has a network structure in which a value of the hidden layer is recursively input to the hidden layer, and for example, short-period time-series data is processed. In the LSTM, the influence of a far past output can be held by introducing a parameter called a memory cell that holds the state of the intermediate layer into an intermediate layer output of the RNN. That is, the LSTM processes time-series data of a longer period than the RNN. Examples of representative technical areas in which deep learning is utilized include four fields of image recognition, voice recognition, natural language processing, and failure detection by robots. Image recognition is used for purposes such as tagging of a person on a social network service (SNS) and automated driving. Voice recognition is applied to smart speakers and the like. Natural language processing is applied to search by a browser and automatic translation. Failure detection by robots is used in airports, railways, manufacturing sites, and the like.

The communication node of the communication network 13 will be supplemented. As described above, the communication node is referred to as a communication base station (also simply referred to as a base station), and includes an infrastructure for performing communication. This infrastructure is also referred to as a base station device. The base station device is a type of communication device, and can also be referred to as an information processing device. For example, the base station device may be a device for causing the communication node to function as a wireless base station (Base Station, Node B, eNB, gNB, and the like), a wireless access point (Access Point), or the like. In addition, the base station device may be a device that causes the communication node to function as a donor station or a relay station. Further, the base station device may be an optical extension device called a remote radio head (RRH). Furthermore, the base station device may be a device that causes the communication node to function as a reception station such as a field pickup unit (FPU). Furthermore, the base station device may be a device that causes the communication node to function as an integrated access and backhaul (IAB) donor node or an IAB relay node that provides a wireless access line and a wireless backhaul line by time division multiplexing, frequency division multiplexing, or space division multiplexing. Furthermore, the base station device may include a plurality of devices, and may be, for example, a combination of an antenna installed in a structure such as a building and a signal processing device connected to the antenna.

Note that the wireless access technique used by the base station device may be a cellular communication technique or a wireless LAN technique. Of course, the wireless access technique used by the base station device is not limited thereto, and may be another wireless access technique. For example, the wireless access technique used by the base station device may be a low power wide area (LPWA) communication technique. Of course, the wireless communication used by the base station device may be wireless communication using a millimeter wave. Note that the wireless communication used by the base station device may be wireless communication using radio waves or wireless communication (optical wireless) using infrared rays or visible light.

The base station device may be capable of non-orthogonal multiple access (NOMA) communication with the communication terminal 11. Here, the NOMA communication is communication (transmission, reception, or both) using a non-orthogonal resource. Note that the base station device may be capable of NOMA communication with another base station device.

Note that the base station devices may be capable of communicating with each other via a base station-core network interface (for example, S1 Interface and the like). This interface may be either wired or wireless. Furthermore, the base station devices may be capable of communicating with each other via an inter-base station interface (for example, X2 Interface, S1 Interface, and the like). This interface may be either wired or wireless.

Note that the base station devices may be capable of communicating with each other via a base station-core network interface (for example, NG Interface, S1 Interface, and the like). This interface may be either wired or wireless. Furthermore, the base station devices may be capable of communicating with each other via an inter-base station interface (for example, Xn Interface, X2 Interface, and the like). This interface may be either wired or wireless.

In addition, the term of the base station may also mean a structure having a function of the base station. The structure is not particularly limited. Examples of the structure include a high-rise building, a house, a steel tower, a station facility, an airport facility, a harbor facility, an office building, a school building, a hospital, a factory, a commercial facility, and a building such as a stadium. In addition, a non-building structure such as a tunnel, a bridge, a dam, a fence, and an iron pole, and a facility such as a crane, a gate, and a windmill are also included in the structure. Further, a place in which the structure is installed is not particularly limited. That is, not only a structure on land (on the ground in a narrow sense) or in the ground, but also a structure on water such as a platform or a megafloat and a structure in water such as a marine observation facility can be a structure having a function of a base station.

As described above, the base station may be a fixed station or a mobile station. In a case where the base station device is installed in a moving object, the base station may serve as a mobile station. Alternatively, the base station device may have a mobility, and the base station device itself may move to serve as a mobile station. In addition, a device that originally has a mobility, such as a vehicle and an unmanned aerial vehicle (UAV) represented by a drone, and is equipped with a function of a base station (at least a part of the function of the base station) can also be referred to as a mobile station or a base station device serving as a mobile station. In addition, a device that moves by being carried by a moving object such as a smartphone and is equipped with the function of a base station (at least a part of the function of the base station) can also be referred to as a mobile station or a base station device of a mobile station.

The location in which the fixed station and the mobile station exist is not particularly limited. Therefore, the moving object forming a mobile station may be a moving object (for example, a vehicle such as an automobile, a bicycle, a bus, a truck, a motorcycle, a train, or a linear motor car) that moves on a land (the ground in a narrow sense), may be a moving object (for example, a subway) that moves in the ground (for example, in a tunnel), may be a moving object (for example, a ship such as a passenger ship, a cargo ship, or a hovercraft) that moves on water, may be a moving object (for example, a submarine boat such as a submersible, a submersible, and an unmanned submersible) that moves in the water, may be a moving object (for example, an aircraft such as an airplane, an airship, or a drone) that moves in the air such as in the atmosphere, or may be a moving object (for example, artificial bodies such as an artificial satellite, a spacecraft, a space station, and a probe) that can float outside the atmosphere, in other words, in the universe. Note that a base station floating outside the atmosphere is also referred to as a satellite station. On the other hand, a base station closer to the earth than outside the atmosphere is also referred to as a ground station. In addition, a base station floating in the atmosphere, such as an aircraft, is also referred to as an aircraft station.

Note that the satellite serving as the satellite station may be any of a low earth orbiting (LEO) satellite, a medium earth orbiting (MEO) satellite, a geostationary earth orbiting (GEO) satellite, and a highly elliptical orbiting (HEO) satellite.

Note that a heavy aircraft such as an airplane and a glider, a light aircraft such as a balloon and an airship, and an unmanned aircraft such as a rotorcraft drone (such as a helicopter and an autogyro) may also serve as the aircraft station. Note that how to control an unmanned aircraft that may serve as an aircraft station is not particularly limited. That is, a control system of an unmanned aircraft includes an unmanned aircraft system (UAS), a tethered UAS, a lighter than air UAS (LTA), a heavier than air UAS (HTA) high altitude UAS platforms (HAPs). The flight of the aircraft station may be controlled by such control systems.

In addition, the size of a coverage of the base station device is not particularly limited, and may be as large as a macro cell, be as small as a pico cell, or be as very small as a femto cell. In addition, the base station device may have a beamforming capability. In this case, the base station device may form a cell or a service area for each beam. For this purpose, the base station device may be equipped with an antenna array including a plurality of antenna elements, and may be configured to provide Advanced Antenna Technology represented by multiple input multiple output (MIMO) and beamforming.

Figure 18:
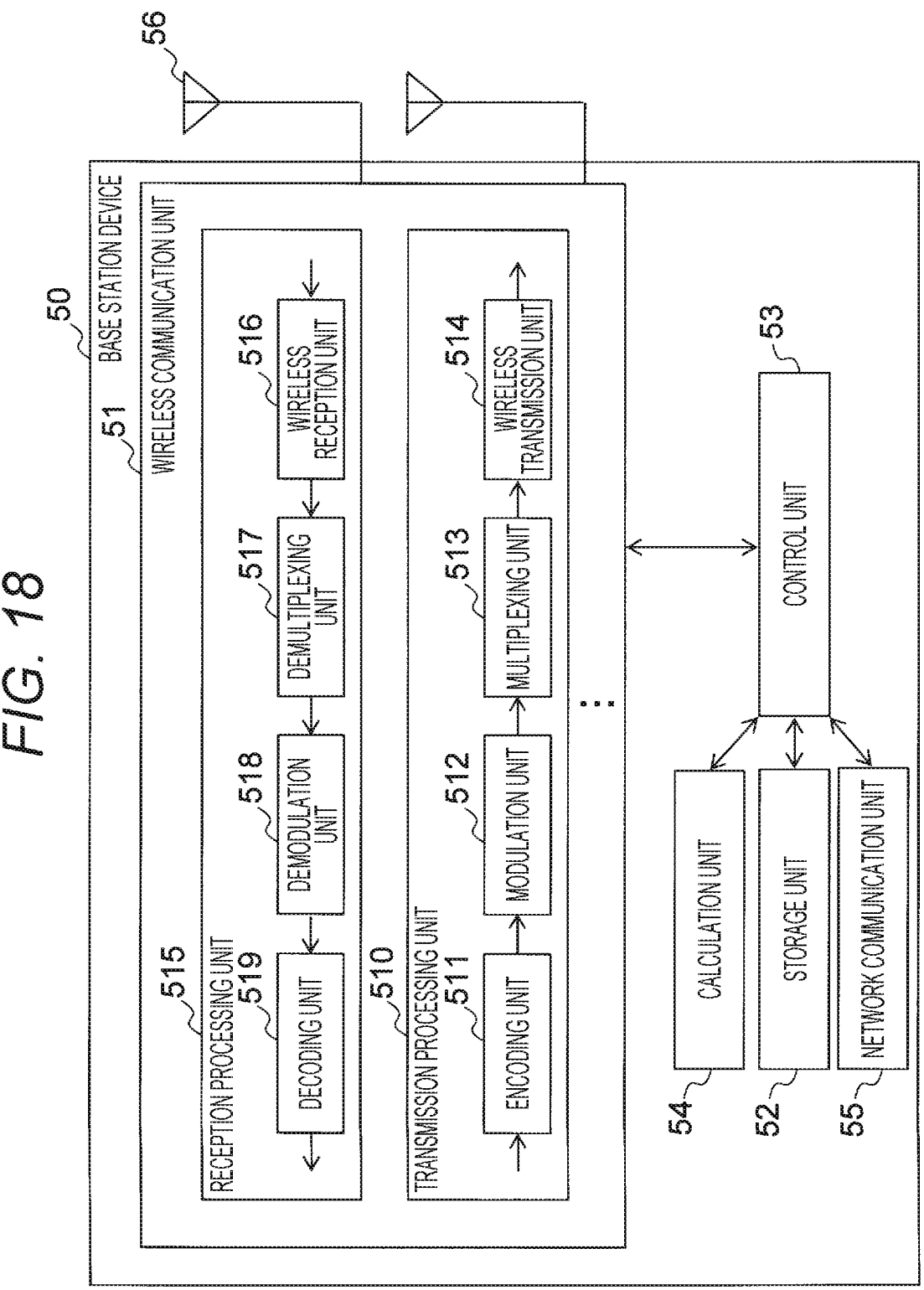
FIG. 18 is a diagram illustrating a configuration example of a base station device.

FIG. 18 is a diagram illustrating a configuration example of the base station device. A base station device 50 illustrated in FIG. 18 is assumed to perform wireless communication, and includes a wireless communication unit 51, a storage unit 52, a control unit 53, a calculation unit 54, a network communication unit 55, and an antenna 56. Note that the configuration illustrated in FIG. 18 is a functional configuration, and may be different from a hardware configuration. In addition, the components in FIG. 18 may be further distributed or aggregated with other components. In addition, the components of FIG. 18 may exist independently as a device different from the base station device 50, and the function of the base station device 50 may be realized by a plurality of devices.

The wireless communication unit 51 performs signal processing for wirelessly communicating with another wireless communication device (for example, the communication terminal 11). The wireless communication unit 51 operates according to the control of the control unit 53. The wireless communication unit 51 supports one or more wireless access methods. For example, the wireless communication unit 51 supports both new radio (NR) and long term evolution (LTE). The wireless communication unit 51 may support wideband code division multiple access (W-CDMA), code division multiple access 2000 (CDMA2000) in addition to NR or LTE. In addition, the wireless communication unit 51 may support an automatic retransmission technique such as a hybrid automatic repeat request (HARQ).

The wireless communication unit 51 includes a transmission processing unit 510 and a reception processing unit 515. The wireless communication unit 51 may include a plurality of transmission processing units 510 and a plurality of reception processing units 515. Note that, in a case where the wireless communication unit 51 supports a plurality of wireless access methods, each component of the wireless communication unit 51 may be configured individually for each wireless access method. For example, the transmission processing unit 510 and the reception processing unit 515 may be individually configured by LTE and NR. Furthermore, the antenna 56 may include one or more antenna elements, or may include a plurality of antenna elements (for example, a plurality of patch antennas). In this case, the wireless communication unit 51 may be configured to enable beamforming. The wireless communication unit 51 may be configured to enable polarization beamforming using vertically polarized waves (V-polarized waves) and horizontally polarized waves (H-polarized waves).

The transmission processing unit 510 performs a process of transmitting downlink control information and downlink data. For example, an encoding unit 511 of the transmission processing unit 510 encodes the downlink control information and the downlink data input from the control unit 53 by using an encoding method such as block encoding, convolutional encoding, and turbo encoding. Here, the encoding may be performed by encoding with a polar code or encoding with a low density parity check code (LDPC code).

Then, a modulation unit 512 of the transmission processing unit 510 modulates the encoded bits by a predetermined modulation method such as binary phase shift keying (BPSK), quadrature phase shift keying (QPSK), quadrature amplitude modulation (16QAM), 64QAM, or 256QAM. In this case, signal points on constellation of the modulation method do not necessarily have to be equidistant. The constellation may be non-uniform constellation (NUC).

Then, a multiplexing unit 513 of the transmission processing unit 510 multiplexes the modulation symbol of each channel used in transmission and a downlink reference signal and arranges the result in a predetermined resource element.

Then, the transmission processing unit 510 performs various types of signal processing on the multiplexed signal. For example, a wireless transmission unit 514 of the transmission processing unit 510 performs processing such as conversion into a frequency domain by fast Fourier transform, addition of a guard interval (cyclic prefix), generation of a baseband digital signal, conversion into an analog signal, quadrature modulation, up-conversion, removal of an extra frequency component, and amplification of power. The signal generated by the wireless transmission unit 514 is transmitted from the antenna 56.

The reception processing unit 515 processes an uplink signal received via the antenna 56. For example, a wireless reception unit 516 of the reception processing unit 515 performs, on the uplink signal, down-conversion, removal of an unnecessary frequency component, control of an amplification level, quadrature demodulation, conversion to a digital signal, removal of a guard interval (cyclic prefix), extraction of a frequency domain signal by fast Fourier transform, and the like.

Then, a demultiplexing unit 517 of the reception processing unit 515 demultiplexes an uplink channel such as a physical uplink shared channel (PUSCH) or a physical uplink control channel (PUCCH) and an uplink reference signal from the signal subjected to the processing of the wireless reception unit 516.

Furthermore, a demodulation unit 518 of the reception processing unit 515 performs demodulation of the reception signal using a modulation method such as BPSK or QPSK, on the modulation symbol of the uplink channel. The modulation method to be used for demodulation may be 16QAM, 64QAM, or 256QAM. In this case, signal points on constellation do not necessarily have to be equidistant. The constellation may be non-uniform constellation (NUC).

Then, a decoding unit 519 of the reception processing unit 515 performs decoding processing on the demodulated encoded bits of the uplink channel. The decoded uplink data and uplink control information are output to the control unit 53.

The antenna 56 mutually converts a current and radio waves. The antenna 56 may include one antenna element (for example, one patch antenna) or may include a plurality of antenna elements (for example, a plurality of patch antennas). In a case where the antenna 56 includes a plurality of antenna elements, the wireless communication unit 51 may be configured to enable beamforming. For example, the wireless communication unit 51 may be configured to generate a directional beam by controlling the directivity of a wireless signal using a plurality of antenna elements. Note that the antenna 56 may be a dual-polarized antenna. In a case where the antenna 56 is a dual-polarized antenna, the wireless communication unit 51 may use vertically polarized waves (V-polarized waves) and horizontally polarized waves (H-polarized waves) in transmitting a wireless signal. Then, the wireless communication unit 51 may control the directivity of the wireless signal transmitted using the vertically polarized waves and the horizontally polarized waves.

The storage unit 52 stores information required for processing of the base station device 50, a processing result, and the like as storage means of the base station device 50. For example, various programs for performing processing of the base station device 50 may be stored.

The control unit 53 controls each unit of the base station device 50. For example, the control unit 53 performs control required for acquiring, from the outside, information related to a DNN to be used from a logical entity or the like, a condition for determining a handling range of a series of computations in the DNN, and the like via the wireless communication unit 51 or the network communication unit 55.

The calculation unit 54 performs calculation required for processing of the base station device 50 according to an instruction of the control unit 53. For example, the calculation unit 54 may take over a part of the processing performed by the transmission processing unit 510 or the reception processing unit 515, for example, calculation with a high load. Furthermore, for example, in a case where the base station device is a computation handler, the calculation unit 54 may compute the handling range of the base station device. Furthermore, for example, in a case where the base station device 50 is a logical entity, processing executed by the logical entity, for example, determination of a computation handler on the basis of resources, determination of a handling range, and the like may be performed by the calculation unit 54.

The network communication unit 55 performs signal processing for wired communication with another communication device (for example, the cloud system 12). For example, the network communication unit 55 is connected to an access and mobility management function (AMF) or a user plane function (UPF) of the core network to exchange information and signaling.

In some embodiments, the base station device may include a plurality of physical or logical devices. For example, in the present embodiment, the base station device may be distinguished into a plurality of devices such as a baseband unit (BBU) and a radio unit (RU). Then, the base station device may be interpreted as an aggregate of the plurality of devices, in other words, a base station system. In addition, the base station device may be either or both of a BBU and an RU. The BBU and the RU may be connected by a predetermined interface such as an enhanced common public radio interface (eCPRI). Note that the RU may be referred to as a remote radio unit (RRU) or a radio dot (RD). Furthermore, the RU may correspond to a gNB distributed unit (gNB-DU) described later. Further, the BBU may correspond to a gNB central unit (gNB-CU) described later. Moreover, the RU may be a device integrally formed with an antenna. The antenna (for example, the antenna integrally formed with the RU) of the base station device may adopt an Advanced Antenna System and support MIMO (for example, FD-MIMO) or beamforming. Furthermore, the antenna of the base station may include, for example, 64 pieces of transmission antenna ports and 64 pieces of reception antenna ports.

In addition, one or more antennas may be attached to the RU, and the antenna may be an antenna panel including one or more antenna elements. For example, the RU may be equipped with an antenna panel including two types of antenna panels being an antenna panel of horizontally polarized waves and an antenna panel of vertically polarized waves, or an antenna panel including two types of antenna panels being an antenna panel of clockwise circularly polarized waves and an antenna panel of counterclockwise circularly polarized waves. Furthermore, the RU may form and control an independent beam for each antenna panel.

Note that a base station of a wireless access network (RAN: radio access network) may be referred to as a RAN node, and a base station of an access network (AN) may be referred to as an AN node. Note that a RAN in LTE may be called an enhanced universal terrestrial RAN (E-UTRAN). In addition, a RAN in NR may be called an NG-RAN. In addition, a RAN in W-CDMA (UMTS) may be called an UTRAN.

Note that an LTE base station is also referred to as an evolved Node B (eNodeB) or an eNB. At this time, it can be said that an E-UTRAN includes one or a plurality of eNodeBs (eNBs). Furthermore, an NR base station is also referred to as a gNodeB or a gNB. At this time, it can be said that an NG-RAN includes one or a plurality of gNBs. The E-UTRAN may include a gNB (en-gNB) connected to a core network (EPC) in an LTE communication system (EPS). Similarly, the NG-RAN may include an ng-eNB connected to a core network 5GC in a 5G communication system (5GS).

Note that, in a case where the base station is an eNB, a gNB, or the like, the base station may be referred to as a 3GPP access. In addition, in a case where the base station is a wireless access point (Access Point), the base station may be referred to as a non-3GPP access. Furthermore, in a case where the base station is a gNB, the base station may be a combination of the gNB-CU and the gNB-DU described above, or may be either the gNB-CU or the gNB-DU.

Here, the gNB-CU hosts a plurality of higher layers (for example, an RRC, an SDAP, and a PDCP) in an access stratum for communication with UE. On the other hand, the gNB-DU hosts a plurality of lower layers (for example, an RLC, a MAC, and a PHY) in an access stratum. That is, among messages or pieces of information such as RRC signaling, the MAC control element (MAC CE), and the DCI, the RRC signaling (semi-static notification) may be generated by the gNB-CU, while the MAC CE and the DCI (dynamic notification) may be generated by the gNB-DU. Alternatively, in the RRC configuration (semi-static notification), for example, some configurations such as IE: cell-GroupConfig may be generated by the gNB-DU, and the remaining configurations may be generated by the gNB-CU. The configurations may be transmitted and received through an F1 interface described later.

Note that the base station may be configured to be able to communicate with another base station. For example, in a case where a plurality of base station devices is eNBs or a combination of an eNB and an en-gNB, the base station devices may be connected by an X2 interface. Further, in a case where the plurality of base station devices is gNBs or a combination of a gn-eNB and a gNB, the base station devices may be connected by an Xn interface. Moreover, in a case where the plurality of base station devices is a combination of a gNB-CU and a gNB-DU, the base station devices may be connected by an F1 interface. A message or information such as RRC signaling, the MAC CE, or the DCI may be transmitted between a plurality of base station devices, for example, via an X2 interface, an Xn interface, or an F1 interface.

A cell provided by the base station may be called a serving cell. The concept of the serving cell includes a primary cell (PCell) and a secondary cell (SCell). In a case where dual connectivity is configured for UE, the PCell provided by a master node (MN), and zero or one or more SCells may be called a master cell group. Examples of dual connectivity include E-UTRA-E-UTRA Dual Connectivity, E-UTRA-NR Dual Connectivity (ENDC), E-UTRA-NR Dual Connectivity with 5GC, NR-E-UTRA Dual Connectivity (NEDC), and NR-NR Dual Connectivity.

Note that the serving cell may include a Primary Secondary Cell or Primary SCG Cell (PSCell). In a case where dual connectivity is configured for the UE, the PSCell provided by a secondary node (SN), and zero or one or more SCells may be called a secondary cell group (SCG). Unless a special setting is made (for example, PUCCH on SCell), a physical uplink control channel (PUCCH) is transmitted in the PCell and the PSCell, but is not in the SCell. Also, a radio link failure is detected in the PCell and the PSCell, but is not detected in the SCell (may not be detected). As described above, the PCell and the PSCell have special roles among the serving cells and can thus be referred to also as special cells (SpCells).

One downlink component carrier and one uplink component carrier may be associated with one cell. In addition, a system bandwidth corresponding to one cell may be divided into a plurality of bandwidth parts (BWPs). In this case, one or a plurality of BWPs may be configured for UE, and one BWP may be used for the UE as an active BWP. Further, wireless resources (for example, a frequency band, numerology (subcarrier spacing), and a slot format (slot configuration) that can be used by UE may be different for each cell, each component carrier, or each BWP.

The communication terminal 11 will be supplemented. The communication terminal 11 may move by being installed in a moving object or may be a moving object itself. For example, the communication terminal 11 may be a vehicle that moves on a road, such as an automobile, a bus, a truck, or a motorcycle, a vehicle that moves on a rail installed on a track, such as a train, or a wireless communication device mounted on the vehicle. Note that the moving object may be a mobile terminal, or may be a moving object that moves on a land (on the ground in a narrow sense), in the ground, on water, or under water. Furthermore, the moving object may be a moving object that moves inside the atmosphere, such as a drone or a helicopter, or may be a moving object that moves outside the atmosphere, such as an artificial satellite. Furthermore, the communication terminal 11 may be used for any main purpose as long as the communication terminal is a device that is provided with an information processing function and a communication function and can perform the processing in the present disclosure. For example, a device such as a business camera, which is provided with an information processing function and a communication function may be provided, or a communication device such as a field pickup unit (FPU) may be provided. Furthermore, the communication terminal 11 may be a machine to machine (M2M) device or an Internet of things (IoT) device.

Note that the communication terminal 11 may be capable of NOMA communication with the base station. In addition, the communication terminal 11 may be able to use an automatic retransmission technique such as the HARQ, in communicating with the base station. The communication terminal 11 may be capable of sidelink communication with another communication terminal 11. The communication terminal 11 may also be able to use an automatic retransmission technique such as the HARQ, in performing sidelink communication. Note that the communication terminal 11 may also be capable of NOMA communication in communication (sidelink) with another communication terminal 11. Furthermore, the communication terminal 11 may be capable of LPWA communication with another communication device (for example, a base station or another communication terminal 11). Furthermore, the wireless communication used by the communication terminal 11 may be wireless communication using millimeter waves. Note that the wireless communication (including sidelink communication) used by the communication terminal 11 may be wireless communication using radio waves or wireless communication (optical wireless) using infrared rays or visible light.

The communication terminal 11 may be a communication device installed in a moving object or a communication device having a mobility. For example, a moving object in which the communication terminal 11 is installed may be a vehicle that moves on a road, such as an automobile, a bus, a truck, or a motorcycle, or a vehicle that moves on a rail installed on a track, such as a train. Note that a place in which the moving object moves is not particularly limited. Therefore, the moving object may be a moving object that moves on a land (on the ground in a narrow sense), in the ground, on water, or under water. Furthermore, such a moving object may be a moving object that moves inside the atmosphere, such as a drone or a helicopter, or may be a moving object that moves outside the atmosphere, such as an artificial satellite.

The communication terminal 11 may be simultaneously connected to a plurality of base stations or a plurality of cells and perform communication. For example, in a case where one base station supports a communication area via a plurality of cells (for example, pCell, sCell), the base station and the communication terminal 11 can communicate with each other by bundling the plurality of cells by a carrier aggregation (CA) technique, a dual connectivity (DC) technique, or a multi-connectivity (MC) technique. Alternatively, the communication terminal 11 and a plurality of base stations can communicate with each other by a coordinated multi-point transmission and reception (COMP) technique via cells of different base stations.

Figure 19:
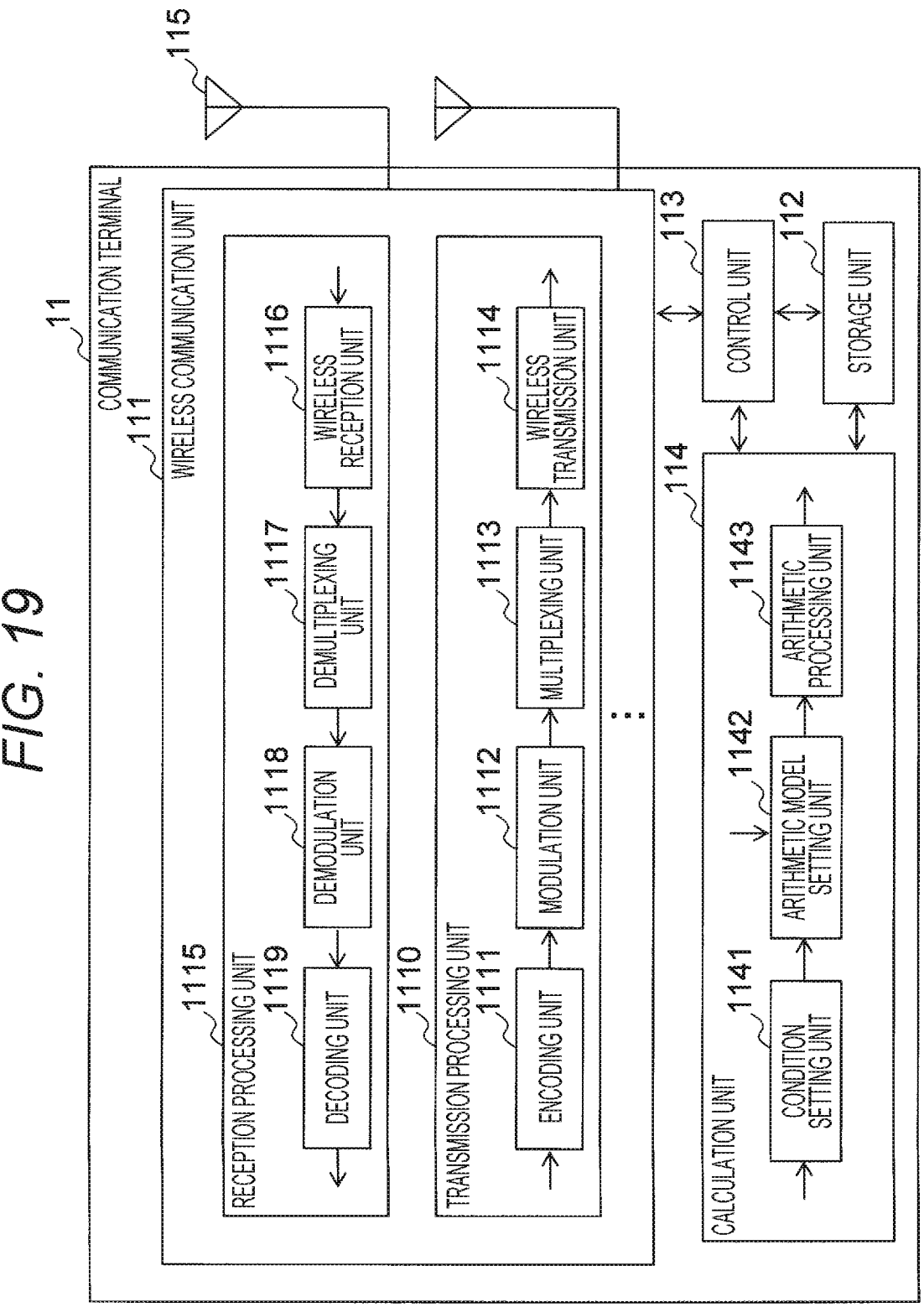
FIG. 19 is a diagram illustrating a configuration example of a communication terminal.

FIG. 19 is a diagram illustrating a configuration example of the communication terminal 11. FIG. 19 illustrates a configuration example in a case where wireless communication is performed. The communication terminal 11 includes a wireless communication unit 111, a storage unit 112, a control unit 113, a calculation unit 114, and an antenna 115. Note that the configuration illustrated in FIG. 19 is a functional configuration, and may be different from a hardware configuration. Furthermore, the functions of the communication terminal 11 may be distributed and implemented in a plurality of physically separated components.

The wireless communication unit 111 performs signal processing for wirelessly communicating with another wireless communication device (for example, a base station, a relay station, the wireless communication node 131, the donor node 132, another communication terminal 11, and the like). The wireless communication unit 111 operates according to the control of the control unit 113. The wireless communication unit 111 includes a transmission processing unit 1110 and a reception processing unit 1115. The components related to the wireless communication in the communication terminal 11 may be similar to the corresponding components related to the wireless communication in the base station device 50. That is, the configurations of the wireless communication unit 111, the components in the wireless communication unit 111, and the antenna 115 may be similar to the wireless communication unit 51 of the base station device 50, the components in the wireless communication unit 51, and the antenna 56, respectively. Furthermore, the wireless communication unit 111 may be configured to enable beamforming, similarly to the wireless communication unit 51 of the base station device 50.

The storage unit 112 stores information required for processing of the communication terminal 11, a processing result, and the like as storage means of the communication terminal 11. For example, various programs for performing processing of the communication terminal 11 may be stored.

The control unit 113 controls each unit of the communication terminal 11. For example, the control unit 113 performs control required for acquiring, from the outside, information related to a DNN to be used from a logical entity or the like, a condition for determining a handling range of a series of computations in the DNN, and the like via the wireless communication unit 111.

The calculation unit 114 performs calculation required for processing of the communication terminal 11 according to an instruction of the control unit 113. For example, the calculation unit 114 may take over a part of the processing performed by the transmission processing unit 1110 or the reception processing unit 1115, for example, calculation with a high load. Furthermore, for example, calculation required for the ML application executed by the communication terminal 11, such as the computation of the DNN, is performed.

Figure 20:
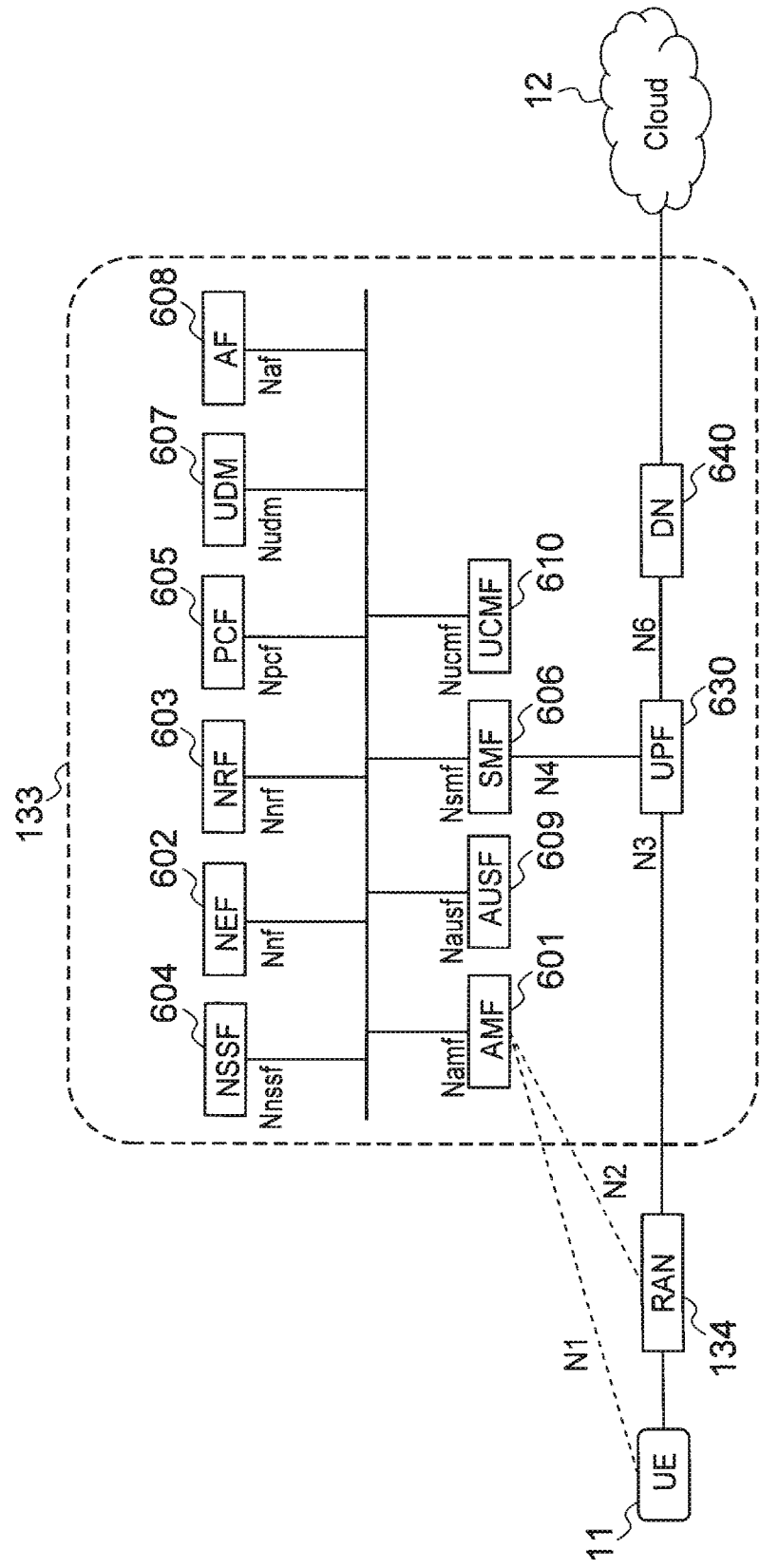
FIG. 20 is a diagram illustrating a configuration example of a network architecture of a 5G system (5GS) including a core network.

The core network will be supplemented. FIG. 20 is a diagram illustrating a configuration example of a network architecture of a 5G system (5GS) including a core network 133. In the example of FIG. 20, the 5GS includes a communication terminal 11 (described as UE in FIG. 20), a RAN 134, and a core network 133. Like the wireless communication node 131 and the donor node 132 of FIG. 1, the RAN 134 includes a network function (NF). The core network 133 in the 5GS is called a next generation core (NGC), a 5G core (5GC), or the like.

In the example of FIG. 20, a function group of a control plane of the core network 133 includes a plurality of NFs such as an access and mobility management function (AMF) 601, a network exposure function (NEF) 602, a network repository function (NRF) 603, a network slice selection function (NSSF) 604, a policy control function (PCF) 605, a session management function (SMF) 606, a unified data management (UDM) 607, an application function (AF) 608, an authentication server function (AUSF) 609, and a UE radio capability management function (UCMF) 610.

The UDM 607 performs holding, management, processing, and the like of subscriber information. Note that an execution unit for holding and managing the subscriber information may also be referred to as a unified data repository (UDR) and may be separated from a front end (FE) that is an execution unit for processing the subscriber information. In addition, the AMF 601 performs mobility management. The SMF 606 performs session management. The UCMF 610 holds UE radio capability information corresponding to all UE radio capability IDs in a Public Land Mobile Network (PLMN). The UCMF 610 is responsible for assigning each PLMN-assigned UE radio capability ID.

FIG. 20 illustrates a service-based interface of the NF. Namf is a service-based interface provided by the AMF 601. Nsmf is a service-based interface provided by the SMF 606. Nnef is a service-based interface provided by the NEF 602. Npcf is a service-based interface provided by the PCF 605. Nudm is a service-based interface provided by the UDM 607. Naf is a service-based interface provided by the AF 608. Nnrf is a service-based interface provided by the NRF 603. Nnssf is a service-based interface provided by the NSSF 604, and Nausf is a service-based interface provided by the AUSF 609. Each NF exchanges information with another NF via each service-based interface.

Interaction may be required in order for an application operating in the application layer to acquire information regarding a communication network (information on the network layer side) such as communication quality. In such a case, a regulation such as the NEF 602 may be provided. According to the regulation, the information of the communication layer can be grasped in detail on the application side, and the NF can also be controlled from an external application.

Furthermore, a user plane function (UPF) 630 executes user plane processing. A data network (DN) 640 enables a connection to a service unique to a mobile network operator (MNO), the Internet, or a third-party service.

The RAN 134 performs a communication connection with the core network 133, the communication terminal 11, and the like. Note that a communication connection with another communication network (not illustrated), for example, an access network (AN) may also be performed. The RAN 134 includes a base station called a gNB or an ng-eNB. The RAN may be referred to as a next generation (NG)-RAN.

Information is exchanged between UE 10 and the AMF 601 via a reference point N1. Information is exchanged between the RAN 134 and the AMF 601 via a reference point N2. Information is exchanged between the SMF 606 and the UPF 630 via a reference point N4.

Note that the communication quality may be indicated by, for example, a delay time in transmission and reception, a data rate, a channel occupancy ratio, or the like. The channel occupancy may be indicated by a channel busy ratio (CBR), a resource usage rate, or a congestion degree. For example, the CBR may be indicated by a ratio of used radio resources with respect to the total available wireless resources. In addition, the congestion degree may be indicated by a ratio of a received signal strength indicator (RRSI) that is the entire reception power in the band with respect to reference signal received power (RSRP) that is the reception strength of a reference signal. In addition, the congestion degree may be indicated by a reciprocal of reference signal received quality (RSRQ) which is the reception quality of the reference signal.

Second Embodiment

As described in the first embodiment, an ML application performs processing on the basis of a result of a series of computations of a DNN. However, recent research has revealed that there may be a case where the processing result of the ML application is less affected even though the processing of the ML application has been performed on the basis of the computation result in the middle of the series of computations. As described above, breaking out in the middle of computations without performing all of a series of computations of a DNN is referred to as Early-exiting (also referred to as Early termination).

By performing Early-exiting, the accuracy of the ML application may be lowered, but, since the computation is not performed to the last, the time required until the processing of the ML application is completed is suppressed. In particular, as in the first embodiment, in a case where a plurality of communication devices shares a computation and sequentially transfers computation results via a communication network, the computation result of the DNN may be transmitted as a response later than expected, depending on the state of communication resources such as an available computation capability and communication quality. Therefore, an information processing system according to a second embodiment performs Early-exiting according to the situation, and transmits, as a response, a computation result in the middle of a series of computations of a DNN to the communication terminal 11. Therefore, the time required until the processing of the ML application is completed is suppressed.

Note that, in the first embodiment, the logical entity determines the computation handler. However, in the second embodiment in which Early-exiting is performed, the computation handler may be determined in advance. In addition, in the first embodiment, the logical entity can dynamically change the computation handler according to the situation, but in the second embodiment, the computation handler may be fixed and cannot be changed. Furthermore, in a case where it is determined that the request of the ML application such as the delay time cannot be satisfied, it may be determined which one of the dynamic change of the computation handler and Early-exiting is executed.

Note that, in a case where Early-exiting is performed, one of computation handlers transmits the computation result in the middle of the series of computations of the DNN to the communication terminal 11. However, the computation handler may execute the computation of the handling range designated by the logical entity to the end and transmit the executed computation result to the communication terminal 11, or may end the computation in the middle of the handling range and transmit the executed computation result to the communication terminal 11. For example, when the handling range of a certain computation handler is the third layer and the fourth layer of the DNN, the computation up to the third layer may be performed, and the computation result of the third layer may be transmitted to the communication terminal 11.

However, in a case where Early-exiting is performed, it is preferable to consider a position at which the computation is ended. As illustrated in FIG. 4, the data size in each layer of the DNN is inconsistent. Therefore, the logical entity has determined the handling range of the computation handler so as not to increase the delay due to the large data size to be transmitted. Therefore, in a case where the computation handler ends the computation of the handling range in the middle, a situation in which the data size of the computation result becomes large depending on the position at which the computation has been ended in the middle, it takes time for communication, and a delay increases even though Early-exiting is performed may occur. In addition, in a case where the communication band between computation handlers is large, the logical entity may determine that there is no problem even though the data size of the computation result is large. However, in a case of performing Early-exiting, the computation result is transmitted not to the next computation handler but to the communication terminal 11, and thus, the communication band to be considered becomes different.

For example, the communication terminal 11 and a communication node A that is the first computation handler may be wirelessly connected, and the communication node A and a communication node B that is the second computation handler may be connected in a wired manner. In such a case, the data size of the computation result transmitted from the communication node A to the communication node B may be too large for wireless communication. In addition, in the computation result in a case where the handling range of the communication node A has been computed, there is a possibility that the accuracy of the ML application is lowered. As described above, it may be not suitable for Early-exiting to cause each computation handler to execute all computations included in the handling range.

Figure 21:
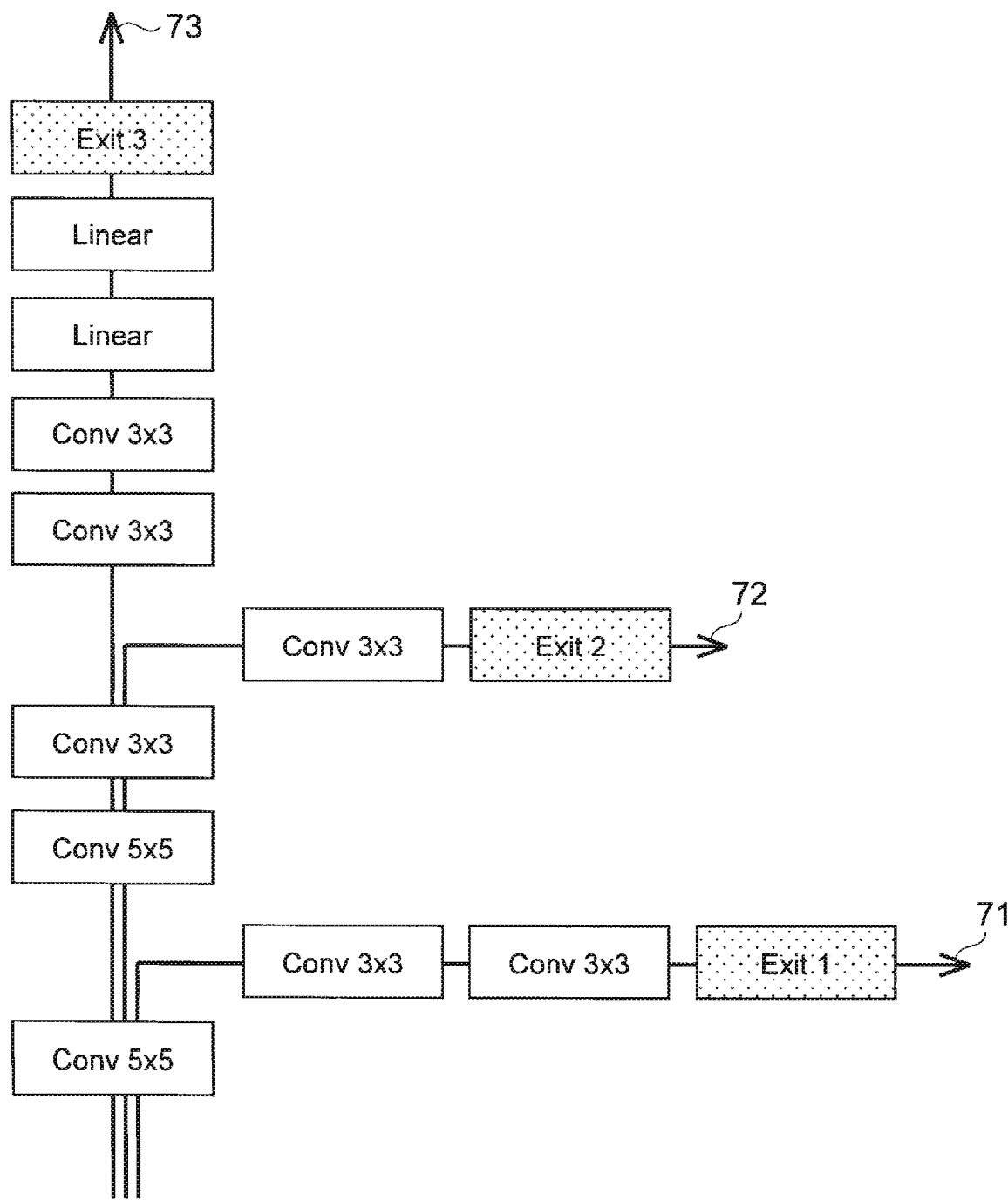
FIG. 21 is a diagram illustrating an example of a computation range in a case where Early-exiting is performed.

Furthermore, in a case where the computation of the handling range is ended in the middle, an additional computation may be executed for the purpose of improving the processing accuracy of the ML application, or the like. In addition, the additional computation may be different depending on the position at which the computation is ended in the middle. For example, a plurality of computation ranges in a case where the computation of the handling range is ended in the middle may be prepared in advance. In a case where the computation of the handling range is ended in the middle, any one of the plurality of computation ranges may be selected. FIG. 21 is a diagram illustrating an example of a computation range in a case where Early-exiting is performed. A computation flow 71 indicated by an arrow in FIG. 21 illustrates a flow of a computation (computation range) in a case where the computation of the handling range is ended in the middle. A computation flow 72 illustrates a flow of a computation in a case where the computation of the handling range is ended in the middle. A computation flow 73 illustrates a flow of a computation in a case where the computation of the handling range is not ended in the middle. Convolution processing after bending of the computation flow 71 and the computation flow 72 is a computation added separately from the computation included in the normal handling range. Here, the computation for outputting an inference result is performed from the computation flow that has been ended in the middle. In other words, a computation for transmitting a result of an intermediate computation in the series of computations of the deep neural network is performed. As illustrated in the computation flow 73, in a case where Early-exiting is not performed, 5×5 convolution processing (Conv 5×5) is performed as the second processing, but the second processing on the computation flow 71 is 3×3 convolution processing (Conv 3×3). Which of the computation flow 71 and the computation flow 72 is executed may be selected according to the data size of the computation result, the time required, and the like. Alternatively, the computation flow 72 may be selected in a case where the computation is in progress at a time point when the computation handler has received an execution instruction of Early-exiting, and the execution is not possible as in the computation flow 71. As illustrated in the first to third computation flows, in a case where Early-exiting is performed, the computation handler executes a computation of at least a part of the handling range, but the entire computation details executed by the computation handler may vary depending on the situation at that time. Note that the determination of Early-exiting may be made at any position between the start and the end in the computation of the handling range. In other words, the computation may be executed before the determination, the computation may not be executed before the determination, the computation may be executed after the determination, or the computation may not be executed after the determination. In addition, the presence or absence of such processing may be different on the basis of the determination result or other type of information described in the present specification.

Various determination conditions are conceivable for Early-exiting, and may be appropriately determined. A plurality of conditions may be provided, or a determination condition on the basis of a plurality of parameters may be used. For example, a condition related to the computation result may be used as the determination condition of Early-exiting. For example, the determination may be performed on the basis of the final computation result of the own computation range or the computation result in each layer. In addition, the determination may be performed after an activation function such as a softmax function is further applied to the computation result. Furthermore, the determination may be made by using the value of the cross entropy. For example, when the output value of the softmax function is equal to or more than a predetermined threshold value, the processing of the DNN may be ended in this layer, and Early-exiting may be performed.

In addition, as the determination condition of Early-exiting, a condition related to the computation handler may be provided. For example, the available computation capability of the computation handler may be used as the determination condition.

In addition, as the determination condition of Early-exiting, a condition related to the computation handler may be provided. For example, the communication quality of the communication network, such as an RARP, an RARQ, an RSSI, and Link failure, may be used as the determination condition. For example, in a case where the quality of the communication link to the next computation handler is poor, a packet error may result in a large delay. Therefore, a determination condition in which, as the communication quality becomes worse, Early-exiting is performed as much as possible may be provided. In addition, if the data amount of the computation result to be transmitted is small, transmission may be possible even though the communication quality is poor. Therefore, the data amount of the computation result to be transmitted may also be included in the determination condition. Further, path information of the communication network may be used as the determination condition. For example, since a band of a communication link is generally narrow in terminal-to-terminal communication (PC5), in a case of terminal-to-terminal communication (PC5), a determination condition in which the communication quality is regarded as being poor, and Early-exiting is performed may be provided. In addition, a determination condition on the basis of traffic such as information on the amount of traffic flowing on a route and information on the amount of traffic processed by each node may be provided. Note that the traffic may be represented by a usage rate of communication resources and the like.

In addition, as the determination condition of Early-exiting, a condition regarding the movement (mobility) of the communication terminal 11 may be provided. For example, information regarding the moving speed, the moving direction, link switching caused by the movement, and handover may be used as the determination condition. In a case where the mobility of the communication terminal 11 is high, a possibility that the communication terminal 11 performs handover during the computation of the DNN is high. Therefore, it is conceivable that Early-exiting is performed and the computation result in the middle of the DNN is transmitted, as a response, to the communication terminal 11 before handover is caused.

In addition, whether or not a request from the ML application or the like is satisfied may be used as the determination condition. For example, in a case where request information including the time (delay) until the computation result of the DNN is transmitted, as a response, to the communication terminal 11, the certainty (accuracy) of the computation result in the middle of the DNN, which is transmitted as a response by Early-exiting, and the like is acquired from the ML application, whether or not to satisfy the requirements may be determined on the basis of the available computation capability, the communication quality, the past records, and the like.

In addition, a determination condition as to whether or not an execution instruction of Early-exiting has been received may be provided. For example, in a case where it is desired to keep the time (delay) until the computation result of the DNN is transmitted, as a response, to the communication terminal 11 within a predetermined time, the communication terminal 11 adds a time stamp in the application layer, counts the time until the response is received, and transmits an execution instruction of Early-exiting at a time point when the time exceeds the upper limit. In a case where the communication terminal 11 recognizes all the computation handlers, the communication terminal 11 may transmit the execution instruction to all the computation handlers. In a case where the communication terminal 11 does not recognize each computation handler, or the like, an execution instruction may be relayed from the communication terminal 11 to each computation handler in order. Then, the computation handler that has received the notification of Early-exiting during the computation may perform Early-exiting. Note that, instead of the communication terminal 11 counting the required time, it is conceivable that each computation handler subtracts the time required for the computation from the allowable time set in advance and notifies the next computation handler, and the computation handler that has used up the allowable time transmits the computation result to the communication terminal 11. Furthermore, in a case where the time required for computing the handling range is shorter than the allowable time, it is conceivable to end the computation of the handling range in the middle. Note that values of parameters for determining whether or not to perform Early-exiting, such as the upper limit value of the required time and the delay margin value, may be determined by the logical entity or may be determined by the ML application.

Note that the determination condition of Early-exiting may be changed according to a time section, the type of the ML application, another ML application executed in parallel, or the like. For example, in the case of an ML application requiring accuracy, the determination condition of early exiting may be stricter than the standard. In the case of an ML application requiring reduction in the required time, the determination condition of Early-exiting may be gentler than the standard.

Furthermore, a notification of the information used for the determination condition may be transmitted from the application layer to the communication layer via a network exposure function (NEF) or the like.

Figure 22:
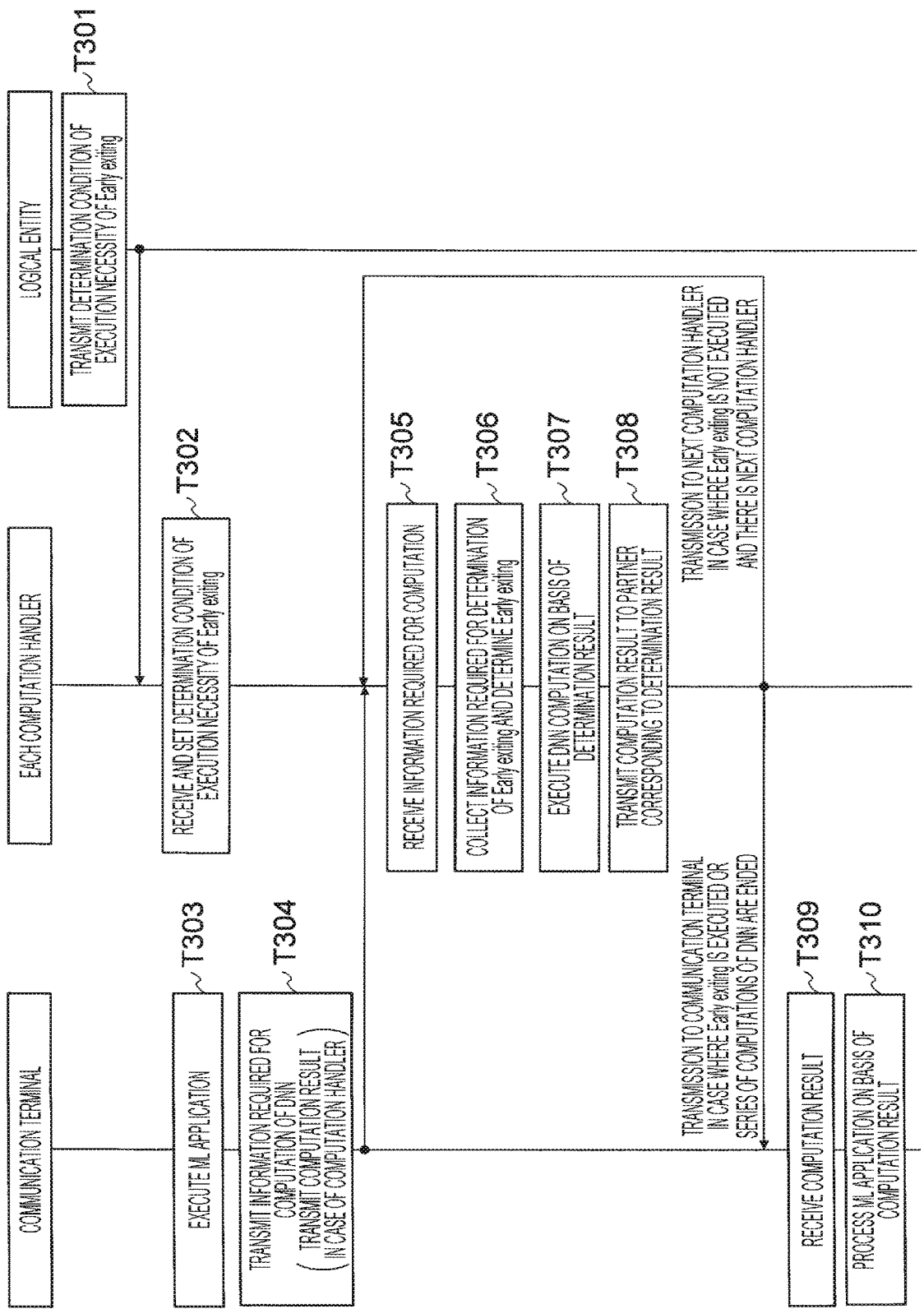
FIG. 22 is a schematic sequence diagram illustrating a first example of a flow of processing related to Early-exiting.

A flow of processing in performing Early-exiting will be described. FIG. 22 is a schematic sequence diagram illustrating a first example of the flow of processing related to Early-exiting. Note that, for convenience of the drawing, the computation handlers other than the communication terminal are collectively represented as one.

The logical entity transmits the determination condition of Early-exiting to the computation handler (T301). Note that, in a case where the computation handler is not fixed, the determination condition may be transmitted to an entity that may serve as the computation handler in advance. Alternatively, at a time point when the computation handler has been changed, a notification that the computation handler has been changed may be issued and the determination condition may be transmitted. Each computation handler receives and sets the determination condition from the logical entity (T302).

Thereafter, the communication terminal 11 executes the ML application (T303), and transmits information required for the computation of the DNN to the next computation handler (T304). In a case where the communication terminal 11 is the computation handler, the computation result of the DNN performed by the communication terminal 11 is also included in the information required for the computation of the DNN. Furthermore, the communication terminal 11 may transmit information used for determination. For example, the communication terminal 11 may transmit, to each computation handler, the upper limit value (allowable time) of the time required until the computation result is transmitted, as a response, to the communication terminal 11, the accuracy of the computation result, and the like. Each computation handler may use the information as the value of the parameter of the determination condition.

The next computation handler receives information required for the computation of the DNN (T305), collects information required for determination of Early-exiting, and performs determination of Early-exiting by using the collected information (T306). Note that, in a case where the information may be collected in advance, the information may be collected in advance. The computation of the DNN is executed on the basis of the determination result (T307). As described above, the computation range of the DNN may be different between the case of executing Early-exiting and the case of not executing Early-exiting.

Note that, here, the computation of the DNN is started after the determination of Early-exiting is performed, but the determination of the early exit may be performed in the middle of the computation of the DNN.

The computation handler transmits the computation result to a partner corresponding to the determination result (T308). In a case where Early-exiting is not performed and the next computation handler exists, the computation result is transmitted to the next computation handler. In this case, the next computation handler performs the processes from T305 to T308. Note that an arrow from T308 to T305 in FIG. 22 does not mean that the same computation handler performs the processes from T305 to T308 again, but means that another computation handler performs the processes from T305 to T308. In a case where there is no next computation handler, in other words, in a case where the computation has ended up to the output layer of the DNN, and in a case where Early-exiting has been executed, the computation handler transmits the computation result to the communication terminal 11. Note that necessary information other than the computation result may be transmitted. For example, in a case where the computation handler receives information used for determination from the communication terminal 11, the information is also transmitted to the next computation handler. The information used for the determination of Early-exiting may be sequentially transmitted to the computation handler in a bucket relay manner.

The communication terminal 11 receives the computation result of the DNN (T309), and executes processing of the ML application on the basis of the computation result (T310). In a case where Early-exiting is executed as in the example of FIG. 22, the computation result is transmitted to the communication terminal 11 without waiting for the end of the series of computations of the DNN. Thus, it is possible to prevent an occurrence of a situation in which the processing of the ML application is delayed.

As described above, the transmission destination of the computation result of the computation handler is different depending on whether or not Early-exiting is performed. In a case where Early-exiting has been performed, the computation result of the computation handler is transmitted to the communication terminal 11. Therefore, the determination of Early-exiting can also be said to be determination of whether or not to transmit the computation result to the communication terminal 11.

Another example of Early-exiting will be described. In the above description regarding Early-exiting, the computation result in the middle of the series of computations in the DNN is transmitted, as a response, to the communication terminal 11 to reduce the waiting time of the communication terminal 11. On the other hand, in a case where the available computation capability and the like of the computation handler become less than expected, it is conceivable to round up the computation within the handling range and leave the remaining computations to the next computation handler. In a case where the next computation handler has higher available computation capability, the waiting time of the final communication terminal 11 may be reduced with the above description. Therefore, a case where the computation result is not transmitted to the communication terminal 11 even though Early-exiting is performed will be described.

Figure 23:
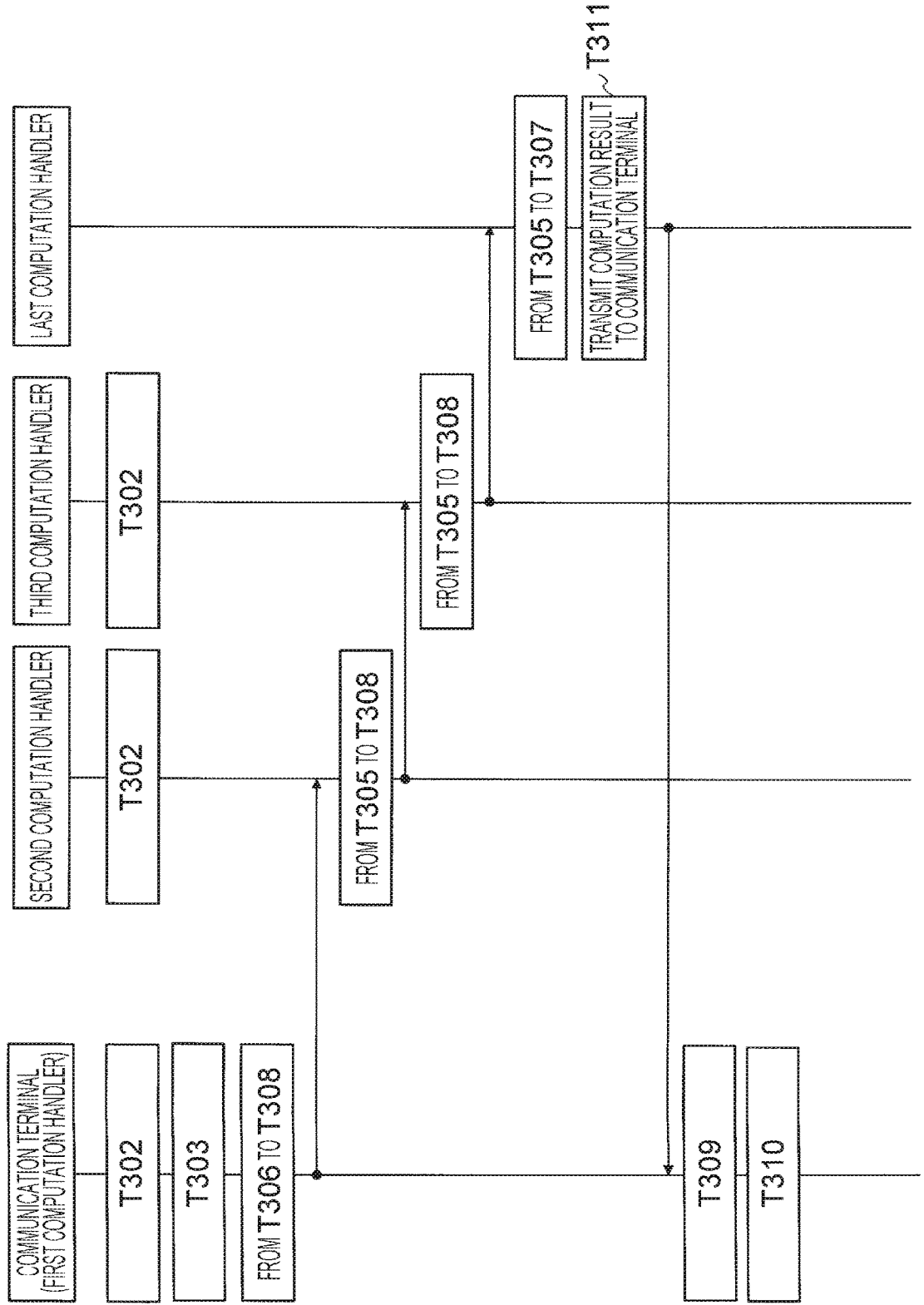
FIG. 23 is a schematic sequence diagram illustrating a second example of the flow of the processing related to Early-exiting.

FIG. 23 is a schematic sequence diagram illustrating a second example of the flow of the processing related to Early-exiting. In the example of FIG. 22, the case where the computation handler executes all the computations of the handling range is also included in Early-exiting. However, Early-exiting in the example of FIG. 23 does not include the case where the computation handler executes all the computations of the handling range, but means that the computation handler ends the computation of the handling range in the middle.

Note that the communication terminal 11 can also end the computation of the handling range in the middle. Therefore, the example of FIG. 23 illustrates an example in which the communication terminal 11 is a first computation handler. In addition, the example of FIG. 23 illustrates a case where there are a second computation handler, a third computation handler, and the last computation handler (fourth computation handler) in addition to the communication terminal 11.

Each computation handler receives and sets the determination condition from the logical entity (T302). Thereafter, the communication terminal 11 executes the ML application (T303). The communication terminal 11 collects information required for determination of Early-exiting, and performs the determination of Early-exiting by using the collected information (T306). Then, the computation of the DNN is executed on the basis of the determination result (T307). The range of the computation is different between a case where Early-exiting is executed and a case where Early-exiting is not executed. The computation may not be executed depending on the determination result or the determination timing. In other words, the process of T307 may be not necessarily performed. This is similarly applied in any example in the present specification. The communication terminal 11 transmits the computation result to the second computation handler that is the next computation handler, regardless of whether or not Early-exiting is executed (T308). Note that, when Early-exiting is performed, information indicating a position at which the next computation handler starts the computation may also be transmitted to the next computation handler in order to recognize this position. The information may be, for example, information indicating the last layer in the handling range of the communication terminal 11, information indicating the first layer in the next handling range of the next computation handler, information indicating a node that has output the computation result, or information indicating a node to which the computation result is to be input. Note that, in a case where the next computation handler recognizes a predetermined position at which the computation is ended in the middle, if the computation is performed up to this position, and the computation result is transmitted, there is no need to transmit information for recognizing the position at which the next computation handler starts the computation.

The second computation handler receives information regarding the computation result of the communication terminal 11, collects information required for determination of Early-exiting, determines Early-exiting, executes the computation of the DNN on the basis of the determination result, and performs transmission to the third computation handler that is the next computation handler (T305 to T308). The third computation handler performs the processes from T305 to T308 in a similar manner, and the computation result of the third computation handler is transmitted to the last computation handler.

The last computation handler performs the processes from T305 to T307 in a similar manner, but there is no next computation handler of the last computation handler. Thus, the last computation handler transmits the computation result to the communication terminal 11 regardless of whether or not Early-exiting is executed (T311). Similarly to the example of FIG. 22, the communication terminal 11 receives the computation result of the DNN (T309), and executes processing of the ML application on the basis of the computation result (T310). In this manner, it is possible to reduce the computation amount of the computation handler, which may cause a delay in processing, and it is possible to reduce the waiting time of the communication terminal 11 although not as much as the example of FIG. 22. Furthermore, since the series of computations of the DNN is performed up to the last computation handler, the accuracy of the computation result received by the communication terminal 11 may be higher than, for example, a case where the second computation handler transmits the result of the end in the middle of the computation of the DNN.

Figure 24:
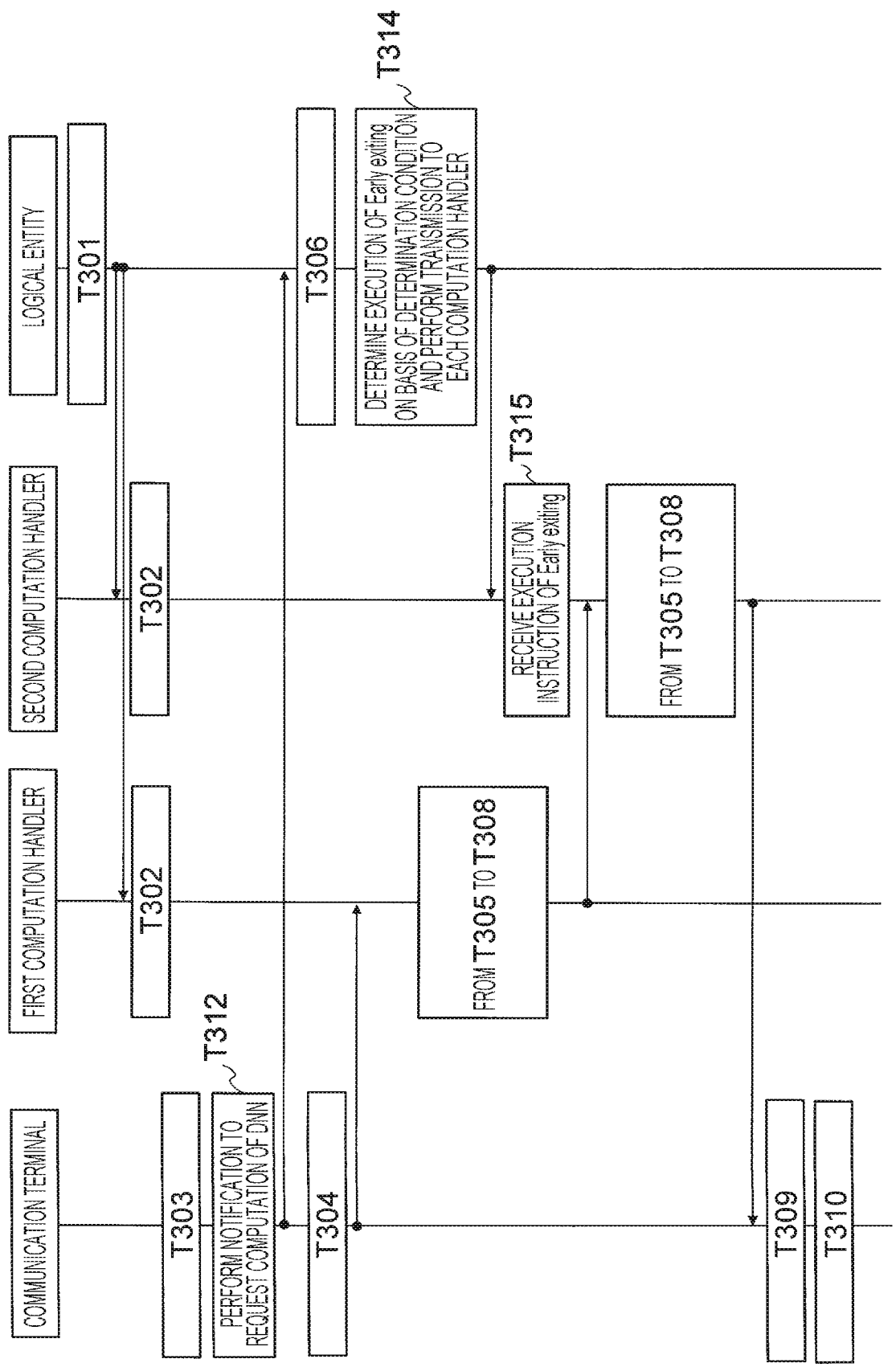
FIG. 24 is a schematic sequence diagram illustrating a third example of the flow of the processing related to Early-exiting.

Furthermore, a flow of an example in which each computation handler does not perform determination of Early-exiting but a specific entity such as a logical entity determines Early-exiting will be described. FIG. 24 is a schematic sequence diagram illustrating a third example of the flow of the processing related to Early-exiting. The example of FIG. 24 is different from the example of FIG. 22 in that the logical entity performs determination of Early-exiting. Note that the entity that determines the computation handler may be different from the entity that performs determination of determining Early-exiting.

Similarly to the example of FIG. 22, the logical entity transmits the determination condition of Early-exiting to the computation handler (T301), and each computation handler receives and sets the determination condition from the logical entity (T302). In the example of FIG. 24, the determination condition indicates whether or not an execution instruction of Early-exiting has been received from the logical entity.

When executing the ML application (T303), the communication terminal 11 notifies the logical entity that the computation of the DNN is requested (T312). The logical entity collects information required for determination of Early-exiting, and performs the determination of Early-exiting by using the collected information (T306). The determination of the logical entity is repeated periodically. For example, the logical entity may periodically check communication resources such as the available computation capability and the communication quality, and the determination may be performed on the basis of the communication resources. In addition, the logical entity may measure the elapsed time from the notification from the communication terminal 11 and check whether the elapsed time exceeds the upper limit value of the notification from the communication terminal 11. In addition, similarly to the example of FIG. 22, the communication terminal 11 transmits information required for the computation of the DNN to the first computation handler that is the next computation handler (T304).

The first computation handler performs the processes from T305 to T308 similarly to the example of FIG. 22. In the example of FIG. 24, the execution instruction of Early-exiting is not received from the logical entity. Thus, the computation of the handling range is executed and the computation result is transmitted to the second computation handler.

In the example of FIG. 24, during the computation of the DNN by the first computation handler, the determination condition is satisfied, and the logical entity determines execution of Early-exiting and transmits the determination result to all the computation handlers (T314). Note that, in the example of FIG. 24, since the logical entity does not recognize which one of the computation handlers is in the middle of the computation, the determination result is transmitted to all the computation handlers. In a case where the logical entity recognizes which one of the computation handlers is in the middle of the computation, in a manner that each computation handler notifies the logical entity of the computation result, or the like, the determination result is transmitted to the next computation handler.

The second computation handler receives an execution notification of Early-exiting before receiving the computation result of the first computation handler (T315). Thereafter, the computation result of the first computation handler is transmitted, and the second computation handler performs the processes from T305 to T308. Therefore, the second computation handler executes the computation in the case of performing Early-exiting, and transmits the computation result of the execution to the communication terminal 11. The communication terminal 11 executes the processes of T309 and T310 similarly to the example of FIG. 22. In this manner, the logical entity may determine the execution of Early-exiting, and the execution notification from the logical entity may be used as the determination condition of Early-exiting of each computation handler. Note that, in a case where the execution notification of Early-exiting has been received during the computation of the DNN, the computation handler may perform Early-exiting if possible.

Note that, in a case where it is determined that Early-exiting is executed, processing in a case where Early-exiting is not executed may be continuously executed in parallel with the processing for Early-exiting. That is, the computation handler that has executed Early-exiting may transmit the computation result in the middle to the communication terminal 11 and may also transmit the computation result to the next computation handler. In this manner, after receiving the computation result up to the middle of the DNN, the communication terminal 11 can also receive the final computation result of the DNN. For example, it is possible to early obtain the processing result of the ML application from the intermediate result of the computation of the DNN, and thereafter, it is possible to check whether the processing of the ML application is correct on the basis of the final computation result of the DNN received later. As a result, this can contribute to improvement in calculation accuracy and reduction in computation time. A case where, even in a case where Early-exiting is performed, the computation in a case where Early-exiting is not performed is also executed, and the final computation result of the DNN is transmitted to the communication terminal 11 will be described as multi-feedback below.

Note that, when the computation is ended in the middle of the handling range in the case of performing the multi-feedback, the computation handler may request the next computation handler for the remaining computation as illustrated in the example of FIG. 23, or may transmit the computation result to the computation handler after executing all the computations of the handling range.

A notification of whether or not to perform the multi-feedback may be issued from the communication terminal 11. Alternatively, the computation handler that has performed Early-exiting may notify the logical entity that Early-exiting has been performed, and the logical entity may receive the notification and determine whether or not to perform the multi-feedback according to the situation. Similarly to the execution determination condition of Early-exiting, the execution determination condition of the multi-feedback may also be determined according to the available computation capability of the computation handler, the communication resources, the required specifications of the ML application, and the like.

In addition, the computation handler that has performed Early-exiting may notify the next computation handler that Early-exiting has been performed, and the next computation handler may not perform Early-exiting. Conversely, even in a case where Early-exiting has already been performed, the next computation handler may also perform Early-exiting. Therefore, the communication terminal 11 may receive the computation result by Early-exiting a plurality of times and the final computation result of the DNN.

FIG. 25 is a conceptual diagram for describing the multi-feedback. In the example of FIG. 25, the communication terminal and the second to fourth computation handlers handle the computation of the DNN. In the example of FIG. 25, a case where the second computation handler performs Early-exiting, and the computation result by Early-exiting of the second computation handler is transmitted, as a response, to the communication terminal 11 is represented by a feedback FD1 indicated by an arrow. In addition, the second computation handler transmits the computation result to the third computation handler for multi-feedback. On the other hand, a case where the third computation handler also performs Early-exiting and the computation result by Early-exiting of the third computation handler is transmitted, as a response, to the communication terminal 11 is represented by a feedback FD2. In addition, the third computation handler also transmits the computation result to the fourth computation handler for multi-feedback. In the example of FIG. 25, a case where the fourth computation handler performs the computation up to the end of the series of computations of the DNN and transmits the final computation result to the communication terminal 11 is represented by a feedback FD3. As described above, the communication terminal 11 may receive the computation results (FD1 and FD2) by Early-exiting a plurality of times and the final computation result (FD3) of the DNN.

Note that, in a case where the multi-feedback is performed, the computation of the DNN after Early-exiting has been performed may not be performed by each computation handler in a shared manner, and a specific entity may perform the computation in a centralized manner. For example, in the example of FIG. 25, in a case where Early-exiting has been performed, the second computation handler and the third computation handler may not perform the computation, and the fourth communication handler may collectively perform the remaining computation.

Note that, in a case where Early-exiting has been performed, information regarding the execution of Early-exiting, such as the computation handler that has performed Early-exiting, the reason for performing Early-exiting, and an end position of the computation, may be transmitted to the communication terminal 11. Furthermore, in a case where the multi-feedback is executed, the logical entity or the like may estimate the time when the final computation result of the DNN reaches the communication terminal 11 on the basis of the records, the communication resources, and the like, and notify the communication terminal 11 of the estimated time. Therefore, even though the ML application has received the result of Early-exiting, the ML application can wait for the final computation result of the DNN without using the result of Early-exiting.

In addition, the computation handler that has performed Early-exiting may request the logical entity to change the computation handler. For example, in a case where the computation handler has performed Early-exiting due to a problem in the available computation capability of the computation handler, the computation handler may request to exclude the computation handler from the computation handlers. For example, in a case where Early-exiting has been performed due to a problem in communication quality with the next computation handler, the computation handler may request to change the next computation handler.

In addition, the communication terminal 11 may notify the logical entity and each computation handler whether or not to execute Early-exiting. For example, in a case where a notification to reject the execution of Early-exiting is transmitted from the communication terminal 11, each computation handler may not perform Early-exiting without following the determination condition of Early-exiting. In addition, a notification regarding whether or not multi-feedback is executed may be performed. In addition, in a case where multi-feedback is permitted, an upper limit value of the number of feedbacks illustrated in FIG. 25 or the like may be designated.

The internal configuration of each entity in the second embodiment may be similar to that in the first embodiment, and thus the description thereof will be omitted. It is only required to store the computation range in the case of not performing Early-exiting and the computation range in the case of performing Early-exiting in the storage unit (the storage unit 52 in FIG. 18 or the storage unit 112 in FIG. 19) of each device, and to switch the computation range used by the control unit (the control unit 53 in FIG. 18 or the control unit 113 in FIG. 19) of each device. The calculation unit (the calculation unit 54 in FIG. 18 or the calculation unit 114 in FIG. 19) of each device is only required to execute the computation of the DNN.

As described above, in the present embodiment, in a case where distributed learning in which a plurality of entities handles a series of computations of a DNN in a shared manner is performed, Early-exiting is executed. By executing Early-exiting, even in distributed learning using a communication node in which a communication delay or the like is likely to occur, it is possible to suppress the time in which the computation result of the DNN is fed back to the communication terminal 11 within a predetermined time. In addition, in a case where the available computation capability and the like of the computation handler become less than expected, it is possible to end the computation within the handling range in the middle and leave the remaining computation to the next computation handler. In this manner, it is also possible to suppress the time taken for a series of computations of the DNN.

Note that the processing in the present disclosure is not limited to a specific standard, and the exemplified setting may be appropriately changed. Note that the above-described embodiment has described examples for embodying the present disclosure, and the present disclosure can be implemented in various other forms. For example, various modifications, substitutions, omissions, or combinations thereof are possible without departing from the gist of the present disclosure. Forms in which such modifications, replacements, omissions, and the like have been made are also included in the scope of the present disclosure and are likewise included in the invention described in the claims and the equivalent scopes thereof.

Furthermore, the procedures of processing described in the present disclosure may be regarded as a method having a series of these procedures. Alternatively, the procedures may be regarded as a program for causing a computer to execute the series of these procedures or a recording medium storing the program. In addition, the processing of the logical entity and the computation handler described above is executed by a processor such as a CPU of a computer. Furthermore, the type of the recording medium does not affect the embodiment of the present disclosure, and thus is not particularly limited.

Note that each component illustrated in FIGS. 18 to 20 in the present disclosure may be realized by software or hardware. For example, each component may be a software module realized by software such as a microprogram, and each component may be realized by the processor executing the software module. Alternatively, each component may be realized by a circuit block on a semiconductor chip (die), for example, an integrated circuit such as an application specific integrated circuit (ASIC) or a field programmable gate array (FPGA). In addition, the number of components and the number of pieces of hardware for realizing the components may not coincide with each other. For example, one processor or circuit may realize a plurality of components. Conversely, one component may be realized by a plurality of processors or circuits.

Note that the type of the processor described in the present disclosure is not limited. For example, a CPU, a micro processing unit (MPU), a graphics processing unit (GPU), or the like may be used.

Furthermore, although the utilization of the present disclosure in the DNN has been described above, the present disclosure is not necessarily limited thereto. For example, a similar configuration may be used in an SNN (spiking neural network) or the like. Furthermore, at this time, the configuration may be used to solve a problem different from the utilization in the DNN. A spike signal may be used to transmit any type of the information described above. Furthermore, the causal relationship may be extracted from the time-series data, and any of the determinations described above may be performed on the basis of the information.

In addition, the components for storing data, such as the storage unit 52 of the base station device 50 and the storage unit 112 of the communication terminal 11, may be realized by a device capable of reading and writing data, and the device may be appropriately selected. For example, a DRAM, an SRAM, a flash memory, a hard disk, or the like may be used.

Note that the present disclosure can have configurations as follows.

[1]

An information processing device that handles a part of a series of computations in a deep neural network,
the information processing device being configured to
determine whether or not to transmit, to a first communication device, a result of an intermediate computation in the series of computations in the deep neural network,
in a case where transmission to the first communication device is not determined, transmit a result of at least a part of a computation included in a first range among the series of computations to a second communication device that is a computation handler of a second range following the first range, and
in a case where transmission to the first communication device is determined, execute a computation for transmitting a result of the intermediate computation in the series of computations in the deep neural network to the first communication device, and transmit a result of executing the computation to the first communication device.

[2]

The information processing device according to [1], in which
in a case where it is not determined to transmit the result of the intermediate computation in the series of computations in the deep neural network to the first communication device, at least the part of the computation included in the first range is executed, and a result of executing the computation is used as the result of the computation, which is transmitted to the second communication device, and
in a case where it is determined to transmit the result of the intermediate computation in the series of computations in the deep neural network to the first communication device, at least the part of the computation included in the first range is executed, and the result of executing the computation is used in the computation for transmission to the first communication device.

[3]

The information processing device according to [1], in which
at least the part of the computation included in the first range is executed, and
in a case where the determination is performed while the computation included in the first range is executed, and the transmission to the first communication device is determined, a result of the computation executed before the determination is used in the computation for the transmission to the first communication device.

[4]

The information processing device according to [1], in which
at least the part of the computation included in the first range is executed, and
in a case where the determination is performed while the computation included in the first range is executed, and the transmission to the first communication device is determined, a result of the computation executed before the determination is used as the result of the computation, which is transmitted to the second communication device.

[5]

The information processing device according to any one of [1] to [4], in which
at least the part of the computation included in the first range is executed, and
in a case where the determination is performed while the computation included in the first range is executed, and the transmission to the first communication device is determined, the computation included in the first range continues, and a result of the computation in the first range is used as the result of the computation, which is transmitted to the second communication device.

[6]

The information processing device according to any one of [1] to [5], in which
in a case where it is determined that the result of the intermediate computation in the series of computations in the deep neural network is transmitted to the first communication device, the result of at least the part of computation included in the first range among the series of computations is further transmitted to the second communication device.

[7]

The information processing device according to [6], in which
in a case where it is determined that the result of the intermediate computation in the series of computations of the deep neural network is transmitted to the first communication device, when all computations included in the first range are not executed, information indicating a position of a result of executing the computation in the series of computations is transmitted to the second communication device together with the result of executing the computation.

[8]

The information processing device according to any one of [1] to [7], in which
in a case where it is determined that the result of the intermediate computation in the series of computations of the deep neural network is transmitted to the first communication device, a result of executing the computation and information indicating a position of the result of executing the computation in the series of computations are transmitted to a third communication device capable of executing at least a part of the series of computations.

[9]

The information processing device according to any one of [1] to [7], in which
in a case where it is determined that the result of the intermediate computation in the series of computations in the deep neural network is transmitted to the first communication device, the computation included in the first range is executed up to a predetermined position, and a result of executing the computation is used in the computation for the transmission to the first communication device.

[10]

The information processing device according to any one of [1] to [7], in which
in a case where it is determined that the result of the intermediate computation in the series of computations of the deep neural network is transmitted to the first communication device,
it is determined to which position of the computation included in the first range is executed,
the computation included in the first range is executed up to the determined position, and
a result of executing the computation and information indicating the determined position are transmitted to the second communication device.

[11]

The information processing device according to any one of [1] to [10], in which
the determination is performed on the basis of at least one of information regarding an available computation capability of a device that handles at least a part of the series of computations in the deep neural network and information regarding a traffic volume in the device that handles at least the part of the series of computations in the deep neural network.

[12]

The information processing device according to any one of [1] to [11], in which
the determination is performed on the basis of at least one of communication quality with the first communication device or mobility information of the first communication device.

[13]

The information processing device according to any one of [1] to [12], in which
the determination is performed on the basis of at least one of information giving an instruction on an end of the series of computations in the middle or information giving an instruction on transmission of the result of the intermediate computation in the series of computations to the first communication device.

[14]

The information processing device according to any one of [1] to [13], in which
request information is acquired from the first communication device, and
the determination is performed on the basis of the request information.

[15]

The information processing device according to any one of [1] to [14], in which
in a case where a time required for computation of the first range is longer than a given allowable time, it is determined that the result of the intermediate computation in the series of computations of the deep neural network is transmitted to the first communication device.

[16]

An information processing device configured to:
determine whether or not a computation included in a first range among a series of computations in a deep neural network is ended in a middle; and
in a case where it is determined that the computation included in the first range is ended in the middle, execute a part of the computation included in the first range, and transmit a result of executing the computation and information indicating a position of the result of executing the computation in the series of computations, to a device that is a computation handler of a second range following the first range.

[17]
The information processing device according to [16], in which
information indicating whether or not the device that is the computation handler of the second range may end a computation included in the second range in the middle is further transmitted to the device that is the computation handler of the second range.

[18]
An information processing method executed in an information processing device that handles a part of a series of computations in a deep neural network, the information processing method including:
a step of determining whether or not to transmit, to a first communication device, a result of an intermediate computation in the series of computations in the deep neural network;
a step of, in a case where transmission to the first communication device is not determined, transmitting a result of at least a part of a computation included in a first range among the series of computations to a second communication device that is a computation handler of a second range following the first range; and
a step of, in a case where transmission to the first communication device is determined, executing a computation for transmission to the first communication device by using a result of the intermediate computation in the series of computations in the deep neural network, and transmitting a result of executing the computation to the first communication device.

[18]
An information processing method including:
a step of determining whether or not a computation included in a first range of a series of computations in a deep neural network is ended in a middle; and
a step of, in a case where it is determined that the computation included in the first range is ended in the middle, executing a part of the computation included in the first range, and transmitting a result of executing the computation and information indicating a position of the result of executing the computation in the series of computations, to a device that is a computation handler of a second range following the first range.

[20]
An information processing system including:
at least a first information processing device and a second information processing device that handle a part of a series of computations in a deep neural network,
the first information processing device being configured to
determine whether or not to transmit, to a first communication device, a result of an intermediate computation in the series of computations in the deep neural network,
in a case where transmission to the first communication device is not determined, transmit a result of at least a part of a computation included in a first range among the series of computations, to the second information processing device, and
in a case where transmission to the first communication device is determined, execute a computation for transmission to the first communication device by using the result of the intermediate computation in the series of computations of the deep neural network, and transmit a result of executing the computation to the first communication device, and
the second information processing device being configured to
execute a computation after the computation executed by the first information processing device among the series of computations, on the basis of a result of the computation executed by the first information processing device.

[21]
An information processing system including:
at least a first information processing device that performs a computation in a first range among a series of computations of a deep neural network and a second information processing device that performs a computation in a second range following the first range among the series of computations of the deep neural network,
the first information processing device being configured to
determine whether or not a computation included in the first range is ended in a middle, and
in a case where it is determined that the computation included in the first range is ended in the middle, execute a part of the computation included in the first range, and transmit a result of executing the computation and information indicating a position of the result of executing the computation in the series of computations, to the second information processing device, and
the second information processing device being configured to
when the information is received, execute continuation of the computation executed by the first information processing device in the series of computations on the basis of a result of the computation executed by the first information processing device.

[22]
The information processing system according to [20], further including:
a third information processing device that determines the first range.

[23]
The information processing system according to [21], further including:
a third information processing device that determines whether or not the computation included in the first range is ended in the middle,
in which the third information processing device transmits an instruction to end the computation included in the first range in the middle to the first information processing device, and
the first information processing device determines that the computation included in the first range is ended in the middle, in a case where the instruction is received.

REFERENCE SIGNS LIST

1 Information processing system
11 Communication terminal
111 Wireless communication unit
1110 Transmission processing unit
1111 Encoding unit
1112 Modulation unit
1113 Multiplexing unit
1114 Wireless transmission unit
1115 Reception processing unit 1116 Wireless reception unit
1117 Demultiplexing unit
1118 Demodulation unit
1119 Decoding unit
112 Storage unit
113 Control unit
114 Calculation unit
1141 Condition setting unit
1142 Arithmetic model setting unit
1143 Arithmetic processing unit
115 Antenna
12 Cloud system
121 Cloud server
13 Communication network
131 Wireless communication node
132 Donor node
133 Core network
1331 Communication node of core network
134 RAN
2 Dotted frame (DNN)
21 Node of DNN
22 Link of DNN
50 Base station device
51 Wireless communication unit
510 Transmission processing unit
511 Encoding unit
512 Modulation unit
513 Multiplexing unit
514 Wireless transmission unit
515 Reception processing unit
516 Wireless reception unit
517 Demultiplexing unit
518 Demodulation unit
519 Decoding unit
52 Storage unit
53 Control unit
54 Calculation unit
55 Network communication unit
56 Antenna
601 AMF
602 NEF
603 NRF
604 NSSF
605 PCF
606 SMF
607 UDM
608 AF
609 AUSF
610 UCMF
630 UPF
640 DN
71, 72, 73 Computation Flow
FD1, FD2, FD3 Feedback

The invention claimed is:

1. An information processing device that handles a part of a series of computations in a deep neural network,
the information processing device being configured to determine whether or not to transmit, to a first communication device, a result of an intermediate computation in the series of computations in the deep neural network,
in a case where transmission to the first communication device is not determined, transmit a result of at least a part of a computation included in a first range among the series of computations to a second communication device that is a computation handler of a second range following the first range, and
in a case where the transmission to the first communication device is determined, execute a computation for transmitting a result of the intermediate computation in the series of computations in the deep neural network to the first communication device, and transmit a result of executing the computation to the first communication device.

2. The information processing device according to claim 1, wherein
in a case where it is not determined to transmit the result of the intermediate computation in the series of computations in the deep neural network to the first communication device, at least the part of the computation included in the first range is executed, and a result of executing the computation is used as the result of the computation, which is transmitted to the second communication device, and
in a case where it is determined to transmit the result of the intermediate computation in the series of computations in the deep neural network to the first communication device, at least the part of the computation included in the first range is executed, and the result of executing the computation is used in the computation for the transmission to the first communication device.

3. The information processing device according to claim 1, wherein
at least the part of the computation included in the first range is executed, and
in a case where the determination is performed while the computation included in the first range is executed, and the transmission to the first communication device is determined, a result of the computation executed before the determination is used in the computation for the transmission to the first communication device.

4. The information processing device according to claim 1, wherein
at least the part of the computation included in the first range is executed, and
in a case where the determination is performed while the computation included in the first range is executed, and the transmission to the first communication device is determined, a result of the computation executed before the determination is used as the result of the computation, which is transmitted to the second communication device.

5. The information processing device according to claim 1, wherein
at least the part of the computation included in the first range is executed, and
in a case where the determination is performed while the computation included in the first range is executed, and the transmission to the first communication device is determined, the computation included in the first range continues, and a result of the computation in the first range is used as the result of the computation, which is transmitted to the second communication device.

6. The information processing device according to claim 1, wherein
in a case where it is determined that the result of the intermediate computation in the series of computations in the deep neural network is transmitted to the first communication device, the result of at least the part of computation included in the first range among the series of computations is further transmitted to the second communication device.

7. The information processing device according to claim 6, wherein
in a case where it is determined that the result of the intermediate computation in the series of computations of the deep neural network is transmitted to the first communication device, when all computations included in the first range are not executed, information indicating a position of a result of executing the computation in the series of computations is transmitted to the second communication device together with the result of executing the computation.

8. The information processing device according to claim 1, wherein
in a case where it is determined that the result of the intermediate computation in the series of computations of the deep neural network is transmitted to the first communication device, a result of executing the computation and information indicating a position of the result of executing the computation in the series of computations are transmitted to a third communication device capable of executing at least a part of the series of computations.

9. The information processing device according to claim 1, wherein
in a case where it is determined that the result of the intermediate computation in the series of computations in the deep neural network is transmitted to the first communication device, the computation included in the first range is executed up to a predetermined position, and a result of executing the computation is used in the computation for the transmission to the first communication device.

10. The information processing device according to claim 1, wherein
in a case where it is determined that the result of the intermediate computation in the series of computations of the deep neural network is transmitted to the first communication device,
it is determined to which position of the computation included in the first range is executed,
the computation included in the first range is executed up to the determined position, and
a result of executing the computation and information indicating the determined position are transmitted to the second communication device.

11. The information processing device according to claim 1, wherein
the determination is performed on a basis of at least one of information regarding an available computation capability of a device that handles at least a part of the series of computations in the deep neural network and information regarding a traffic volume in the device that handles at least the part of the series of computations in the deep neural network.

12. The information processing device according to claim 1, wherein
the determination is performed on a basis of at least one of communication quality with the first communication device or mobility information of the first communication device.

13. The information processing device according to claim 1, wherein
the determination is performed on a basis of at least one of information giving an instruction on an end of the series of computations in a middle or information giving an instruction on the transmission of the result of the intermediate computation in the series of computations to the first communication device.

14. The information processing device according to claim 1, wherein
request information is acquired from the first communication device, and
the determination is performed on a basis of the request information.

15. The information processing device according to claim 1, wherein
in a case where a time required for computation of the first range is longer than a given allowable time, it is determined that the result of the intermediate computation in the series of computations of the deep neural network is transmitted to the first communication device.

16. An information processing device configured to:
determine whether or not a computation included in a first range among a series of computations in a deep neural network is ended in a middle; and
in a case where it is determined that the computation included in the first range is ended in the middle, execute a part of the computation included in the first range, and transmit a result of executing the computation and information indicating a position of the result of executing the computation in the series of computations, to a device that is a computation handler of a second range following the first range.

17. The information processing device according to claim 16, wherein
information indicating whether or not the device that is the computation handler of the second range may end a computation included in the second range in the middle is further transmitted to the device that is the computation handler of the second range.

18. An information processing method executed in an information processing device that handles a part of a series of computations in a deep neural network, the information processing method comprising:
a step of determining whether or not to transmit, to a first communication device, a result of an intermediate computation in the series of computations in the deep neural network;
a step of, in a case where transmission to the first communication device is not determined, transmitting a result of at least a part of a computation included in a first range among the series of computations to a second communication device that is a computation handler of a second range following the first range; and
a step of, in a case where the transmission to the first communication device is determined, executing a computation for transmission to the first communication device by using a result of the intermediate computation in the series of computations in the deep neural network, and transmitting a result of executing the computation to the first communication device.

19. An information processing method comprising:
a step of determining whether or not a computation included in a first range of a series of computations in a deep neural network is ended in a middle; and
a step of, in a case where it is determined that the computation included in the first range is ended in the middle, executing a part of the computation included in the first range, and transmitting a result of executing the computation and information indicating a position of the result of executing the computation in the series of computations, to a device that is a computation handler of a second range following the first range.

20. An information processing system comprising:

at least a first information processing device and a second information processing device that handle a part of a series of computations in a deep neural network, the first information processing device being configured to determine whether or not to transmit, to a first communication device, a result of an intermediate computation in the series of computations in the deep neural network, in a case where the transmission to the first communication device is not determined, transmit a result of at least a part of a computation included in a first range among the series of computations, to the second information processing device, and in a case where the transmission to the first communication device is determined, execute a computation for transmission to the first communication device by using the result of the intermediate computation in the series of computations of the deep neural network, and transmit a result of executing the computation to the first communication device, and the second information processing device being configured to execute a computation after the computation executed by the first information processing device among the series of computations, on a basis of a result of the computation executed by the first information processing device.

21. The information processing system according to claim 20, further comprising:

a third information processing device that determines the first range.

22. An information processing system comprising:

at least a first information processing device that performs a computation in a first range among a series of computations of a deep neural network and a second information processing device that performs a computation in a second range following the first range among the series of computations of the deep neural network, the first information processing device being configured to determine whether or not a computation included in the first range is ended in a middle, and in a case where it is determined that the computation included in the first range is ended in the middle, execute a part of the computation included in the first range, and transmit a result of executing the computation and information indicating a position of the result of executing the computation in the series of computations, to the second information processing device, and the second information processing device being configured to when the information is received, execute continuation of the computation executed by the first information processing device in the series of computations on a basis of a result of the computation executed by the first information processing device.

23. The information processing system according to claim 21, further comprising:

a third information processing device that determines whether or not the computation included in the first range is ended in the middle, wherein the third information processing device transmits an instruction to end the computation included in the first range in the middle to the first information processing device, and the first information processing device determines that the computation included in the first range is ended in the middle, in a case where the instruction is received.

* * * * *